(12) United States Patent
Kritchman et al.

(10) Patent No.: US 12,441,052 B2
(45) Date of Patent: Oct. 14, 2025

(54) 3D PARTICLE PRINTING

(71) Applicant: XJET LTD., Rehovot (IL)

(72) Inventors: Eli Kritchman, Tel-Aviv (IL); Nadav Mordechai, Tel Aviv (IL); Igor Gofman, Rishon Lezion (IL); Alex Drukman, Givatayim (IL); Mark Baevsky, Rehovot (IL); Denis Dragunov, Bat Yam (IL); Eduardo Napadensky, Netanya (IL); Yohai Dayagi, Kibutz Kramin (IL); Mubeen Baidossi, Kafr Kara (IL); Avi Levy, Petah Tikva (IL); Michael Pilavsky, Ashdod (IL)

(73) Assignee: XJet Ltd., Rehovot (IL)

( * ) Notice: Subject to any disclaimer, the term of this patent is extended or adjusted under 35 U.S.C. 154(b) by 0 days.

(21) Appl. No.: 17/222,684

(22) Filed: Apr. 5, 2021

(65) Prior Publication Data

US 2021/0354365 A1 Nov. 18, 2021

Related U.S. Application Data

(63) Continuation-in-part of application No. 15/029,815, filed as application No. PCT/IB2014/065400 on Oct. (Continued)

(51) Int. Cl.
*B29C 64/112* (2017.01)
*B22F 12/10* (2021.01)
(Continued)

(52) U.S. Cl.
CPC ............ *B29C 64/112* (2017.08); *B22F 12/10* (2021.01); *B29C 64/209* (2017.08);
(Continued)

(58) Field of Classification Search
CPC ... B29C 64/112; B29C 64/209; B29C 64/245; B29C 64/268; B29C 64/295;
(Continued)

(56) References Cited

U.S. PATENT DOCUMENTS 5,589,876 A * 12/1996 Konuma ................ H04N 25/71
348/E5.079
5,833,914 A * 11/1998 Kawaguchi ............. B29C 67/06
264/246

(Continued)

FOREIGN PATENT DOCUMENTS

EP 0852535 B1 * 9/1996 ............. B29C 67/00

*Primary Examiner* — Susan D Leong
*Assistant Examiner* — Jonathan B Woo
(74) *Attorney, Agent, or Firm* — Polsinelli PC

(57) ABSTRACT

3D (three-dimensional) ink-jet printing includes techniques for evaporating a carrier liquid during printing while at least a portion of dispersant remains in the printed layer; evaporating dispersant in a first layer prior to sintering the first layer and/or prior to printing a second layer; leveling an upper-layer of a printed object using a horizontal roller; and printing layers of an object, each layer with both object and support portions, resulting in an object with support, in particular, support for negative angles and molds.

13 Claims, 24 Drawing Sheets

Related U.S. Application Data 17, 2014, now abandoned, application No. 17/222,684, filed on Apr. 5, 2021 is a continuation-in-part of application No. 15/029,854, filed as application No. PCT/IB2014/065402 on Oct. 17, 2014, now Pat. No. 11,000,897.

(60) Provisional application No. 61/891,926, filed on Oct. 17, 2013.

(51) Int. Cl.
| | | |
|---|---|---|
| *B29C 64/209* | (2017.01) | |
| *B29C 64/245* | (2017.01) | |
| *B29C 64/268* | (2017.01) | |
| *B29C 64/295* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.
CPC .......... *B29C 64/245* (2017.08); *B29C 64/268* (2017.08); *B29C 64/295* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/393; B29C 64/264; B22F 12/10; B22F 10/12; B22F 10/85; B33Y 10/00; B33Y 50/02
See application file for complete search history.

(56) References Cited

U.S. PATENT DOCUMENTS

| | | | | |
|---|---|---|---|---|
| 6,930,278 | B1* | 8/2005 | Chung | B33Y 10/00 700/118 |
| 2001/0003004 | A1* | 6/2001 | Leyden | B33Y 50/02 425/375 |
| 2002/0145213 | A1* | 10/2002 | Liu | B29C 64/40 700/118 |
| 2004/0005182 | A1* | 1/2004 | Gaylo | B22F 12/226 400/283 |
| 2005/0288813 | A1* | 12/2005 | Yang | B29C 64/106 700/119 |
| 2006/0054039 | A1* | 3/2006 | Kritchman | B33Y 40/00 427/256 |
| 2006/0145381 | A1* | 7/2006 | Larsson | B29C 64/153 264/40.6 |
| 2006/0157454 | A1* | 7/2006 | Larsson | B33Y 30/00 219/121.8 |
| 2006/0157892 | A1* | 7/2006 | Larsson | B29C 64/153 244/129.1 |
| 2006/0228248 | A1* | 10/2006 | Larsson | B29C 64/153 219/121.85 |
| 2007/0205184 | A1* | 9/2007 | Mazumder | B23P 23/04 219/121.84 |
| 2015/0367448 | A1* | 12/2015 | Buller | H05B 6/68 219/74 |
| 2017/0355137 | A1* | 12/2017 | Ederer | B29C 64/165 |
| 2019/0118472 | A1* | 4/2019 | Torrealba | B29C 64/218 |
| 2021/0362429 | A1* | 11/2021 | Barnes | B33Y 10/00 |
| 2022/0234287 | A1* | 7/2022 | Culubret Cortada | B33Y 10/00 |
| 2022/0314327 | A1* | 10/2022 | Müller et al. | B22F 10/14 |

* cited by examiner

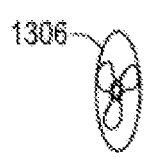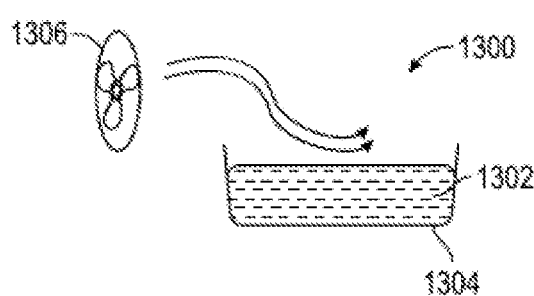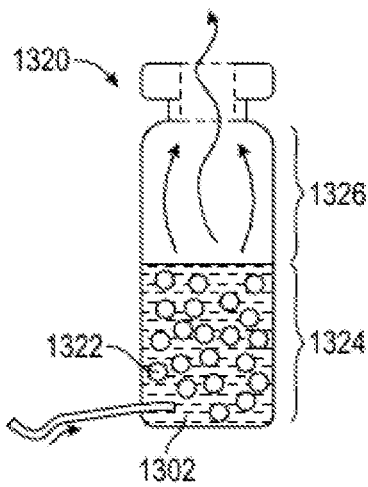
FIG. 13A　　　　FIG. 13B

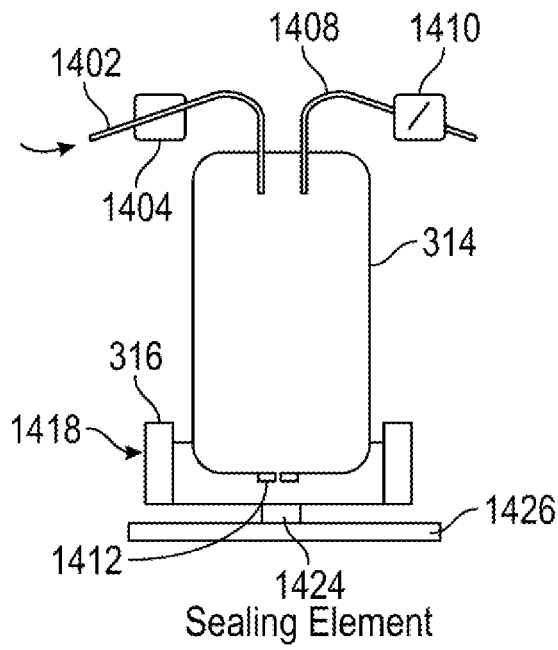
FIG. 14E
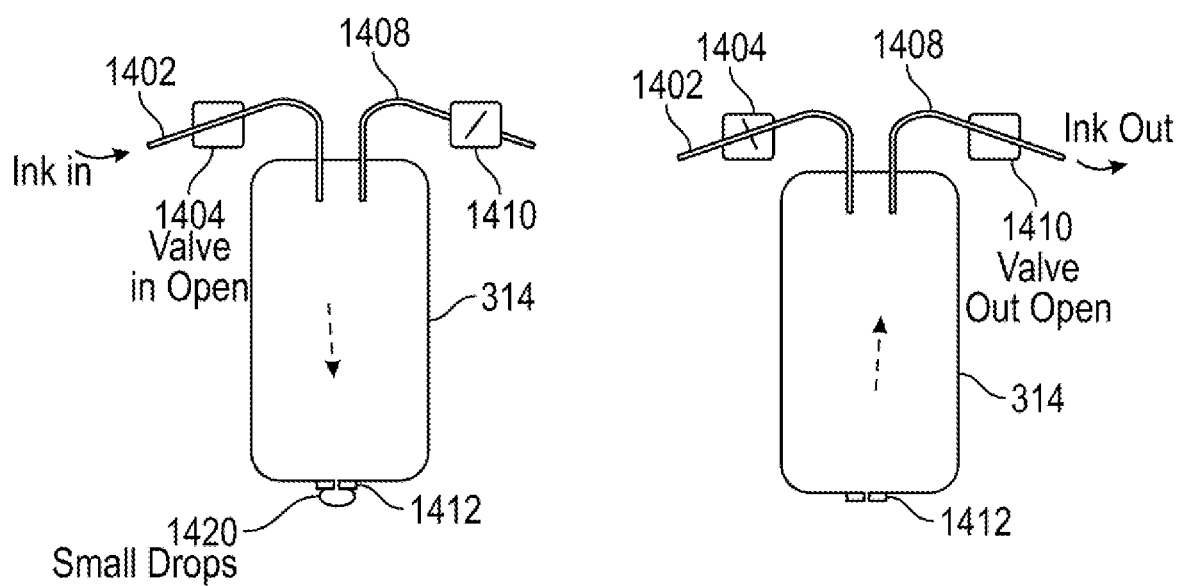
FIG. 14F  FIG. 14G

3D PARTICLE PRINTING

CROSS-REFERENCE TO RELATED APPLICATION

This application is a continuation-in-part application of U.S. patent application Ser. No. 15/029,815, filed on Apr. 15, 2016, which is a national stage entry of PCT/IB2014/065400, filed Oct. 17, 2014, which claims priority benefit to U.S. Provisional Patent Application No. 61/891,926, filed on Oct. 17, 2013, each of which is incorporated herein by reference in its entirety for all purposes.

FIELD

The present disclosure generally relates to 3D (three-dimensional) printing.

BACKGROUND

The 3D (three-dimensional) printing market is maturing rapidly (2014). 3D printing or additive manufacturing (AM) is any of various processes for making a 3D object of almost any shape from a 3D model or other electronic data source primarily through additive processes in which successive layers of material are laid down under computer control. A 3D printer is a type of industrial robot.

Conventional processes include stereo lithography employing UV lasers to cure photopolymers, inkjet printers utilizing UV lamps to cure photopolymers, metal sintering (such as selective laser sintering and direct metal laser sintering), plastic extrusion technology, and deposition of liquid binder on powder.

3D printing is used in applications such as product development, data visualization, rapid prototyping, specialized manufacturing, and production (job production, mass production, and distributed manufacturing). Fields of use are many, including architecture, construction (AEC), industrial design, automotive, aerospace, military, engineering, dental and medical industries, biotech (human tissue replacement), fashion, footwear, jewelry, eyewear, education, geographic information systems, food, and many other fields.

SUMMARY

The present disclosure is directed to a system for printing a three-dimensional object. The system may include a base plate comprising a first heat source operable to emit heat; a substrate attached to the base plate; a printing head operable to dispense ink on the substrate to form a printed object comprised of a plurality of layers; a second heat source located above the substrate operable to emit heat onto a top layer of the plurality of layers; a first temperature sensor operable to measure the temperature of the base plate; and a controller communicatively coupled with the first and the second heat sources and the first temperature sensor. The controller may be operable to: receive a temperature measurement of the base plate from the first temperature sensor; adjust the first and second heat sources to control the temperatures of the substrate and of the top layer based on predetermined functions.

The predetermined functions may be temperature functions of the substrate and/or a power function of the second heat source and/or a temperature function of the upper layer, versus the height of the upper layer. The substrate may be fixed at a constant temperature. The temperature of the substrate may be gradually reduced at higher layers away from the base plate. Adjusting the second heat source may include gradually increasing the heat from the second heat source. Adjusting the second heat source may be kept substantially constant versus the height of the upper layer, at least from above a predetermined height of the upper layer. A second temperature sensor may read the temperature of the upper layer. The second temperature sensor may comprise a thermal IR detector. The temperature of the upper layer may be kept substantially constant versus the height of the upper layer, at least from above a predetermined height of the upper layer. The substrate may be removable.

The present disclosure is also directed to a method to print a three-dimensional object. The method may include receiving, by a controller from a temperature sensor, a temperature measurement of a top layer of an object being printed by a printing head on a substrate; and adjusting, by the controller, a heat source located above the substrate to emit heat such that the temperature of the top layer is controlled based on a predetermined function vs the height Z of the top layer.

Adjusting the heat source may include gradually increasing the heat from the heat source. The substrate may be kept fixed at a constant temperature. The temperature of the substrate may be gradually reduced at higher layers away from the base plate.

The present disclosure is also directed to a method to print a three-dimensional object. The method may include receiving, by a controller from a temperature sensor, a temperature measurement of a baseplate, while an object being printed layer by layer by a printing head on a substrate attached to the baseplate; and adjusting, by the controller, a heat source located in the baseplate to emit heat such that the temperature of the substrate is controlled based on a predetermined function vs the height Z of the top layer.

The temperature may be constant versus the height Z. The temperature may be a decreasing function of height Z. Adjusting the heat source may include gradually decreasing the heat from the heat source.

The present disclosure is also directed to a system for maintaining and/or reducing moisture from ink used in a three-dimensional printer. The system may include ink to be dispensed from a printing head to form a printed object; a container operable to hold the ink and maintain it at high temperature. The high temperature may be higher than room temp, for example, about 50 degrees Celsius, wherein the container is ventilated using gas.

The gas may have an absolute moisture/humidity content similar or lower than that of the ambient air in the room where the printer is located. The gas may be purged through the ink before passing over the ink. The gas may be air. The relative humidity of the gas at 50 degrees Celsius may be about 30% or lower. Means as a fan may be operable to blow the gas over the ink to refresh the gas over the ink.

The present disclosure is also directed to a method to maintain and remove moisture from an ink used in a three-dimensional printer. The method may include holding ink in a container and maintaining a high temperature. The high temperature may be higher than room temperature, for example about 50 degrees Celsius; and passing a gas over the ink to remove moisture from the heated ink.

The gas may be purged through the ink before passing over the ink. The gas may be air. The relative humidity of the gas at the high temperature may be about 30% but also can be lower than 30%. The passing of the gas may be conducted by means as a fan to blow the gas over the ink to refresh the gas over the ink.

The present disclosure is also directed to a system for maintaining a printing head of a three-dimensional printer.

The system may include a printing head operable to dispense ink to form printed layers; an input pipe operable to deliver ink into the printing head; an output pipe operable to pull ink out of the printing head; wherein during an ink suction procedure, the input pipe is closed and the output pipe is open to pull the ink out of the printing head, wherein during an ink purge procedure, the input pipe is opened and the output pipe is closed such that the printing head fills with ink.

An ink bath may be operable to receive at least a portion of the printing head such that an orifice plate of the printing head is fully covered with ink. While the printing head is submerged in the ink bath, the ink suction procedure may be performed. The ink bath may include a mask. A jetting slit in the mask may be closed by a cap and an ink purge procedure may be performed to fill the mask with the ink. The ink purge procedure may be performed for a period of time between 0.1 seconds to 0.3 seconds such that the ink adheres to the orifice plate to form a hanged drop. After the hanged drop is formed, the ink suction procedure may be performed to pull the hanged drop into the printing head.

The present disclosure is also directed to a method to maintain a printing head of a three-dimensional printer. The method may include performing an ink suction procedure, wherein an input pipe is closed and an output pipe is open to pull ink out of a printing head; and performing an ink purge procedure, wherein the input pipe is opened and the output pipe is closed such that the printing head fills with the ink.

The method may further include receiving, in an ink bath, at least a portion of the printing head such that an orifice plate of the printing head is fully covered with the ink; performing the ink suction procedure while the printing head is submerged in the ink bath. The method may further include closing, by a cap, a jetting slit in a mask of the printing head; performing the ink purge procedure to fill the mask with the ink. The method may further include forming a hanged drop by performing the ink purge procedure for a period of time between 0.1 seconds to 0.3 seconds such that the ink adheres to the orifice plate; after the hanged drop is formed, performing the ink suction procedure to pull the hanged drop back into the printing head.

The present disclosure is also directed to a system for inspecting nozzle marks. The system may include a substrate; an illuminator operable to emit light; a test mark of ink dispensed on the substrate; and a camera operable to capture an image of the test mark. The substrate may have a highly smooth surface.

The substrate may be warmed to a predetermined temperature to solidify the ink of the test mark. The system may further include a base plate. The substrate may be placed on top of the base plate. The base plate may emit heat to warm the substrate to the predetermined temperature. The substrate (a) may have sufficient hardness to prevent damage by rubbing the test marks, (b) may have a smooth surface so that the test mark maintains a sharp continuous boundary, and to alleviate wiping of the test mark after image capture, and/or (c) may be highly smooth to the level that the substrate becomes optically specular-reflective.

The present disclosure is also directed to a method to inspect nozzle marks. The method may include dispensing a test mark of ink on a substrate; emitting light by an illuminator to illuminate the test mark; capturing, by a camera, an image of the test mark, wherein the substrate has a highly smooth surface.

The method may further include warming the substrate to a predetermined temperature to solidify the ink of the test mark. The method may further include placing the substrate on a base plate; and emitting heat, by the base plate, to warm the substrate to the predetermined temperature. The substrate (a) may have sufficient hardness to prevent damage by rubbing the test marks, (b) may have a smooth surface so that the test mark maintains a sharp continuous boundary, and to alleviate wiping of the test mark after image capture, and/or (c) may be highly smooth to the level that the substrate becomes optically specular-reflective.

The present disclosure is also directed to a method to inspect nozzle marks. The method may include dispensing a test mark of ink on a substrate; emitting light by an illuminator to illuminate the test mark at an angle; capturing, by a camera, an image of the test mark, wherein the substrate has a highly smooth surface to the level that the substrate becomes optically specular-reflective, wherein the reflected light from the substrate is directed off the camera capturing aperture.

The present disclosure is also directed to a system to maintain a fume suction nozzle of a printing head for a three dimensional printer. The system may include a printing head assembly operable to dispense ink to form printed layers on a hot substrate; a fume suction nozzle formed in the printing head assembly, the fume suction nozzle operable to suck emerging fumes from the dispensed layers; an air pushing mechanism operable to push air in an opposite direction of sucking fumes to push out clogging material in the fume suction nozzle.

The fume suction nozzle may be formed in a housing of the printing head. The fume suction nozzle may be formed in a mask of the printing head.

The present disclosure is also directed to a method to maintain a fume suction nozzle of a printing head for a three dimensional printer. The method may include sucking, via a fume suction nozzle and conduit, emerging fumes from a dispensed layer on a hot substrate formed from ink dispensed from the printing head; and pushing air, by an air pushing mechanism, in an opposite direction of sucking fumes to push out clogging material in the fume suction nozzle and conduit.

The fume suction nozzle may be formed in a housing of the printing head. The fume suction nozzle may be formed in a mask of the printing head.

The present disclosure is also directed to a system to maintain a roller for a three dimensional printer. The system may include a roller having a housing, the roller operable to level a printed layer; a dust removal slit formed in the housing; an air pump fluidly coupled with the slit and operable to suck dust and/or fumes from the roller leveling the layer through the dust removal slit; and a cleaner operable to be inserted into the dust removal slit to remove clogged dust in the dust removal slit.

The roller may include one or more blades operable to cut the layer of substrate during leveling of the layer of substrate. The blades may comprise metal or refractory material. The blades may be coated with refractory material. The cleaner may be automatically deployed. The cleaner may include a motorized plastic or metal blade. The cleaner may be communicatively coupled with a computer. Upon receiving a command from the computer, the cleaner may move along the length of the dust removal slit to remove the clogged dust in the dust removal slit.

The present disclosure is also directed to a method to maintain a roller for a three dimensional printer. The method may include sucking, by an air pump, dust and/or fumes from a roller leveling a dispensed and dried layer of printed object through a dust removal slit; and inserting a cleaner into the dust removal slit to remove clogged dust in the dust removal slit.

The roller may include one or more blades operable to cut the dispensed layers during leveling of the layers. The cleaner may be automatically deployed. The cleaner may include a motorized plastic or metal blade. The cleaner may be communicatively coupled with a computer. Upon receiving a command from the computer, the cleaner may move along the length of the dust removal slit to remove the clogged dust in the dust removal slit.

The present disclosure is also directed to a system to maintain roller blades of a roller for a three dimensional printer. The system may include a roller operable to level a layer of printed object, the roller including one or more blades operable to cut the layer during leveling of the layer, the roller having one or more gaps between the blades; and a brush operable to be moved along the blades to clean the roller.

The brush may be motorized. The brush may automatically move along the blades while the roller incrementally rotates to clean the gaps between the blades.

The present disclosure is also directed to a method to maintain roller blades of a roller for a three dimensional printer. The method may include leveling, by one or more blades of a roller, a layer of printed object, the roller having one or more gaps between the blades; and moving a brush along the blades to clean the roller.

The method may further include incrementally rotating the roller while the brush automatically moves along the blades to clean the gaps between the blades.

The present disclosure is also directed to an ink for three-dimensional printing. The ink may include a filler; a solvent; a binder comprising a polyol resin and a blocked isocyanate; and optionally a dispersant.

The polyol resin may be a polyvinyl butyral (PVB) based resin. The ink may further include one or more antioxidants.

The present disclosure is also directed to a method of three-dimensional printing an object. The method may include applying a layer of ink; and heating the layer to evaporate solvent from ink and promote crosslinking polymerization between polyol resin and blocked isocyanate to create a crosslinked binder which binds solid particles in the ink.

The method may further include heating the layer to a temperature at which the crosslinked binder is at least partially removed to leave the solid particles; heating the solid particles to effect sintering of the solid particles.

BRIEF DESCRIPTION OF FIGURES

The embodiment is herein described, by way of example only, with reference to the accompanying drawings, wherein:

FIG. 13A is a diagram of an exemplary ink maintenance system.

FIG. 13B is a diagram of an exemplary ink storage system.

FIG. 14E is a diagram of an ink head in a sealed mask forming an ink bath.

FIG. 14F is a diagram of an ink head forming a small drop.

FIG. 14G is a diagram of an ink head sucking the small drop from FIG. 14F.

DETAILED DESCRIPTION

1. Overview

Figure 1:
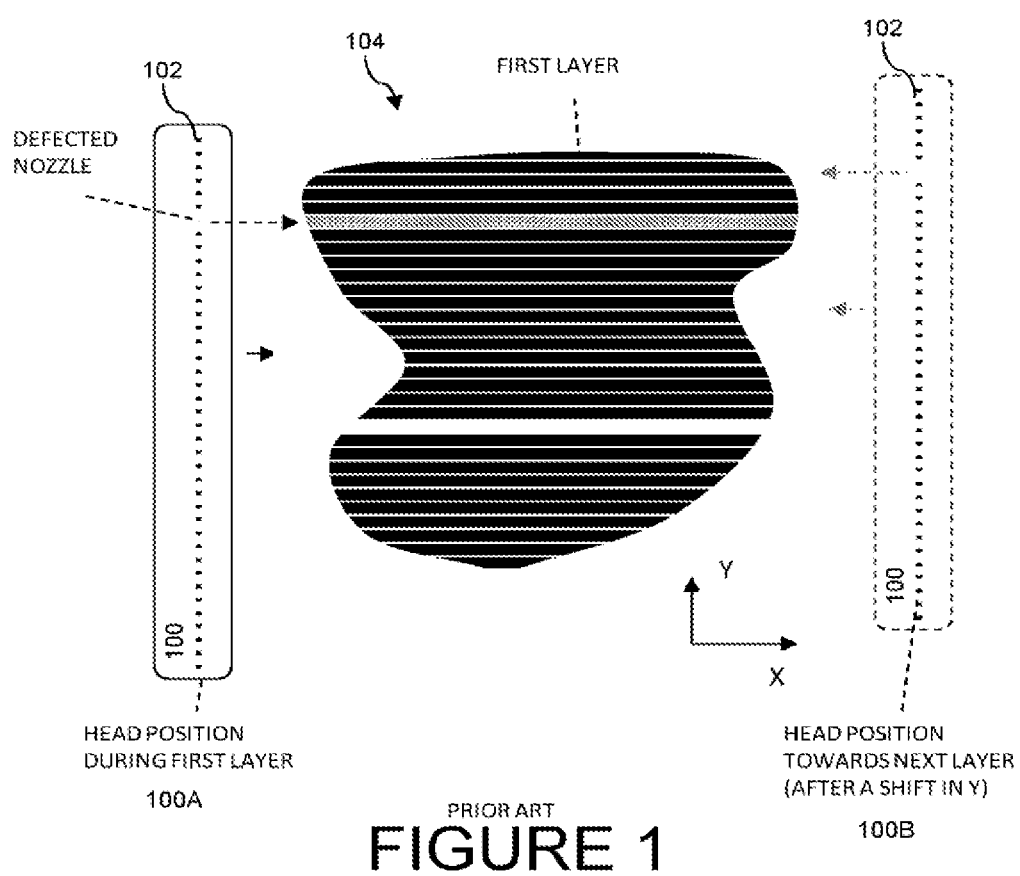
FIG. 1 is a simplified diagram of 3D printing an individual layer.

The principles and operation of the system and method according to a present embodiment may be better understood with reference to the drawings and the accompanying description. A present invention is a system and method for 3D (three-dimensional) printing by dispensing ink including particles of any chosen material. Typically, the particles in the dispensed ink are micro or nano particles. Either during the printing or following the printing, the particles combine to each other (i.e. sinter) to form solid or porous solid material. The system facilitates:

Building a 3D structure,
Discharging the organic components,
Sintering the particles,
Preventing deformation, and
Stable ink dispersion.

In the context of this document, the term "object" generally refers to an item that a user desires to produce, in particular via 3D printing. In other words, the term "object" refers to an item to be produced by the 3D printing process. During printing, the term "object" can refer to an incomplete or partially generated item.

In the context of this document, the terms "burn out" or "burn off", "fire-off", or "firing-off" refer to evaporating or disintegrating and evaporating a component of the ink.

In the context of this document, the term relative humidity, expressed as a percentage, indicates a present state of absolute humidity relative to a maximum humidity given the same temperature.

In the context of this document, the mathematical sing for power may appear as "^", e.g. cm^2 means centimeter square.

In the context of this document, the terms "printing liquid" and "ink" refer in general to a material used for printing, and includes, but is not limited to homogeneous and non-homogenous materials, for example a carrier liquid containing a dispersed material such as metal particles to be deposited via the printing process.

In the context of this document, the term "dispersion" generally refers to particles distributed and suspended in a liquid or gas and/or distributed evenly throughout a medium.

In the context of this document, the term "pencil laser beam" generally refers to a laser beam that can be focused to a point, while "linear laser beam" refers to a laser beam that can be focused to a line.

In the non-limiting examples used in this document, generally the following notation is generally used to refer to temperatures:

T1 is boiling temperature of a carrier liquid.

T2 is organics (additives as dispersants, binder, etc.) burn out (fire-off, evaporation) temperature, often referred to as "debinding temperature."

T3 is particles' characteristic temperature range of sintering (depending on particles material and size). The temperature range may be lower but close to the material melting point.

TS is temperature of the upper surface of the object on which the new layer is dispensed. In some embodiments, TS is maintained substantially equal to the body temperature of the rest of the object during printing.

TL is temperature of the layer currently being printed (also referred to in the context of this document as the upper-layer, most recent layer, new layer, or first layer). Note that the temperature of the new layer optionally changes during printing of the new layer, as initially the new layer gets the temperature of the upper surface on which the new layer was dispensed (TS), and optionally later the temperature of the new layer increases as a result of additional heat that is applied to the new layer by auxiliary heat sources. Thus, TL is defined as the maximum temporal temperature of the new layer Although embodiments are described with regard to an inkjet printing head, the described system and method is generally applicable to liquid-ejection nozzles of a liquid-ejection mechanism, such as nozzle dispensers. Liquid-ejection nozzles are also referred to as dispensing heads.

2. 3D Inkjet Printing

A preferred embodiment is using inkjet printing heads for dispensing ink. Another option is to use spray nozzles. Typically, inkjet printing provides increased speed, finer object dimensions, and increased quality of finished objects as compared to spray nozzles. The inkjet heads normally dispense the ink layer-by-layer, dispensing subsequent layers on previously dispensed layers. Typically, each layer is hardened before dispensing the succeeding layer. Preferably, the inkjet heads dispense each layer according to the image content of that layer. Alternatively, the inkjet heads "blindly" dispense the layer, and a hardening tool (e.g. a scanning laser beam) hardens the layer according to the layer's specific image content.

3. Ink

Generally, a printing system will include more than one type of ink. For example, ink as used herein may refer to an a support ink, and a model ink, among others. In various aspects, inks may also refer to a combination of one or more types of ink. Model ink is used to produce the desired object, and support ink can be used temporarily during printing, for example to support "negative" tilted walls of the object. In embodiments described in this document, inks may include the following ingredients, alone or in any combination:

a. Micro or nano particles. The ink includes a dispersion of solid particles of any required material, e.g. metals (iron, copper, silver, gold, titanium etc.), oxides ($Al_2O_3$, $ZrO_2$, $SiO_2$, $TiO_2$, $BiO_2$ etc.), metal carbides (WC, $Al_4C_3$, TiC), metal alloys (stainless steel, Titanium Ti64, etc.), inorganic salts, polymeric particles, etc., in volatile carrier liquid. Also, the ink may include a mixture of different type of particles. The particles are of micro (0.5 to 50 micrometer size) or nano (5 to 500 nanometer size) as required to maintain the required spatial resolution during printing, maintain the required material character (after sintering), or to satisfy limitations of a dispensing head. For example, when the dispensing head is an inkjet array of nozzles, including nozzles of 30μ, (μ=micrometer or micron) diameter, the particle size should preferably be equal or smaller than 2μ. In the context of this document, the term "particles" generally refers to solid particles used to construct (print) the object and/or the "bulk material" of the object. The use of the term particles will be obvious from context.

b. Carrier liquid. The particles are dispersed in a carrier liquid, also referred to as a "carrier" or "solvent". A dispersing agent (often call dispersant) assist in dispersing the particles in the liquid. According to one embodiment, the liquid should evaporate after printing so that the succeeding layer is dispensed on solid material below. Hence, the temperature of an upper layer of the object during printing should be comparable with the boiling temperature of the carrier. In another embodiment, the temperature of the upper printed layer is much higher than the boiling temperature of the liquid carrier, encouraging thereby the evaporation of other organic materials like dispersants or various additives in the carrier.

Conventional dispersants are readily available, such as organic dispersants such as Disperbyk 180, Disperbyk 190, Disperbyk 163, from Byk Chemie GMBH. Conventional particle ink is readily available such as commercial Sun-Tronic Jet Silver U6503, from Sun Chemicals Ltd. (485 Berkshire Av, Slough, UK).

c. Dissolved material. At least part of a solid material to be used to construct (print) the object can be dissolved in the ink. For example, a dispersion of silver (Ag) particles, which in addition to the Ag particles includes a fraction of Ag organic compound dissolved in the carrier liquid. After printing and during firing, the organic portion of the Ag organic compound fires off, leaving the metal silver atoms well spread. This conventional ink is readily available such as Commercial DYAG100 Conductive Silver Printing Ink, from Dyesol Inc. (USA), 2020 Fifth Street #638, Davis CA 95617.
  d. Dispersing agent. In order to sustain particle dispersion, a dispersing agent (also referred to as a dispersant) is used in the ink. Dispersants are known in the industry, and are often polymeric molecule. In general, the dispersing molecules (molecules of the dispersant) adhere to the (solid) particle's surface (i.e. wrap the particles) and reduce agglomeration of the particles to each other. When more than one solid particle species are dispersed in the dispersion, using the same dispersant material for all solid particle species is preferred so compatibility problems between different dispersant materials are avoided. The dispersing agent should also be able to dissolve in the carrier liquid so that a stable dispersion can be formed.

In conventional printing, the dispersant remains in the final object, sometimes in concentrations as large as about 10%. While having dispersant as part of a final 3D product may be acceptable for the construction of some objects, for other objects there is an essential need to remove substantially all of the dispersant. For example, to have the final concentration of the dispersant substantially zero (i.e., less than 0.1%). This is because:
  a. thermal degradation residues left by the dispersing material (e.g. carbon) may prevent reaching the necessary sintered material compositions, thereby preventing the reach of the desired sintered material properties, and
  b. the dispersing material may weakens the solidified 3D structure ("green" material). For example, if the dispersant agglomerates and remains as "islands" in the bulk material.

Hence, in some embodiments the dispersant must be removed before final sintering.

3.2 Binding Material

Figure 19A:
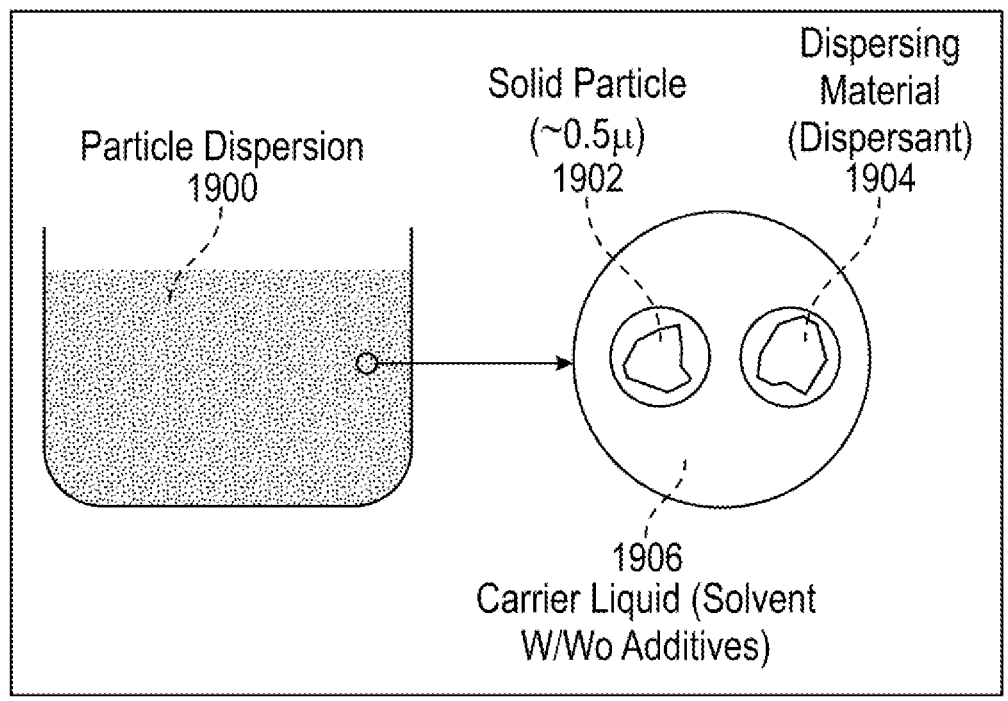
FIG. 19A is a diagram of an exemplary ink with particle dispersion.

Referring to FIG. 19A, ink dispersions 1900 can include solid particles 1902 (or a mix of different solid particles) comprising the final material after sintering, carrier liquid 1906 (also referred to as solvent), dispersing material 1904 (also referred to as dispersant) required to enable a stable dispersion, and optionally some additives dispersed or dissolved in the carrier liquid 1906.

In some examples, both the dispersant 1904 and the additives can include "organic material." Accordingly, the term "organic material" may be used throughout the disclosure as standing for the group of dispersant and additives. The main attributes from the organic material are as following:
  a. If necessary, the ability to significant disintegration and evaporation below the sintering temperature of the object material.
  b. Does not substantially dissolve in the media used to remove the support from the object (often water or an aqueous solution).
  c. The green part (comprising particles and organic material) is sufficiently strong to withstand mechanical stress during removing the support.
  d. The warmed green part is sufficiently strong during printing (~160 degree Celsius) to withstand mechanical pressure brought about by the leveling roller or by stress resulting from the evaporation of the liquid carrier.
  e. The organic material is sufficiently chemically stable under the high printing temperature (~160 degree Celsius-220 degree Celsius) along the long printing time- usually more than 10 Hrs, for example 24 Hr but also longer.
  f. Dissolved in the carrier liquid 1906 and serves as a dispersant 1904 in the particle dispersion 1900.
  g. The dispersing material 1904 may also behave as the particle binder after evaporating the carrier liquid 1906.

The present disclosure solves the problem of the binder being wick or not cohesive enough, and degraded after long time at high temperature in the printing cell, which can affect the properties of the green 3D object and ultimately the properties of the final 3D object.

Many dispersing/binding agents had been tested for 3D printing of metal, ceramics and refractory or hard materials, both in the model ink and support ink, and none were found satisfactory. The dispersant/binder should fulfil many requirements, including proper particle dispersion, withstanding the high temperature and strong pressure of the roller during printing, good bonding characteristics of the green printed object, and substantial disintegration and evaporation in de-binding firing step.

The only type of material that meets all the various requirements are those belonging to the crosslinked family of polymers described in this application.

The present disclosure provides for an ink composition, a method for inkjet 3D printing, and 3D objects obtained thereof. The solid materials (fillers) for the ink which construct the 3D object are (e.g. metals, metal alloys, ceramics oxides and non-oxides as carbides, nitrides, borides, hydrides, also cermets, glass, etc.).

The present disclosure describes a crosslinked binder, in-situ created during the 3D printing process. Hence, the ink can contain at least a polyol compound, a cross linker, and solid particles.

In order to enable a low viscosity ink, as specifically required in ink jetting technology, crosslinking should be avoided in the ink before being jetted. The disclosed process takes the advantage of a large thermal difference between the ink before and after jetting, and requires that the crosslinking will be activated only at the high temperature during printing process.

The ink may also contain a solvent, dispersing agent and antioxidants.

The 3D inkjet printing method includes applying the ink, layer-by-layer, wherein each layer is applied on top of a previous layer (or substrate in case of the first layer), and wherein heat is used to evaporate the liquid carrier during this process. The heating of the applied ink evaporates the solvent and promotes the crosslinking reaction between the polyol resin and crosslinker to create a crosslinked binder which binds the solid particles. The material received at this step is collectively term in the art as a green material. After printing the 3D object is completed, the "green" object can be further heated to a temperature at which the binder and other components of the ink, except the solid particles, may be at least partially removed (burned off, decomposed or evaporated) to form a "brown" object. This step is termed debinding. The materials resulting from the debinding process is termed brown material. Said "brown" object can further be heated in order to effect sintering of the solid particles to obtain the final object.

According to some embodiments, the crosslinked binder can be obtainable through the reaction of a low molecular weight polyol/polyol resin (MW<~20 kD) and a blocked isocyanate (cross linker), wherein said polyol and said blocked isocyanate mix react/copolymerize at the printing conditions (for example the high temperature condition of the formed layer(s) to form a crosslinked co-polymer i.e. crosslinked binder).

The filler can include particles of said hard material (e.g. metals, metal alloys, ceramics oxides and non-oxides as carbides, nitrides, borides, hydrides, also cermets, glass, etc.).

The antioxidant can include one or more compounds. Examples of suitable antioxidants are detailed below. The polyol resins as well as the protected isocyanate may be sensitive to heat and under the printing conditions temperature, may decompose or degrade. The addition of some antioxidants can reduce/prevent/inhibit the possible degradation of the ink organic additives, within them, the binder components, during the printing process.

In some examples, the polyol resin may be used as a dispersing agent (dispersant) in the ink.

The present disclosure further provides a building material (ink) for 3D printing comprising a filler, a solvent, a dispersant and a binder wherein the binder comprises a polyol, a protected polyisocyanate, and an antioxidant. According to some examples, the polyol resin is a polyvinyl butyrate (PVB) copolymer containing hydroxyl functional groups, which is discussed in more detail below.

Due to the special combination of said components, the following goals have been met:

a. The ink is a substantially stable low viscosity dispersion which enables 3D printing by inkjet based material deposition. The meaning of substantially stable in this context is that the ink polyol and blocked isocyanate do not react at ambient conditions (for at least months). And wherein before use, shaking the ink can re-disperse particles, in case of some sedimentation.

b. The dried printed part (the green material) is strong and resilient enough to withstand the printing process conditions as temperature and pressure of a planarizer, e.g. the blade of a planarizing roller used to grind and level up dried layers. In addition, due to the antioxidant, the binder is not harmed when staying tens of hours on the hot printing tray. Without these attributes, the printed part is vulnerable to being cracked or broken or crumbled, but also to present not homogeneous properties, as non-homogeneous density Ink Composition The building material (ink) for 3D printing can include:
a. A filler [~20 to ~70 w/w % from total ink], for example Alumina
b. A solvent [~30-~80 w/w % from total ink], for example propylene carbonate
c. A dispersant [~0.5-~10 w/w % based on dispersed solid "filler" content, ratio to the filler weight]
d. A polyol resin and a blocked isocyanate [~1-~5 w/w % based on dispersed solid "filler" content, ratio to the filler weight] which form the binder under printing conditions.

The ink may contain an anti-oxidant [~5-~20 w/w % based on the binder content]

1. Filler

The filler of the ink can comprise any solid particles e.g. ceramic and/or metallic materials. Non-limiting examples of said ceramic materials are: Zirconia, alumina, hydroxy apatite, and/or mixtures thereof. Non-limiting examples of said metallic materials are stainless steel 316, stainless steel 17-4 PH, tool steel H13, iron, copper, silver, gold, titanium, etc., and/or mixtures thereof. The filler may also be selected from among oxides ($SiO_2$, $Al_2O_3$, $Al_2TiO_5$, $TiO_2$, $BiO_2$, etc.), cermets (e.g. WC—Co), carbides (WC, $Al_4C_3$, TiC, etc.), metal alloys (stainless steel, Titanium Ti64, etc.). The main fraction of the filler particle can be in the range of about 0.1 microns to about 10 microns, alternately about 0.3 microns to about 1.5 microns.

2. Solvent/Liquid Carrier

The solvent of the ink can be selected from among a group of high boiling point organic solvents comprising: glycol ethers e.g. diethylene glycol monobutyl ether (DEGBE), carbonate esters e.g. propylene carbonate, petroleum distillate e.g. isopar, alkyl pyrrolidines e.g. n-methy-2pyrrolidone, sulfoxides e.g. dimethylsulfoxide, etc., and/or mixtures thereof. Typically, suitable solvents have a boiling point greater than 100° C., typically in the range of 160–220° C.

3. Dispersing Agent (Also Referred to as Dispersant)

In order to sustain particle dispersion, a dispersing agent (also referred to as a dispersant) can be used in the ink. Dispersants can be polymeric. In general, the dispersant is a substance, added to a suspension of solid or liquid particles in a liquid (such as a colloid or emulsion) to improve the separation of the particles and to prevent or reduce their settling and agglomeration. The dispersant molecule can have functionality (functional groups) with affinity to the surface of the dispersed particles and functionality with affinity to the solvent. When more than one solid particle species are dispersed in a liquid carrier, the same dispersant material may be used for all solid particle species so compatibility problems between different dispersant materials are avoided. The dispersing agent should also be able to dissolve in the carrier liquid so that a stable dispersion can be formed.

In at least one example, the polyol resin can also function as a dispersing agent. This has great advantages as it permits better control of the properties, e.g. mechanical properties, of the resulting green material. In at least one example, the dispersant can also function as a binder.

4. Binder

The binder is formed in-situ at the printing conditions by reacting the polyol resin (the hydroxyl functional groups) and the protected isocyanate that in the ink.

The polyol resin may comprise a PVB based resin of a molecular weight in the range of about 15-30 kD. In at least one example, the polyol resin can also function as a dispersing agent.

5. Anti-Oxidant

The antioxidant (AO) can be selected from among a group of suitable antioxidants. A non-limiting list of suitable AO is provided below. The weight to weight ratio between the binder and AO (e.g. PVB:AO) is in the range of 1:~0.05 to 1:~0.2.

Antioxidants (AO):

Primary AO can include organic molecules including hindered phenol and amine derivatives.

Secondary AO can include organic molecules including phosphates and lower molecular weight hindered phenols.

Primary AO (Free Radical Scavengers)

Free-radical scavengers react with chain-propagating radicals such as peroxy, alkoxy, and hydroxy radicals in a chain terminating reaction. These AO donate hydrogen to the radicals which converts them into inert alcohols and water respectively. Typical commercial primary AO are hindered phenols and secondary aromatic amines. These compounds come in a wide range of molecular weights, structures, and functionalities. The most widely used primary antioxidants are sterically hindered phenols. They are very effective radical scavengers during both processing and long-term thermal aging, and are generally non-discoloring.

Examples of primary AO can include but are not limited to:
 a. Irganox 1076-octadecyl-3-(3,5-di-tert-butyl-4-hydroxyphenyl)propionate
 b. BHA-2- and 3-t-butyl-4-hydroxyanisole
 c. IRGANOX 1010-tetrakis methylene-(3,5-di-t-butyl-4-hydroxyhydrocinnamate) methane
 d. CYANOX 2246 2,2'-Methylenebis(4-methyl-6-tert-butylphenol)
 e. CyANOX 425 2,2'-Methylenebis(4-ethyl-6-tert-butylphenol)
 f. Irganox PS 800 FL-didodecyl 3,3'-thiodipropionate Secondary Antioxidants (Peroxide Scavengers)

Peroxide scavengers (secondary antioxidants) decompose hydroperoxides (ROOH) into nonreactive products before they decompose into alkoxy and hydroxy radicals. The most common secondary antioxidants are trivalent phosphorus compounds (phosphites). They reduce hydroperoxides to the corresponding alcohols and are themselves transformed into phosphates. Another class of secondary antioxidants are thioethers or organic sulfides.

Examples of secondary AO can include but are not limited to:
 a. TNPP-Tris-nonylphenyl phosphite
 b. IRGAFOS 168-Tris(2,4-di-tert-butylphenyl)phosphite Polyols/Polyol Resins A polyol is an organic compound containing multiple hydroxyl groups (at least 2). A molecule with two hydroxyl functional group is a diol, with three—a triol, and with four—a tetrol. By convention, polyols do not refer to compounds that contain other functional groups, although other functional exist in the polyol.

Polyols may be a polymer and/or copolymers containing hydroxyl functionality. Non-limiting examples of vinyl polymeric polyols are: PVA (polyvinyl alcohol), partially hydrolyzed polyvinyl acetates (PVE), copolymers of PVB based resins, etc.

Examples of non-polymer polyols are Glycerol, Trimethylolpropane, xylitol, and/or Pentaerythritol.

Examples of polymeric polyols are polyether polyols (e.g. polyethylene glycol (PEG)), polyester polyol, typically produced by the condensation reaction of a glycol with a dicarboxylic acid such as Adipic, Phthalic anhydride, Isophthalic, Terephthalic, Succinic, Sebacic. Vinyl polyol (e.g. polyvinyl alcohol), etc.

Copolymers of Polyvinyl butyral (PVB) based resin is a polymeric family of species, often used for applications that require strong binding, optical clarity, adhesion to many surfaces, film-forming, toughness and flexibility.

Figure 19B:
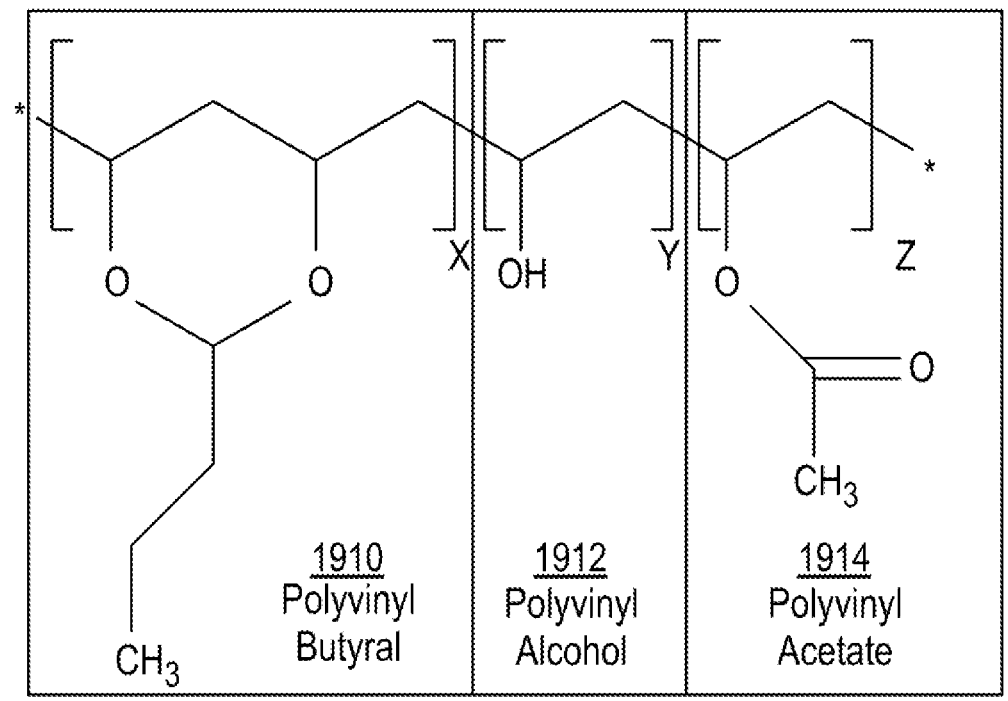
FIG. 19B is a diagram of polyvinyl butyral (PVB) based resin structure.

PVB based resins can be synthesized as a copolymer containing PVB in addition to polyol polymers. For example, FIG. 19B shows example copolymers with (polyvinyl butyral) 1910, hydroxyl (polyvinyl alcohol) 1912, and acetate (polyvinyl acetate) 1914 groups.

The structure of the different member varies by the number of groups of the three types, i.e. the degree and type of polymerization. The structural difference between PVB members can impact their characteristics. The degree of acetalization and polymerization largely determines important properties, such as their solubility and film properties. The water resistance of the films rises as the number of butyral group increases (this may be important during removing the support material by dissolving the support in water, without weakening the object). Glass transition (Tg) declines as the number of butyral groups increases and the degree of polymerization decreases. Solubility in non-polar solvents increases as OH content decreases. Toughness increases with the degree of polymerization. Examples of different PVB based resins are provided in the chart below. The attributes can range within and, in some examples including, the lower limit and the upper limit.

| Attribute | Lower limit | Upper limit | Units |
| --- | --- | --- | --- |
| Average molecular weight | 10,000 | 100,000 | gr/mol |
| Viscosity [10% in Ethanol] | 10 | 1000 | mPa · s |
| Part of Polyvinyl alcohol | 10 | 30 | % |
| Part of Polyvinyl acetate | 1 | 20 | % |
| Part of Polyvinyl butyral | 89 | 50 | % |
| Glass transition | 60 | 90 | ° C. |

Members of the PVB based resin family alone do not comply with printing requirements as demanded by this disclosed subject matter. PVB without crosslinking according to the present disclosure results in green material too fragile to withstand the printing process and a water-based support removal. Examples of PVB based resins include resins from Kuraray under the brand name Mowital®, Eastman under Butvar®, Chang Chun Group under CCPPVB and others.

However, the PVB based resins can be used as a dispersing agent and as part of a reactive/crosslinked binder; that together with "protected" isocyanates permit 3D printing of ceramic, cermet and metal 3D printing.

The cross linker which reacts with the polyol to create a copolymer between the polyol and the crosslinker can be selected from a group comprising protected isocyanates.

Protected isocyanate refers to the reaction product of an iso-cyanate or isocyanate-terminated prepolymer in which the isocyanate functionality has been reacted with a 'blocking or protecting agent'. Once 'blocked', the diisocyanate can be added to (mixed with) polyols or certain chain extenders, and these materials will not react at room temperature. A polyol resin formulated with a blocked isocyanate is basically a two-component binder that does not react until heated to the activation temperature, then, the polyol can react/copolymerize.

Different blocking agents unblock at different temperatures. Many of the blocking agents volatilize upon deblocking. Several of the most common blocking agents are methyl ethyl ketoxime (MEKO), E-caprolactam (ECAP), diethyl malonate (DEM) and dimethyl pyrazole (DMP). MEKO, a common blocking agent, has one of the lowest unblocking temperatures (~135° C.), while ECAP unblocks at about 170° C. In contrast, it is generally accepted that diethyl malonate (DEM) blocked isocyanates react by way of trans-esterification, rather than by the liberation of isocyanate.

In certain cases, the isocyanates is toluene diiso-cyanate or hexamethylene diisocyanate.

The crosslinker is mixed with the polyol such that at least part of the hydroxyl functional group will react with the blocked isocyanate groups. The ratio between the polyol depends on the specific polyol and the specific blocked isocyanate in use.

The PVB based resin was demonstrated in dispersion formulation for many metals, ceramic, and also carbonate salt powders (solid particles).

Said crosslinked resin enables high enough green part strength and prevents breaking and cracking during the printing process. And afterword due to handling Also, during post processing of the green parts towards sintered parts, the polymer decomposes during the thermal de-binding stage, at a substantially lower temperature than the sintering temperature.

Besides the good binding properties, when utilizing members of the PVB based resin family as dispersing agents to disperse solid particles in suitable liquid carriers, the obtained dispersion meets ink jet system requirements, enabling proper jetting of the ink thereof. Accordingly, the chemo-physical and rheological properties of the dispersion is satisfactory.

EXAMPLES

The recipe of an ink comprising vinyl based resin as a dispersing and binding agent can include the following:
1. Material components and relative amount (range, weight ratio)
   a. Carrier liquid, e.g. Glycol ethers (e.g. DEGBE=Diethylene glycol monobutyl ether)-this is polar, having a boiling point between 50°-400° C.
   b. Solid particles/filler: 20-70% of the total dispersion.
   c. PVB based resin (polyol binder part A): 0.1-5% relative to the filler
   d. Cross linker (isocyanate binder part B): 0.1-30% relative to the PVB resin
   e. Stabilizers. e.g. antioxidants
   f. Various additives, e.g. leveling agents The table below summarizes examples of for ink compositions according to the present disclosure.

| # | Substance | Substance role | Ex1 wt % | Ex2 wt % | Ex3 wt % | Ex4 wt % | Ex5 Wt % | Ex6 wt % | Range wt % |
|---|---|---|---|---|---|---|---|---|---|
| 1 | DEGBE | Solvent (1) | | X | | X | | | 70-40 |
| 2 | TPM | Solvent (1) | | | X | | X | | |
| 3 | Propylene carbonate | Solvent (1) | | X | | | X | | |
| 4 | Butyl ethyl acetate | Solvent (1) | X | | | X | | | |
| 5 | Propylene glycol phenyl ether | Solvent (1) | X | | X | | X | | |
| 4 | SiO2 | filler | | | | | 45 | | 30-60 |
| 5 | ZrO2 | filler | 30 | | | | 30 | | |
| 6 | Al2O3 | filler | | 40 | | | 10 | | |
| 7 | SS316 | filler | | | 35 | | | | |
| 8 | SS17-4PH | filler | | | | 45 | | | |
| 9 | Mowital B16H | Polyol binder part A | 1 | | 1.5 | | | | 0.3-2.0 |
| 10 | Mowital BA20S | Polyol binder part A | | 1 | | 0.5 | 1.2 | | |
| 11 | Joncryl 587 | Polyol binder part A | | | | 0.2 | 0.5 | | |
| 12 | PEG400 | Polyol binder part A | 0.2 | | | | 0.2 | | |
| 13 | DMP (2) | Isocyanate binder part B | 0.2 | | | 0.1 | 0.2 | | 0.05-0.5 |
| 14 | DEM (2) | Isocyanate binder part B | | 0.3 | 0.25 | 0.15 | | 0.25 | |
| 15 | ECAP (2) | Isocyanate binder part B | | | 0.1 | | 0.1 | | |
| 16 | Irgafos168 | AO | | | 0.2 | | | | |
| 17 | Irganox 1010 | AO | 0.15 | 0.1 | 0.1 | 0.15 | 0.2 | 0.1 | 0.015-0.6 |
| 18 | Irganox 1076 | AO | | | | | | | |
| 19 | Irganox PS 800FL | AO | 0.15 | | | 0.1 | 0.1 | 0.1 | |
| 20 | Disperplast1150 | Dispersant | 0.05 | | | | | | 0.1-1.0 |
| 21 | Byk140 | Dispersant | | | 0.05 | | | | |
| 22 | Byk111 | Dispersant | | | | | 0.05 | | |
| | | Total composition wt % | 100 | 100 | 100 | 100 | 100 | | |

(1) "X" in the above table represents a value that balance the composition to a total of 100%. For formulations using a mix of 2 solvents, the ratio between the solvent usually may be between 100% one solvent to 100% of the second solvent or any mix between them.

(2) Isocyanate "protecting" group. The isocyanate can be Toluene diiso-cyanate, Hexamethylene diisocyanate, and others.

The size of the solid particle and the viscosity of the ink should comply with the dispersing apparatus requirements. For inkjet printing, as an example, the size should be generally smaller than about 3μ, (micron), and the viscosity at the dispensing (jetting) temperature (i.e. the temperature of the ink at the dispensing head) should be 7 to 30 cP (centipoise).

2. Mixing Procedure (Ranges)

a. Milling and Dispersing

Figure 19C:
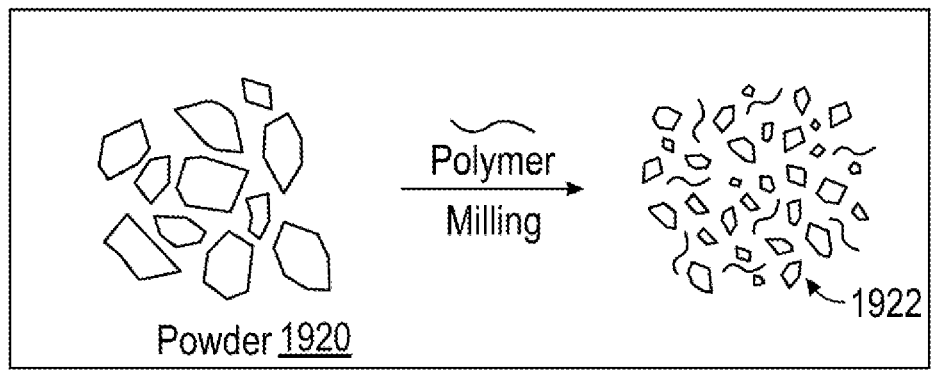
FIG. 19C is a diagram of milling powder for ink.
Figure 19D:
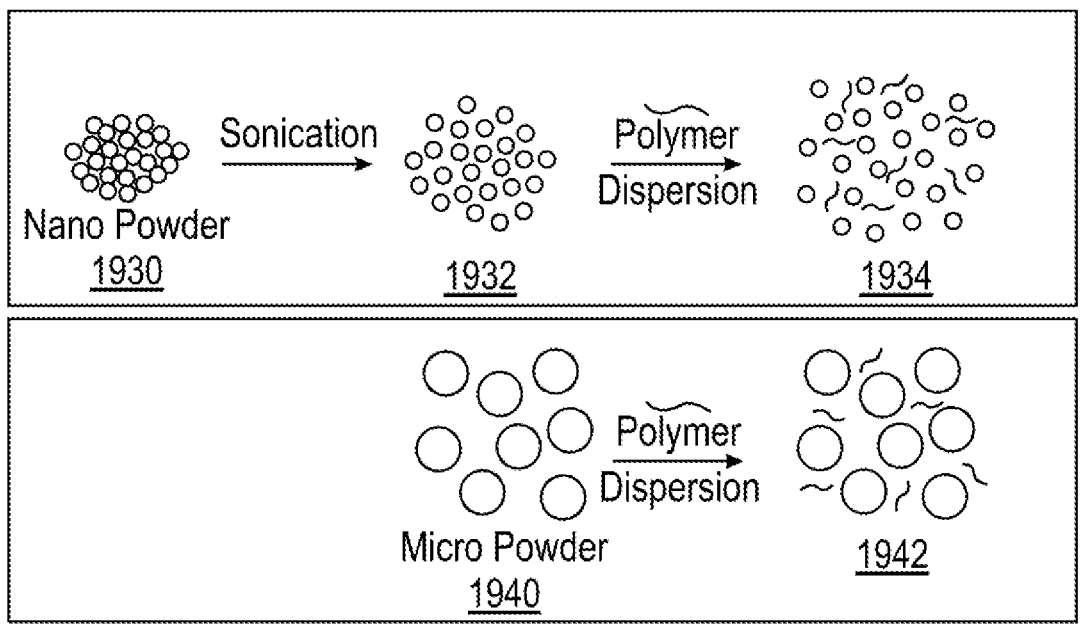
FIG. 19D is a diagram of dispersing powder for ink using sonication.

Referring to FIG. 19C, milling is generally used for separating the powder aggregates 1920, reducing the particle size to below 3μ, and for preparing the final dispersion 1922. Size reduction can be done only with brittle powder (e.g. ceramics, carbides, hydrides) and not with ductile material (e.g. metal). Milling of ductile metals as SS316L is used to break down agglomerates of particles. Further reduction can be obtained by running ultra-sound waves through the dispersion (breaking agglomerates held by Van Der Waals force). Milling is done after mixing the powder with dispersing agent in the carrier liquid (solvent). In at least one example, two types of milling apparatus can be utilized as below—vertical attritor grinding bead mill, and horizontal agitator bead mill:

a. Milling using attritor (300 gr solid powder): 2 Kg of zirconia beads 0.5 mm, 6 hr @ 20° C., 2000 rpm
  b. Milling using agitator (1200 gr powder): 2 Kg of zirconia beads 0.5 mm, 4 hr @ 20° C., 16 m/sec b. Dispersing—Using Attritor/Horizontal Agitator Bead Mill Dispersing is the step of preparing a dispersion of powder in a solvent, e.g. butyl carbitol, aided by Byk180 as a dispersing agent. Below are example parameters for dispersing using the attritor and horizontal agitator bead mills:

a. Dispersing using attritor (800 gr powder): 2 Kg of zirconia beads 0.5 mm, 12 hr @ RT, 400 rpm
  b. Dispersing using agitator (3200 gr powder): 2 Kg of zirconia beads 0.5 mm, 6.5 hr @ 20° C., 2% pump, speed 6 m/sec c. Dispersing—Using Sonication Referring to FIG. 19D, sonication is the first step for nano powder 1930 or micro powder 1940 cluster breakdown or de-agglomeration. In a second step, sonication can be used to get stable dispersion 1934, 1942. Below is an example of parameters for sonication.

a. Sonication (3200 gr powder): 16 h @ 10° C. 100% (pump speed 15).

4. Nozzle Scatter

Refer to FIG. 1, a simplified diagram of 3D printing an individual layer. A printing head 100 is shown in a first position 100A when preparing to print a first layer 104 of the object, and in a second position 100B when preparing to print a subsequent layer of the object. The printing head 100 (e.g. inkjet head) includes a nozzle array 102 that scans the layer 104 in an X direction substantially perpendicular to the longitudinal axis Y of the layer 104.

The jetted droplet volume of different individual nozzles (of the nozzle array 102) may be slightly different from each other individual nozzle (of the nozzle array 102) because of technology deficiency of the head 100 construction. Moreover, a nozzle can stop jetting as the nozzle can become clogged by aggregated ink particles or because of other reasons. In order to maintain a flat upper surface of the object being printed, and especially avoiding deep vacant lines in the 3D printed object, the head 100 is shifted along the Y-axis before every subsequent layer is printed. The shift amount from layer to layer may be set random within a predetermined shift range.

5. Leveling Apparatus

Due to many reasons, including different jetting power (i.e. droplet volume) of the different nozzles, edge rounding due to liquid surface tension of the ink at the edge of a layer, and other known phenomena, the dispensed layer may not be perfectly flat (be too rough), and the dispensed layer's edge may not be perfectly sharp (be too rounded). Therefore, a leveling apparatus should be incorporated to flatten (level) the upper layer and/or sharpen (square off) one or more edges of the upper layer. In one embodiment, the appropriate leveling apparatus includes a vertical grinding roller or cutting (machining) roller. In a preferred embodiment, the appropriate leveling apparatus includes a horizontal (i.e. parallel to the printing surface) grinding roller or cutting (machining) roller.

Figure 2A:
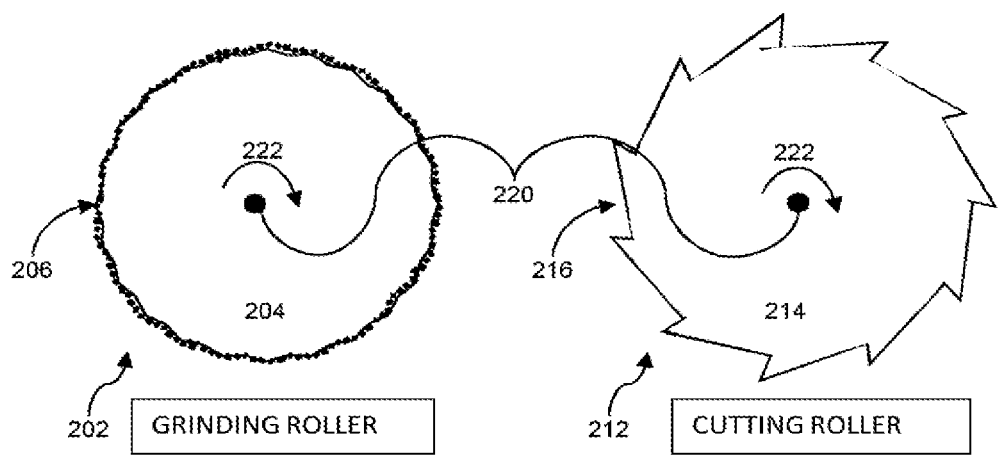
FIG. 2A is a simplified diagram of leveling apparatus.
Figure 3A:
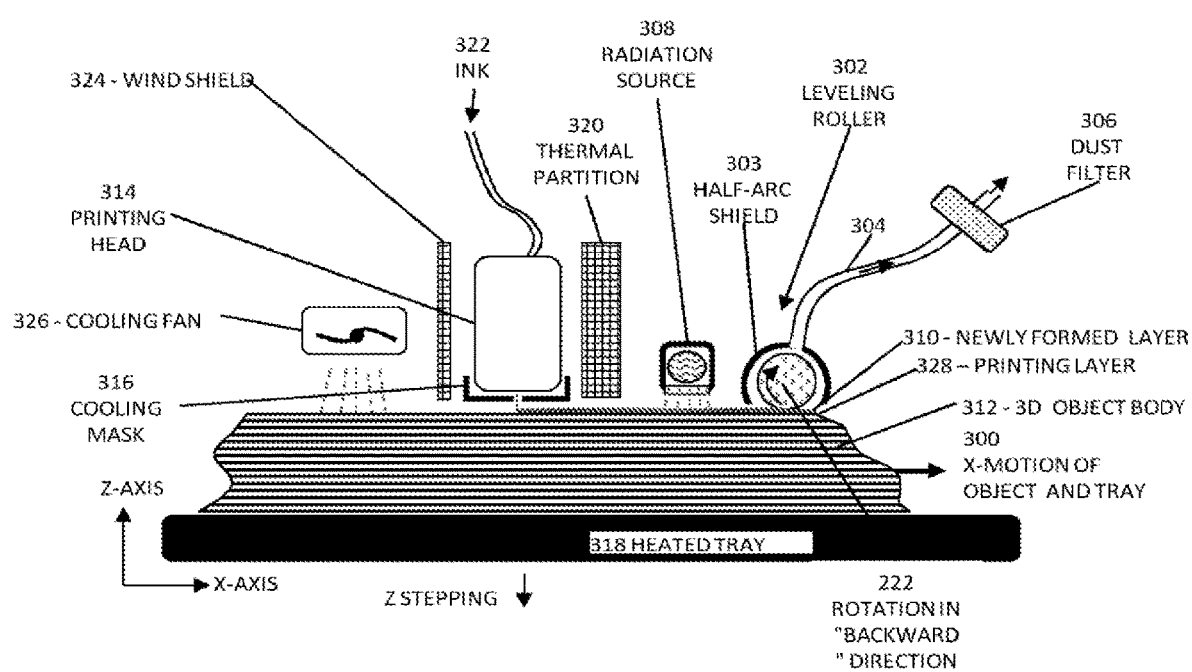
FIG. 3A is a simplified exemplary system for 3D printing.

Refer now to FIG. 2A, a simplified diagram of leveling apparatus and FIG. 3A, a simplified exemplary system for 3D printing.

A 3D object 312 is typically constructed layer-by-layer on a substrate or tray. The tray is typically heated, and a non-limiting example of a heated tray 318 is generally used in this description. As described above, the object is printed in the plane of the X-Y axis, and a newly formed layer 310 (also referred to in the context of this document as the upper-layer) is built along the Z-axis during every printing pass. Ink 322 is supplied or contained in a printing head 314. Optional cooling mask 316, windshield 324, thermal partition 320 are used to protect the printing head 314 from the other printing equipment and/or vice versa. Optional radiation source 308 and/or cooling fan 326 can be used to assist with temperature control of the newly printed layer and/or 3D object body 312. Optional leveling roller 302 can be used during printing to smooth the surface of the newly formed layer 310 and/or the top surface (outermost surface along the Z-axis) of the 3D object body 312. An optional dust filter 306 can be used to suck the dust output of leveling.

Leveling apparatus are also known in the field as "leveling rollers" or simply "rollers". The leveling apparatus operates on a newly formed layer 310 of a 3D object 312 after or as the layer has/is being been printed (dispensed and solidified). The leveling apparatus typically peels off between 5% and 30% of material of the most recently printed layer's height. In other words, shaving the top of the first layer (most recently printed layer). The roller meets the ink after the carrier liquid ink has evaporated and the layer is at least partially dry and solid. In some cases, solid means "a piece of metal", i.e. well sintered particles. In other cases, solid means a pile of particles adhered to each other by organic material or by some initial sintering. The leveling roller 302 may be a grinding roller 202 including a metal cylinder 204 with an abrasive surface 206, for example coated with hard grinding particles, e.g. WC (Tungsten carbide) or diamond "dust". Alternatively, the leveling roller 302 may be a cutting roller 212 (also referred to in the context of this document as a "bladed" roller) including a milling cutting tool 214 with sharp blades 216. Smooth and knurled rollers 202 are known in the art, for example smooth rollers as taught by Kritchman in U.S. Pat. No. 8,038,427 and knurled rollers as taught by Leyden in U.S. Pat. No. 6,660,209. A smooth roller is typically used to meter a liquid layer of material, and acts like a delicate shaving pump. A knurled roller, typically adapted to meter soft wax surface, consists of a multitude of relatively small knurls, or particles, as compared to the size of the cylinder 204 and/or relative to the size of the object to be ground. In contrast, a typical cutting roller 212 features discrete blades 216 that can be relatively large compared to the size of the object to be ground. Neither smooth nor knurled rollers can be adapted to level dry solid material for many reasons. In addition, when using a grinding roller 202 (and also smooth and knurled rollers), the grinding roller is substantially constantly in contact with the object to be leveled. In contrast, a cutting roller 212 is intermittently in contact with the object to be ground—only when the edge of a blade 216 encounters the surface to be leveled. Among the reasons that a knurled roller can be adapted to level dry solid material, is the direction of force that the vertical roller applies onto the shaped surface. When a rotating blade touches the surface, the blade first cuts in by applying horizontal force, and second lifts the cut chip up by applying upward force. When a rotating knurl touches the surface, the knurl first presses and pushes the material both downward and forward by applying downward and horizontal force, and second pushes the detached material up by applying forward and upward force. The downward force may be harmful to delicate object features, since the downward force will easily break the fragile object features.

In general, when referring to axis and orientations of rollers, reference is to the plane of printing, shown as the X-Y axis in the accompanying figures. In conventional implementations, vertical milling or smoothing tools, including multiple cutting blades or grinding disk (e.g. including diamond dust surface), are mounted to a vertical beam that is perpendicular to the plane of printing/plane of the upper surface of the object, and rotates about the beam. These vertical milling tools are used to level the upper-layer (most recently printed and at least partially solidified). The cutting or grinding surface of the vertical tools is parallel to the plane of printing, but the rotation vector points vertically upwards. In an innovative embodiment, the leveling roller is mounted on a horizontal axis and rotates about a horizontal axis (horizontal to the plane of the upper layer of the object), thus providing a horizontal roller. The grinding surface of a horizontal roller at the point of contact (touch) with the material is generally also horizontal (parallel to the plane of printing), but the rotation vector is horizontal (points horizontally, perpendicular to the sweep direction X). The horizontal roller rotates about a horizontal axis 220 relative to the layer being ground. In other words, the outer surface of the roller (or the blade's tip) moves horizontally at the point of contact with the object's new layer. The horizontal roller can be a grinding roller 202, or preferably, the horizontal roller allows implementation with a cutting (bladed) roller 212. A feature of the horizontal roller as compared to the vertical tools is the feasibility to collect outcome dust (including shaved material). While a vertical tool ejects the dust to all directions pointing outward from the vertical axle (i.e. all around directions parallel to the printing surface), a horizontal roller lifts the dust upward in such manner that the dust can be more easily collected and pumped out, such as via into a dust filter 306. In addition, the vertical tool can be very sensitive to precise alignment, since the vertical tool touches the printing surface all over the vertical tool's horizontal surface. When the vertical axle deviates by an angle of a from ideal verticality (towards X direction), the tool's horizontal surface also deviates by the same angle of a from ideal horizontality. In this case, the processed upper surface of the object will not be flat in Y direction but rather having a banana shape (lower in the middle). Quantitatively, if the radius of the rotated blades or grinding surface is e.g. R=50 mm, the amount of the banana effect will be $\Delta Z=\alpha*R$ (* means multiplication, and $\alpha$ expressed in radians). Thus $\alpha=1$ milliradian (i.e. $\alpha=0.06°$, which is difficult to achieve) results in $\Delta Z=50$ micron, which is hardly acceptable. In comparison to this very sensitive alignment, a horizontal roller touches the printing surface substantially only at a line, and therefore there is no need to align a horizontal roller in the X-axis direction. A substantial disadvantage of the grinding surface in comparison to the cutting bladed roller/tool is that the grinding surface is vulnerable to dust (shaved particles) sticking to the diamond dust (of the grinding surface) and disturb thereby proper grinding.

Experiments have shown that the smaller a chip that a blade abrades from the object surface at a touch, the smaller will be the tendency of fine details to break. In one implementation, the cutting roller includes N blades and rotates at an F RPM (revolution per minute), and the relative sweep velocity between the roller and the object in X direction is V. For a given V, the smallest chip is obtained when N and F are set to maximum values. Experiments have also shown that using a spiral blade in comparison to using a straight blade has also positive influence on preventing harm to delicate details, since a spiral blade cuts only a relatively small spot (as compared to a straight blade) in the shaved surface at a time, while the spot's neighboring area holds the spot from breaking. Successful results (no breakage) were obtained with a horizontal roller including N=40, F=3500 RPM, spiral blades (1 revolution per 150 mm roller length), V=100 mm/s (roller diameter=25 mm). The roller material should be such that, a. the blades can be highly sharpened, and b. the blades should withstand the impact with the printed particles that the blades shave. Both requirements dictate use of a hard material. Successful results (no breakage and long blade life) were obtained with cutting rollers made of, a. "high speed steel", and b. "Tungsten Carbide" material (i.e. WC+Co). To elongate the roller life, i.e. keeping the sharpness of the blade long time, the steel blades and/or the entire roller can be coated with various hard/refractory material coating like carbon (of diamond-like lattice), carbide (e.g. silicon-carbide, tungsten carbide, titanium carbide). Part of the roller that comprises the blades, or the entire roller, can be made of other refractory materials than tungsten carbide, e.g. silicon-carbide, titanium carbide.

For simplicity in this description, the orientation of a horizontal roller (i.e. the axis above which the roller rotates) is described as being perpendicular to the direction of sweep during printing. However, one skilled in the art will realize that the orientation does not have to be (can be other than) strictly perpendicular and may be at an angle (non-zero) to the sweep direction.

Figure 2B:
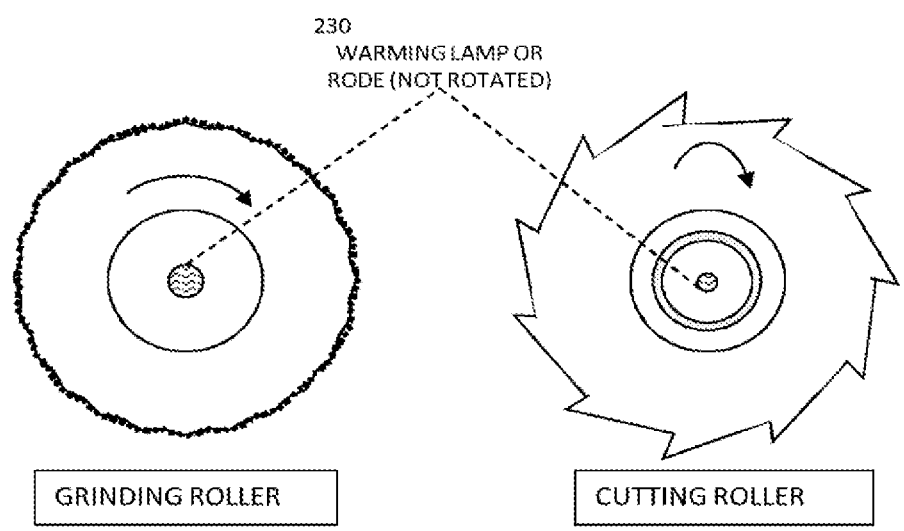
FIG. 2B is a simplified diagram of leveling apparatus with warming sources.

The rotation direction 222 of the cutting roller 212 vs. the relative sweep direction between the roller and the object can be either in the "cutting and lifting" direction (for example, clockwise in FIG. 2A and FIG. 2B), or in the "dig and push" direction (counter clockwise in FIG. 2A and FIG. 2B). The direction of the relative object shift vs. roller during leveling (X-motion of object and tray 300) is not definite (undefined/not pre-defined), and can be different in different applications. Based on this description, one skilled in the art will be able to determined specific details, attributes of the printed material, and other considerations of the printing machine for implementing a specific application depending on the.

As discussed before, as a result of leveling (shaving) the object via use of a roller (such as grinding or cutting rollers), particle waste can be generated. The particle waste can include shaved particles and/or dust of the solid particles from the printing ink. Techniques to prevent the particle waste from being scattered over the printing surface, and to remove the waste from the roller blades, should be applied. The horizontal roller facilitates implementation of techniques for preventing scattering of particle waste, for example by adding a shield around the roller (half-arch shield 303) and applying sucking force via pipe 304 during "rolling". The particle waste is sucked off the surface of the object and the blades, optionally through a filter 306.

The roller may be installed before or preferably after a radiation source 308 such as incandescent or discharge lamp (shown), coherent beam (laser), or ultra-violet (UV), visible, or infrared (IR) radiation source, etc.

Refer now also to FIG. 2B, a simplified diagram of leveling apparatus with warming sources. When the dried ink is sticky, the ink particles may stick to the roller blades or grinding particles and thereby disturb proper leveling. This might be a consequence of insufficient drying of the ink or insufficient firing the organic elements. To prevent this effect, the layer can be further dried by elevating the layer temperature. This technique of elevating the layer temperature might be unacceptable in some cases because of other aspects of the printing process, e.g. deformation of the printed object. Alternatively, the roller can be warmed to high enough temperature in which the problem of stickiness of the ink is avoided. In a non-limiting example, the roller may be set 100 degrees Celsius (° C.) or even higher than the layer's temperature. Warming the roller may be done by heating the roller's outer surface by an external heat source (i.e. located outside the roller) or by an inner heat source located in the roller. Inner heat sources preferably include static (non-rotating) warming element, such as a halogen lamp or a heat rode 230.

6. Mask

In the context of this document, a mask refers to a plate that partially covers an orifice plate and has an opening to facilitate printing from nozzles to a print area. Masks are also referred to as "cooling masks" and can be used as a "thermal buffer".

Since the printed object 312 is relatively hot (e.g. 230° C.) as compared to room temperature (25° C.), as required during the formation of a layer and evaporating the carrier liquid, the printing heads 314 (such as printing head 100) that scan the upper layer in close vicinity (0.5-3 mm between the printing head 314 and object 312) must be protected from the heat and fumes emerging from the newly formed layer 310 (dispensed layer). A cooling mask 316 maintained at a relatively low temperature compared to the temperature of the object while being printed (e.g. from 10 to 40° C.) is installed as a buffer between the printing head 314 and the printed object 312.

7. Heating Tools

In order to maintain printing accuracy, the printed object should preferably be maintained substantially at uniform and constant temperature throughout printing. The upper surface of the object body, however, keeps losing heat to the surrounding atmosphere during printing, and also supplies heat to the newly dispensed layer, since the dispensed ink is usually colder than the object, and since heat is consumed by the evaporation of the liquid carrier of the new layer. If the heat source is only below the object (for example, a heated tray 318), the heat constantly flows up to the upper layer, and because of the heat-flow resistance of the material, a temperature gradient is built, high temperature at the bottom of the object and low at the upper surface of the object (along the Z-axis). Preferably, the heat should also (or merely) be supplied directly to the upper surface or layer. In addition, the temperature of the upper layer should be the same during the printing (though may be higher than the temperature of the bulk), because drying and possibly evaporating the organics and partial sintering occur in that layer, processes that strongly depend on the layer temperature.

In the context of this document, the term "printing surface" 328 typically includes the most recently printed finished layer, prior to printing of the current, newly formed layer 310. In other words, the printing surface 328 is the upper surface or upper layer, most recently previously printed along the Z-axis, and is the surface upon which the newly formed layer 310 is printed. When printing begins, the printing surface is the substrate, for example the heated tray 318. However, after printing begins, the printing surface is typically the upper surface of the object body, plus supporting material, as appropriate.

Since the printed objects (the "green" parts) are fragile, it is imperative that the substrate is removable from the printer, so that further treatment of the parts (detaching from the substrate and removing the support material) can take place outside the printer. Meanwhile another substrate can replace the removed substrate for a new printing job.

In a first embodiment, heat is supplied to the upper surface by an electromagnetic (EM) energy source through the surrounding gas or vacuum. The EM energy source is one non-limiting example of a radiation source 308. Typically, the radiation source 308 is located above the upper layer/object being printed. The direct heating by the EM source can assure constant temperature of the upper layer. When direct heating of the upper layer is not applied, the temperature of the tray 318 (on which the object is printed) should be controlled higher and higher dependently on the interim height of the object during printing, so as to keep the temperature of the upper layer constant. An alternative supply of heat to the upper surface is a stream of hot air blown on the upper printed layer. The use of hot air is not only for increasing the temperature of the upper layer but also, or rather for encouraging, the evaporation of liquid carrier (and in some cases the dispersing agent and other organic material) from the upper surface. A combination of EM radiation, hot air, and warm tray (or any combination thereof) can be used to maximize the heating and/or evaporation performance.

The substrate's surface on which printing is accomplished (for example, the tray 318) presents intimate touch with the object and therefore is at the same temperature of the lower layers of the object. If the substrate (i.e. tray) is thermally conductive, e.g. made of metal, warming the tray to the required object temperature can be essential for producing correctly a desired object. Alternatively, the tray may include thermally insulating material, e.g. wood, plastic, or insulating ceramics. In this case, the substrate keeps the object's temperature, while heating of the object is accomplished by heat radiation from above.

When the object height is relatively small and the object's material has high enough heat conductance, heating the object only from the substrate side may be sufficient. In this context, "high enough heat conductance" generally means that the temperature gradient (which is given by the product of heat conductance per length multiplied by the height Z) is small, e.g. smaller than 1% of the object temperature during printing, measured in Celsius. For example, if the heat conductance is comparable to that of fully sintered metals (100 W/(C·m)), the condition on the temperature gradient can be met up to a relatively small printing height of 10 mm. This, however, is not always the case. The object can be high, e.g. higher than 10 mm in the current example, and can be made of poor material heat conductance (e.g. 1 W/(C·m) and smaller). Therefore heating from the upper side of the object is essential. Heating from the upper side can be done in few different methods, including heat conductance and convection by the air above the object, flowing hot air from an air knife element on the upper layer, EM energy source, etc. A preferred embodiment is the EM energy source, as is described below.

7.1. Radiation Source

As described above, the EM energy source is typically positioned aside the printing head 314, and can be of a UV, visible or IR radiation type.

Optionally, a radiation source 308 is installed after, or preferably before, the leveling roller 302. The radiation source 308 can be used for one or more tasks, including:

Heating the upper layer of the object to maintain a constant temperature of the upper layer, independent of the height of the layer above the heated tray 318.

Heating the upper new layer of the object above the temperature of the printed surface (i.e. the former layer) TS, and as a result:
  a. Assisting disintegration and/or evaporation of the dispersant and other additives to the ink.
  b. Assisting partial or full sintering.
  c. Maintaining the 3D object 312 (whole body) at the same temperature (except the temperature of the upper new layer that can be temporarily higher), i.e. avoiding a temperature gradient along Z direction (top to bottom of the object 312 as the object 312 is being printed).

A special case is the UV radiation source. UV radiation has the potential to disintegrate dispersing molecules that are attached to the particles by breaking molecular connections. At the same time, the UV also heats up the layer, assisting thereby the evaporation of the dispersant material or the dispersant material's fragments.

7.2. Extra Heating of the New Layer

In one embodiment, assume the boiling temperature of a carrier liquid is T1. The temperature of the upper surface is preferably maintained at TS, which is substantially comparable to or higher than T1 (e.g. higher than 0.8×T1 in Kelvin) so that after jetting the ink, the temperature of the new layer (TL) abruptly increases to TS, and carrier liquid evaporates immediately. Generally, the temperature of the whole object during printing can be maintained at TS as well.

In order to evaporate the dispersant material and other organic additives, and optionally initiating at least partial sintering between the building particles, higher temperature of the upper (new) layer TL may be required. Substantial increase of the temperature of printing surface TS above T1 (e.g. by 30° C.) is generally unacceptable, since the landing ink droplets on such a hot surface would explode rather than attach to the surface, like when water droplets land on a surface of 120° C. (the explosion effect can be exploited in a special embodiment which will be described later). In this case, the rest of the object is not required to maintain at such high temperature (TL), but just maintain at a constant and uniform temperature TS.

When a newly formed first layer is dispensed, the layer is typically exposed to air (the environment of the printing machine), and thus organics in the ink have the chance to evaporate, prior to this first layer being covered by a subsequent printed layer. Thus, in one embodiment, the new layer is warmed to a higher temperature TL than the boiling temperature of the carrier liquid T1 (e.g. if T1=230° C. the new layer can be warmed to 400° C.), even though the lower (previously jetted/previously printed) layers stay at a relatively lower temperature TS (e.g. 230° C.).

Figure 3B:
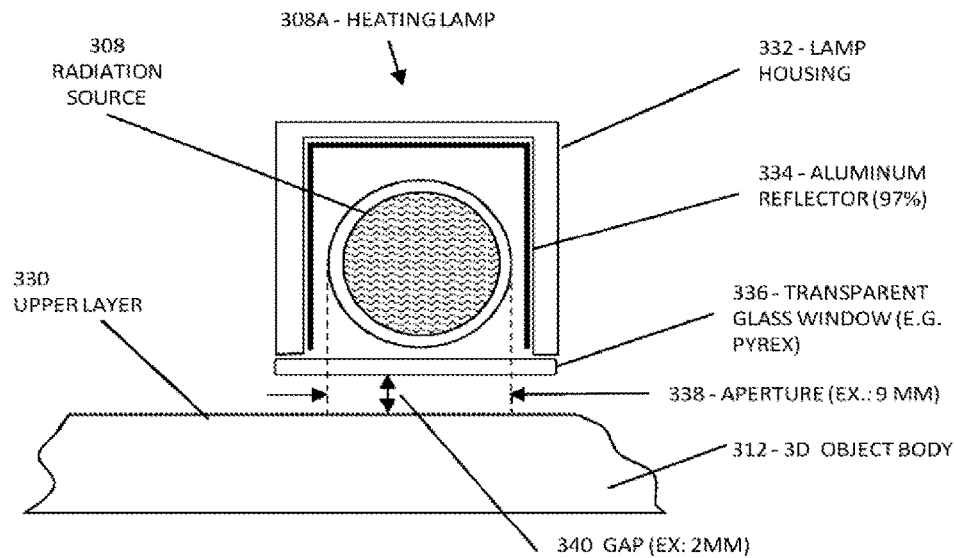
FIG. 3B is a diagram of a lamp as an exemplary radiation source.

Refer now to FIG. 3B, a diagram of a lamp as an exemplary radiation source. As discussed above, heating the new layer can be accomplished by a radiation source 308 typically from above the object. If lower layers under the upper layer are at a lower temperature than the upper layer, maximizing the heat irradiance (i.e. irradiated power per surface area of the new layer) is important in order to get an instant higher temperature of the layer, before the heat dissipates to the preceding (previously printed) layers by conduction or dissipates to the air above by conduction and convection. Therefore, given a heating lamp 308A (as radiation source 308), the lamp should be as close to the body 312 surface and reflector aperture as narrow as possible.

Figure 3C:
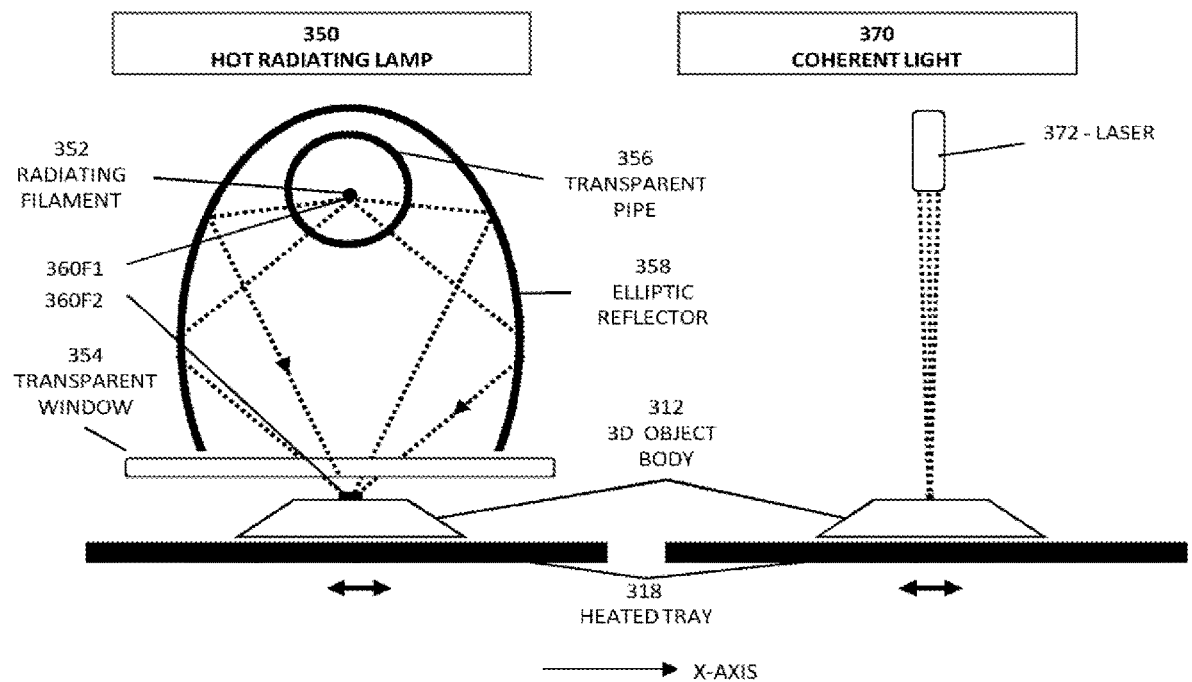
FIG. 3C is a diagram of a lamp as an exemplary radiation source.

A lamp housing 332 typically includes a metal envelop covered with an insulation material to prevent heating adjacent elements. A polished aluminum reflector 334 is typically required especially to protect the reflector and housing from overheating. The polished aluminum reflector 334 typically reflects 97% of heat. A transparent glass window 336 is typically high transparency (i.e. small radiation absorbance is required especially to protect the window from overheating). The window 336 is made of a material appropriate for the specific application (e.g. Pyrex or quartz). An aperture 338 (ex. 9 mm) is used for a given radiation power. A relatively small lamp's aperture assures high irradiation power (i.e. high radiation power per unit area of the printed layer). A small gap 340 between the heating lamp 308A (more specifically, typically from the transparent window 336) to the upper layer of the object body 312) assists in preventing the lamp radiation illuminating large area of the layer at one time. However, focused radiation enables much higher irradiance (FIG. 3C).

Refer to Table 1 and Table 2, below for exemplary calculations showing that for most solid metals that are typically used to construct a 3D object, thermal conduction is so high that very intense radiation is required for warming the new layer to a substantially higher temperature than that of the object (e.g. Ir=1000 KW/cm^2 is required to obtain ΔT=81° C.).

Temperature rise (ΔT=TL−TS) of a new layer above the object's temperature

TABLE 1

| Example parameters | | |
|---|---|---|
| Layer thickness | 5 | μ |
| Light irradiation power (Ir) | 0.1, 1, 10 | KW/cm^2 |
| Radiation absorbance | 0.7 | |

TABLE 2

| | ΔT | | | | |
|---|---|---|---|---|---|
| | Silver | WC | Plastic | Air | Ceramics |
| Thermal conductivity | 430 | 84 | 0.2 | 0.04 | 0.5 to 5 |
| Temperature rise (Ir = 0.1 KW/cm^2) | 8E-03 | 4E-02 | 17.5 | 87.5 | 7 to 0.7 |
| Temperature rise (Ir = 1 KW/cm^2) | 0.08 | 0.42 | 175 | 875 | 70 to 7 |
| Temperature rise (Ir = 10 KW/cm^2) | 0.81 | 4.17 | 1750 | 8750 | 700 to 70 |

Unit symbols:
C. means Celsius
m means meter
W means Watt
μ means micron
cm means centimeter.

When a layer of metal is fully sintered just after being dispensed, the layer's structure is continuously solid, and then the relevant thermal conductivity is that cited for the metal (e.g. 430 W/(C·m for silver), and the temperature rise ΔT is as calculated in the table above (much less the 1° C.).

However, when substantially no sintering occurs at the printing stage, the layer's structure is like a pile of particles. Measurements show that nearly only half the printed volume is occupied by solid particles, while the rest is mostly air. Thus, in each direction (X, Y, Z) only 80% of the layer is occupied by solid particle (since 0.8×0.8×0.8≈0.5), and the rest of the volume of the non- or partially-sintered object is air. Thus, every layer is equivalent to a layer that includes in height of the layer 80% metal and 20% air. Since air conductivity (0.04 W/(C·m)) is substantially lower than metal conductivity (for example WC: 84 W/(C·m)) the air layer portion dominants the conductivity of the layer. Thus, when the irradiation power is 0.1 KW/cm^2, the temperature rise in this case is the temperature rise of a 5×0.2μ air layer, i.e. ΔT=87.5×0.2=17.7° C. (wherein 87.5 is taken from the second row of Table 2).

All this holds with an irradiation of 0.1 KW/cm^2, which represents an exemplary intense irradiation from a longitudinal halogen lamp. If a focusing reflector (elliptic) is used, the irradiation is more condensed by a factor of 10 (i.e. Ir=1 KW/cm^2), and then a similar calculation leads to ΔT=875× 0.2=177° C. (wherein 875 is taken from the third row of Table 2).

Higher temperature rise ΔT can be obtained at much higher power density of the radiation, for example by a linear laser beam which includes a focused line (typically Ir=6 KW/cm^2), or by a scanning focused spot laser beam including a scanning spot of irradiation (typically Ir=600 KW/cm^2), or by flash radiation (wherein high power radiation is absorbed at very short time (see typical example below)). These techniques are further described below.

Operating a flash radiation source refers to a technique where the radiation is transmitted in a very short time, e.g. 1 ms, at high power, e.g. Ir=10 KW/cm^2. In this case, the temperature rise of a non- or partially-sintered object would be ΔT=8750×0.2=1770° C. (wherein 8750 is taken from the fourth row of Table 2).

When printing thermal insulating material, e.g. oxides like SiO2, TiO2 or other ceramic material, thermal conductivity is typically between 0.5 to 5 W/(C·m) (see Table 2). If after warming the upper layer, the upper layer does not become sintered (remains un-sintered), the air layer portion conductivity is still lower than oxide layer conductivity and the air dominants the conductivity of the layer as in the case of metal particles. If the layer becomes sintered (under the flash radiation), because of the high irradiation power Ir and despite of the high thermal conductivity, the temperature rise ΔT of the layer will go up to 70 to 700° C. (see the fourth row of Table 2).

The above-described possibility to warm the new layer significantly beyond the temperature of the former layers, enables keeping the temperature of the printed object much lower than the instant temperature required to burn off the organics or to sinter the object. A fan (for example cooling fan 326) may be required to lower the temperature back to a lower object temperature.

The upper surface of the body will dissipate to the surrounding air roughly 3 W/cm^2 at a temperature of 400° C. Therefore the lamp above should supply this much power to the upper layer in order to maintaining the object body's temperature constant and even, and even larger power is required in order to compensate for the material evaporation and sintering heat consumption.

7.3. Focused Radiation

As indicated above, focused radiation may be used to obtain an instant temperature of the upper layer higher than the body temperature. In conventional implementations, a layer of dry particles is evenly spread on the preceding layer, and then focused radiation (for example, a scanning focused point (i.e. spot) laser beam) scans the layer and selectively solidifies the required portion of the layer according to a layer map.

According to one embodiment, the particles used to construct the current layer are not evenly spread (unevenly distributed) on the preceding layer, but the particles (layer) is selectively dispensed according to a layer map. This facilitates use of non-selective radiation to create a newly formed layer only where the particles have been selectively dispensed.

Refer now to FIG. 3C, a diagram of a lamp as an exemplary radiation source. Embodiments can include one or more of the following techniques:

a. Linear Lamp and Focusing Reflector

Refer now to FIG. 3C a diagram of radiation sources. A first embodiment is a hot radiating lamp 350, including a linear bulb (discussed above), including a linear radiating filament 352 enclosed a quartz transparent pipe 356, coupled with a focusing reflective surface having elliptic transection 358, enclosed in a transparent window 354 (for example, protective glass). The filament is located in one focal point 360F1 of the elliptic curvature, while the filament's hot image is obtained in the other focal point 360F2, on the upper surface of the body being printed. The width of the image can be comparable to the length of the filament perimeter (but never smaller). In a practical example the filament perimeter is equal to 1 mm, the width of the image of the filament on the 3D upper surface is 3 mm, and the radiated power is 50 W/(cm length). Hence, the irradiation power obtained at the part surface is 50/0.3=167 W/cm^2.

b. Focused Linear Coherent Beam

Refer again to FIG. 3C. A second embodiment includes a linear coherent beam 370. An appropriate laser device 372 can be obtained from, e.g. from Coherent Inc., Part No LIM-C-60. Such laser has a focal plane, which is the plane of minimal waist. A typical waist width is 50μ. A typical power of the laser is 20 W/cm. Hence, the irradiation power is 4000 W/cm^2. At such power, heat loss is much smaller than the input heat, and therefore the layer temperature can substantially exceed the body's temperature. Before the particles sinter to each other, the temperature rise of the upper layer will get to $\Delta T=1770\times 4/10=708°$ C., wherein 1770° C. is the temperature rise $\Delta T$ of the upper layer per irradiation power of 10 KW/cm^2 (due to the isolation of air between the solid particles, see preceding chapter), and 4/10 reflects the ratio between 4 and 10 KW/cm^2.

c. Scanning Focused Beam

A third embodiment includes a spot (point) coherent beam with a scanning apparatus (e.g. rotating mirror polygon). Unlike traditional 3D metal printing in which the beam is modulated on/off according to the image of the layer, the beam in the current embodiment can be "dumb" (although the beam can also be modulated according to the image, at least for saving energy). This "dumb" beam scans a line in the Y direction, while the object body moves in X direction. A typical laser power is 500 W, and focal spot of 50µ diameter. Hence, the irradiation power is $500/0.005^2=2\cdot 10^4$ KW/cm^2 (typically the difference between the area of a disk and a square is ignored for this calculation). Such irradiation power can warm the layer much above the sintering temperature of all metals and ceramic material.

7.4. Managing Chuck and Upper Layer Temperatures

As discussed above, the temperature of the upper layer is dominated by few heating and cooling sources:

a. Chuck heating elements. In one embodiment the substrate (also called tray) 318 can be firmly attached to a base plate, for example by vacuum or bolts or flexible clippers, wherein the base plate is made of thermally conductive material, and comprising heating elements, e.g. heating rods embedded in the base plate, and a temperature sensor. The base plate can also be referred to as a chuck. In at least one embodiment the substrate 318 can include a heat conducting material like aluminum or brass, and thus its temperature (as measure at its upper face) is substantially equal to the chuck's temperature. Thus, the computer controls the temperature of the substrate 318 by controlling the power of the heating elements and by the reading of temperature sensor embedded in the chuck. Alternatively, the temperature sensor can touch (being pressed to) the upper or lower surface of the substrate 318.

b. Upper heat source. A heat source 308 located above the printed layer (also called printing surface) 328 heats the layers without intimate touch. Options for heat sources 308 can include electro-magnetic (EM) radiating equipment (e.g. a vacuum bulb emitting visible and/or near I.R radiations, a far I.R radiator, or microwave, laser), hot air, etc. The heat source 308 can be in a fixed position above the printed layer 328, or travels above layer 328 like the ink dispensing head 314 does. Without limiting the breadth of the invention, the upper heat source 308 may include a radiation lamp that travels above layer 328.

c. Cold environment air. The printed body 312 and particularly the upper surface and layer 328 are constantly cooled by the surrounding air. This air is naturally cooler than the object 312 and printed layer 328. One can imagine heating the surrounding air to be comparable to the upper layer temperature, but such an embodiment is not very reasonable because of many reasons including: a need to protect the electronic and mechanical subsystems, as well as the ink dispensing head(s) 314 from excessive heat; and/or a need to pump out fumes and let fresh air emerging in as a compensation, which can increase the required heating power to warm the air. The impact of the surrounding air may be increased by extensive air flow in the printing cell brought about by the sucking action of the emerging fume from the upper layer 310 and by sucking the excess dust of the leveling roller 302.

d. Cold head(s) assembly. As discussed above, the head assembly 314 should maintain at lower temperature than of the upper layer 328. This is critical for at least the following reasons: protecting the ink dispersion from solid agglomeration and disintegration of organic components, preventing drying and clogging the ink at the dispensing nozzles, and/or protecting the sensitive head electronic and mechanical structure of the head(s) assembly 314. Since the head assembly 314 travels very close to the upper layer surface 328 (e.g. 1-2 mm), the head assembly 314 should be actively cooled to prevent overheating. Examples of cooling can include: a cooled heat shield thin plate located under the heads, comprising narrow slit(s) through which the head(s) dispense ink ("mask 316"), and thick walls at the head assembly's sides through which cooling water can flow; and/or constant flow of cool ink through the head assembly 314. This cold body that travels close to the layer surface can pump out heat from the hot layer 328 by absorbing IR radiation emitted from the layer 328, and by a heat convection through the thin air layer in the gap between the layer 310 and the head assembly 314.

e. Cold dispensed ink. The ink 322 dispensed on the upper layer surface 310 can be maintained at a cold temperature at the head(s) 314 (as mention above) and at the ink delivery system (IDS). The cold ink 322 may consume heat from the printed body 312 underneath, for reaching the required high temperature.

f. Fume release. In order to solidify the layer 310 just after dropping the ink 322, the carrier liquid component of the ink 322 is heated until evaporation. The evaporation process consumes heat from the printed body 312 underneath, depending on the latent heat coefficient of the liquid.

If the power of heating sources 308 was fixed, the temperature of the upper layer 328 would have varied along the print session, because of at least:

a. The influence of the substrate temperature on the upper temperature decreases as the distance of the upper layer (Z distance) increases, because of the finite heat conduction coefficient of the printed material b. The air in the printing cell gradually gets warmer because of the constant heating c. (on the other hand) When the height of the body 312 being printed grows up, the outer surface of the body 312 (including the side walls) gets larger, and therefore the cooling impact of the environmental air increases d. The maintenance stops along the session (e.g. 5-second stop after each 1-3 layers to maintain the head(s), or 90-second stop every roughly 30 layers to further maintain the head(s) 314 and the roller 302), have a large cooling impact on the upper layer 328 because the lamp is not operated at that time It is conceivable that the temperature of the upper layer 328 should be constant at a certain temperature (the optimal temperature) along the printing session, to optimally warming and solidifying the upper layer 310. However, a thorough investigation of this issue pointed out, that at the lower layers 328 (i.e. when only a small amount of layers have been printed), the temperature should be higher than at higher layers 328, wherein as the layer level increases in height, the temperature should approach a constant value. This is discussed below:

a. The main need of high temperature is evaporating the carrier liquid to solidify the layer 310 (additional need is liquidizing or softening the binder to boost wrapping and binding the solid particles to each other). Two factors can determine the required temperature. The evaporation rate of the liquid, and the percolation portion of the liquid into former layers underneath (a portion that only later evaporates). When only few layers have been built underneath, the liquid capacity of the layers is small, and thus the percolated liquid may overflood the built material and may harm it, causing delamination and cracks. Thus, at the low height Z of the printed body, the temperature should be higher than at high Z to reduce the percolated portion.
   b. In addition, at the lower height the substrate temperature dominates, and thus the temperature of the upper layer is constant along a layer to layer cycle (close to the substrate's temperature). At high layer level (large Z) the lamp dominates. Thus, since the lamp warms the layer burst-like (warms a given layer segment only while it temporarily travels above it), the layer temperature varies along a layer cycle, and therefore there is no definite meaning of the layer temperature. The layer temperature in this article refers to a measurement roughly 5 second after the warming-by-lamp time. At that time, the temperature reduces by approximately 10-30° C. from the time of warming-by-lamp, depending on the lamp configuration. Thus, the measured temperature at high Z may be even lower.

Another issue regarding temperature is the temperature profile of the printed body vs Z. On a first glance one may think that the temperature should be maintained constant over the height, in order to prevent mechanical stress in the body 312. However, there is a need to prevent the printed material from staying at high temperature for a long time (often a day or more), since the organic material (dispersing agent and binder) may deteriorate by disintegration or other chemical changes. Such changes in the organic material may cause delamination and cracks in the printed body, which strictly disqualifies the body.

Figure 3D:
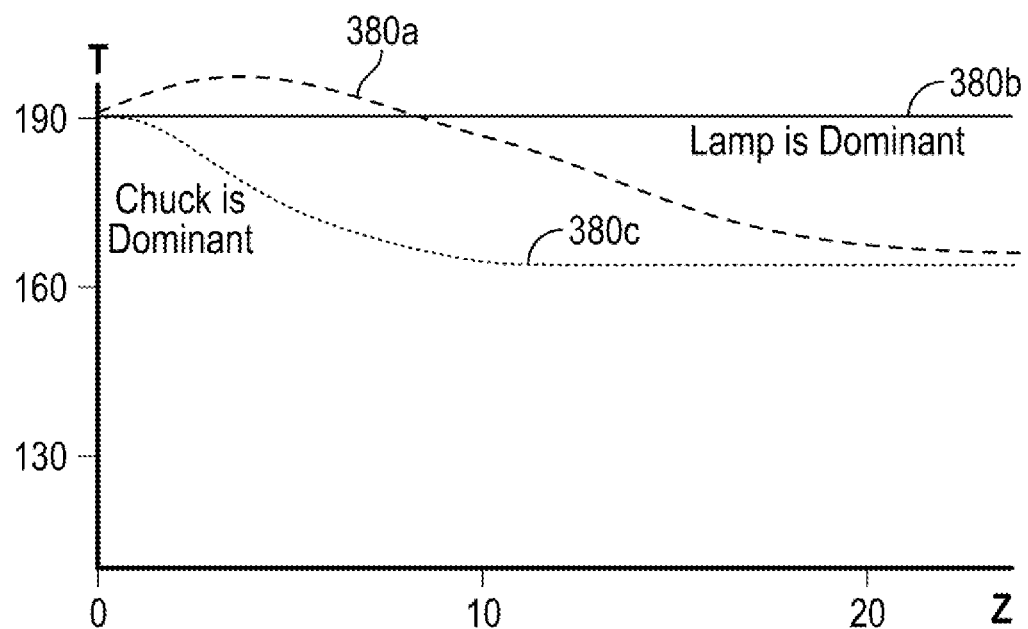
FIG. 3D is a diagram of a chart showing temperature vs. height of the substrate.
Figure 3E:
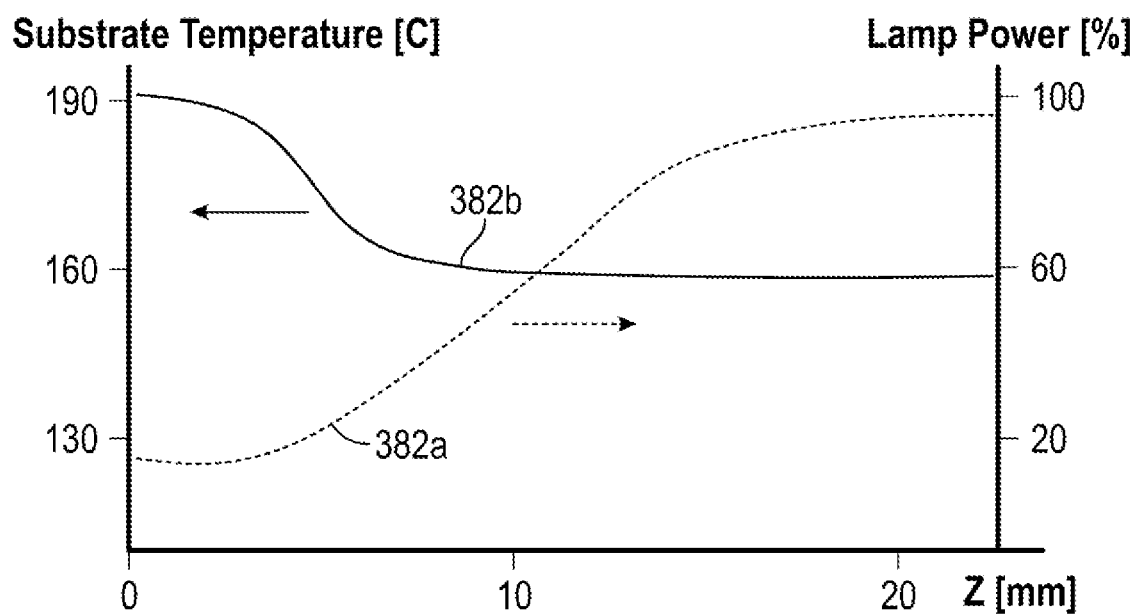
FIG. 3E is a diagram of a chart showing substrate temperature and lamp power vs. height of the substrate.

Thus, after printing the lower layers, the printer controller may gradually reduce the temperature of the lower layers by reducing the temperature of the substrate below (by reducing the temperature of the chuck), until the substrate temperature is significantly lower than the initial temperature. When this is done, as shown in graph 382b of FIG. 3E, the power of the heater 308 of the upper layers from above (e.g. the irradiating lamp or the hot air injection) may be adjusted stronger to compensate for a reduced heat flow from below to the upper layer 328, and for keeping the upper layer temperature as required, as demonstrated by the graph 382a.

Figure 3F:
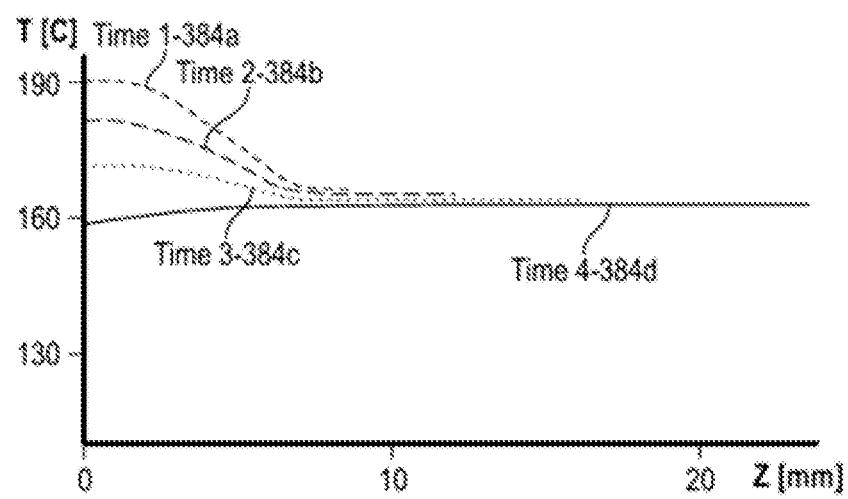
FIG. 3F is a diagram of a chart showing temperature vs. height of the substrate.

FIG. 3F illustrates the temperature profile of the printed body 312 along height Z at four different times 384a, 384b, 384c, 384d along the printing session. The temperature of the lowest layer (Z=0) reduces along the time from 190 to roughly 160 C, and the temperature of the upper layers (high Z value) approaches a constant.

One can predetermine and control the power of the lamp 308 (i.e. the upper heater or the heater from above) versus the height Z of the upper layer, to satisfy the required temperature of the upper layer vs Z. This is true as long as the printer parameters are fixed (layer thickness, printing velocity, etc.).

A more sophisticated control of the temperature of the upper layers 328 can be embodied by a control loop that controls the heating power from above (e.g. the irradiating power of the lamp 308), by the reading of a temperature sensor of the upper layer 328, to meet a predetermined temperature function of the upper layer vs. the printing height Z.

Measuring the temperature of the upper layer can be done by few ways, for example: (a) a touch sensor, that after dispensing and drying a layer, slightly touches a sample point in the layer to determine the temperature; and/or (b) an IR detecting sensor that reads the temperature at a sample point without touch, by detecting the "gray body" radiation of the layer and converting the detected intensity into temperature.

Accordingly, a few example embodiments can be implemented as following:

a. Fix (constant) substrate temperature and fix lamp power. In this case the temperature of the upper layer vs the upper layer height Z is demonstrated in line 380a of FIG. 3D.
   b. Fix substrate temperature (or gradually reduced substrate temperature vs Z, as illustrate in line 382b. of FIG. 3E) and gradually increased lamp power (the lamp starting from close to 0, as illustrate in 382a). In this case the temperature of the upper layer may be found anywhere between lines 380b and 380c in FIG. 3D. The lamp power can be modified to getting the upper layer temperature also an increasing function of Z, but this may not be considered a reasonable recipe.
   c. Controlling the substrate temperature Tsub according to a predetermined temperature function of the substrate vs the temporary height Z of the object being printed, Tsub(Z)
   d. Controlling the power of the upper heater Pup according to predetermined function of the upper layer, Pup (Z)
   e. Controlling the power of the upper heater as required to obtaining the temperature of the upper layer at height Z according to a predetermined temperature function of Z, Tup(Z) (can be done either by a predetermined power function of Z, or by measuring the actual temperature of the upper layer and controlling the lamp power accordingly)

8. Getting Rid of Fumes

Figure 4A:
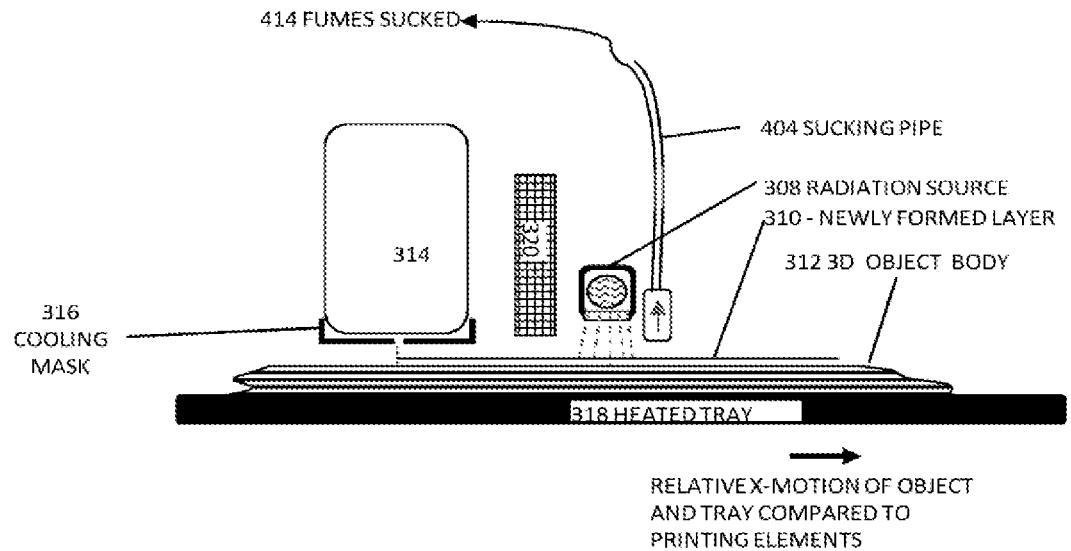
FIG. 4A is a simplified diagram of a system for removing fumes during printing.
Figure 5:
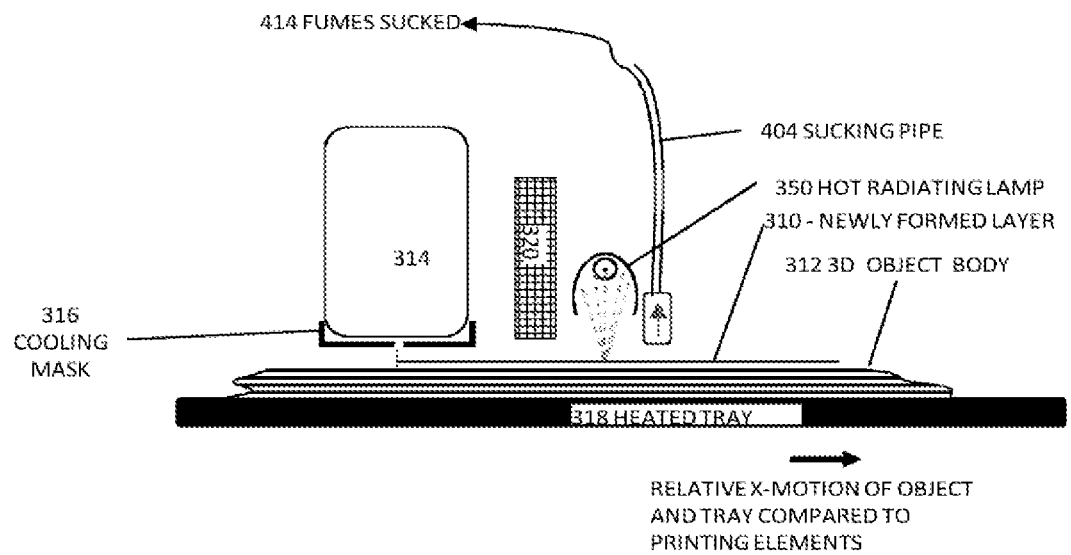
FIG. 5 is a simplified diagram of a system for removing fumes during printing using an alternative radiation source.

Refer now to FIG. 3A and FIG. 4A, a simplified diagram of a system for removing fumes during printing and FIG. 5, a simplified diagram of a system for removing fumes during printing using an alternative radiation source. Typically, during inkjet printing of a 3D object, a substantial amount of fumes emerges from the dispensed and heated ink layer, including the carrier liquid and possibly the dispersant. The fumes may be harmful to the printer parts since they can condense on relatively colder surfaces (as compared to the temperature of the 3D object 312 during printing) including surfaces such as electronic boards and parts. According to an embodiment, the fumes are collected by sucking pipe(s) 404 providing sucking 414 located adjacent to the printing head 314 and/or near the spot where the layer is further heated by the radiation source 308.

9. Sustaining the 3D Structure

In conventional technologies, glue is often added to the particle ink (e.g. photo-polymer, thermo-plastic polymer etc.). This glue material assists sustaining the 3D structure during printing, a time before subsequent hardening process (i.e. sintering) of the entire object in a high temperature oven. For example, (in a conventional process) a powder dispenser spreads solid (dry) particles over the entire tray (tray on which the object is being printed/constructed, such as heated tray 318), and a printing head subsequently dispenses liquid glue on the particles spread according to the desired content of the layer being printed. This process repeats layer by layer until the printing finishes. Later, the loose particles are removed, and the glued object is transferred from the printer to an oven. In the oven, the object is heated to a high temperature for accomplishing sintering. During the sintering process a majority of the glue fires off, however typically a portion of the glue remains. The remaining glue interferes and/or interrupts sintering if the glue does not completely evaporate in the oven. In addition, the presence of glue in an object's structure may be undesirable, as described elsewhere in this document.

A technique for avoiding problems with glue is to do sintering during printing on a layer basis, and therefore glue is not required. For example, a powder dispenser spreads particles over the entire tray, and a subsequent focused laser beam scans the spread particles according to the content of the layer. Every spot that is illuminated by the beam heats up sufficiently to sinter the powder at the illuminated location.

Figure 6A:
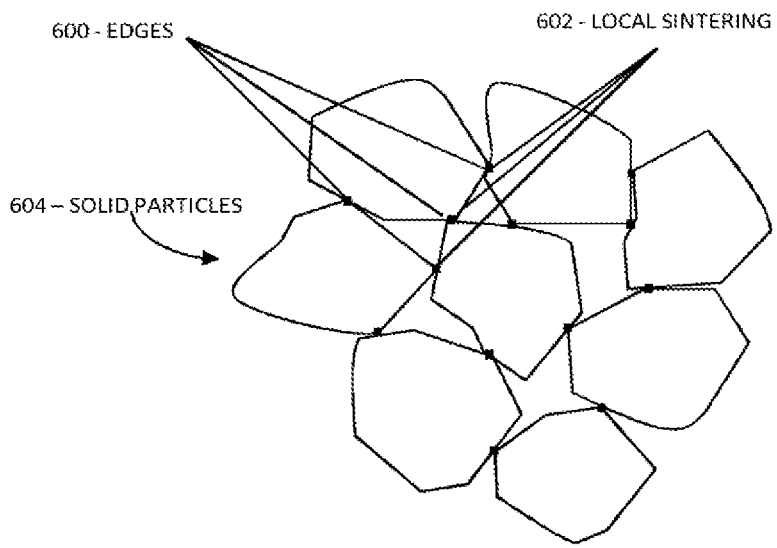
FIG. 6A is a diagram of solid particles with small edges.

According to embodiments of the current invention, the particle construction is sustained at least in part by:

a. During printing, the carrier liquid immediately evaporates, and the particles attach to each other by the dispersant molecules that surround each particle. In this case, the dispersant is chosen to have not only the attribute of separating the particles from each other in the ink dispersion, but also attaching to each other when the carrier liquid (solvent) is removed. Using conventional terms, the dispersant here plays the role of a binder. Often the dispersant is a polymeric molecule that has good adhesion properties.

b. When the complete object is heated in an oven, the dispersant molecules firstly evaporate and then initial sintering takes place to hold the particles together until complete sintering.

c. Refer now to FIG. 6A a diagram of solid particles with small edges. A well-known characteristic is that small particles sinter at a relatively lower temperature than large particles (e.g. 50 nm size WC particles sinter at 800° C. compared to 700 nm particles that sinter at 1400° C.). In this context, small is compared to large where the difference between small and large is sufficient to result in an apparent difference in sintering temperature for the desired application. In cases where sintering starts at a much higher temperature than that of the dispersant's evaporating, the solid particles 604 are chosen, or made, not regular, i.e. irregular/including sharp edges 600, i.e. edges that are characterized by small round radii as compared to the overall radius of the particle. Such edges have the property of locally sintering 602 at a reduced temperature (as compared to the higher sintering temperature for the bulk of the particle) as much as particles made with such small radii have.

Figure 6B:
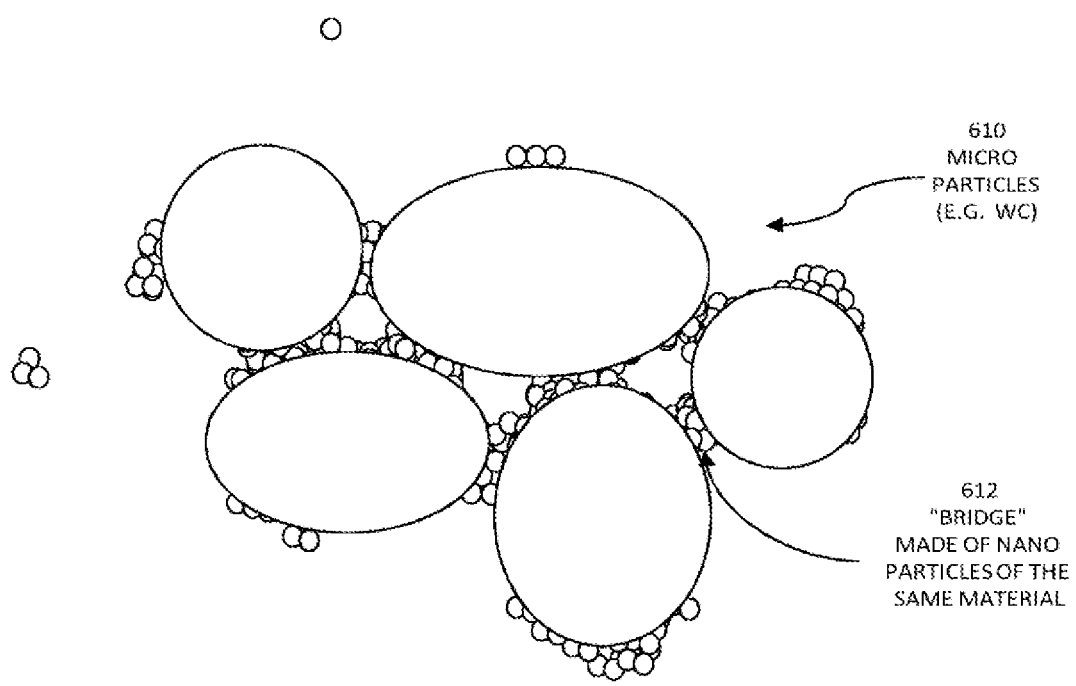
FIG. 6B is a diagram of solid particles with bridged sintering by smaller particles.

Refer now to and FIG. 6B a diagram of solid particles with bridged sintering by smaller particles. In addition, the preparation of the solid particles 610 can includes a fraction of much smaller particles 612 than the average size of the main (larger) particles (e.g. 50 nm size when the average size is 700 nm). These smaller particles will sinter at a lower temperature (e.g. 800° C. as compared to 1400° C.), and partially stick the large particles to each other by a "bridging" structure.

Thus, once the dispersant fires out, some initial sintering takes place in the points of intimate touch between the sharp edges of the large particles or due to the "bridging" effect by the small particles between the large ones. Note that this partial sintering is located in small points between the large particle, and therefore the bulk structure remains porous so that the fired dispersant can flow out of the material.

10. Getting Rid of Organic Material

The ink contains carrier liquid, dispersing material, and possibly more than one additive that participate in perfecting printing, all are often organic material. As described above, a desired feature is to get rid of this organic material as soon as possible, or at least before final sintering.

In one embodiment, the carrier liquid substantially evaporates during the formation of the layer and thus the layer becomes solid. This is accomplished at least in part by maintaining a relatively high temperature of the body of the 3D object (or at least the upper layers of the 3D object). In this case, the high temperature is a temperature kept at a temperature comparable to the boiling point of the liquid carrier or higher. In some embodiments, the high temperature can be 20% more or less than the boiling temperature of the carrier when the temperature is measured in Kelvin.

In another embodiment, the temperature of the upper layer is sufficiently high to also burn out other organic material(s), particularly the dispersing material (dispersant), during the formation of the upper layer. When a body (body of an object being printed) is large (for example X, Y, Z dimensions=100 mm) this burn off is normally necessary. If the organic material is not burned off during printing, then the organic material remains during printing, and during firing the organic material has difficulty flowing to the outside of an already printed large object.

In another embodiment, the dispersant remains in the bulk material during printing. In conventional terms, when the organic material (which plays the role of a binder) remains in the printed object, the object is referred to as a "green object". In this case, after printing the object, but before firing the object, an extra stage of initial heating is performed usually in an oven. In this initial heating stage the organic material (whether disintegrates or not) slowly flows out to the object's outer surface, and evaporates. This initial heating is done before elevating the firing temperature to a temperature where full sintering occurs. A desirable feature is to prevent complete sintering of the object particles during the stage of organics extraction. This is desirable for reasons including:

a. not blocking the paths from which the organics flow out of the bulk material, and b. not preserving the sponge-like lattice of material that prevails before the organic material is extracted.

Preventing complete sintering in the stage of organics evaporation can be done by adjusting the particles' characteristic temperature T3 of sintering (depending on particles material and size) or by choosing the organics (dispersant and additives) with appropriate burn out temperature T2, so that T3>T2.

11. Partial Sintering During Print

Partial sintering during printing can strengthen the newly formed layer before leveling, or (as explained above)

strengthen the object before removing the object from the substrate, and/or prior to firing the object (in an oven). In the context of this document, the term "partial sintering" generally refers to particles melting to each other only partially, that is at one or more locations on the surface of each particle without the complete surface of the particles contacting surrounding particle surfaces.

In one embodiment, partial sintering of an object body is obtained during printing of the object. Partial sintering can allow subsequent firing and removing dispersant, even when firing of the dispersant is done after completing printing the object, because the open porous structure is still there.

In another embodiment, complete sintering of an object body is obtained during printing of the object. Since the dispersant can inhibit sintering, this method includes first evaporating the dispersant during the layer formation at temperature T2, and afterwards complete sintering takes place temperature T3, wherein T3>T2.

Figure 7:
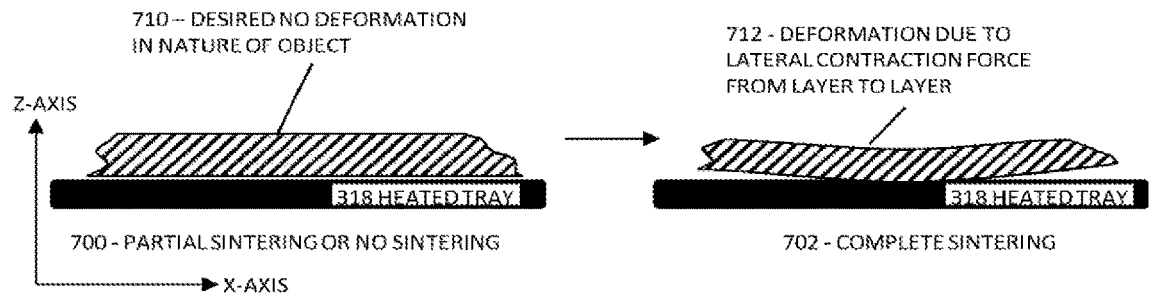
FIG. 7 is a diagram of partial sintering.

Refer now to FIG. 7, a diagram of partial sintering. During sintering objects typically contract since the particles move closer to each other and fill voids in-between particles. In most cases, this contraction of the object being sintered is substantial (e.g. 20% in every dimension). Because the newly formed layer is typically very thin (e.g. 5 micron before contraction) as compared to the lateral dimension (X-Y) of the object (e.g. 50 mm), the friction of the newly formed layer with the former (previously) printed and dried layer diminishes the contraction in X-Y plan, and the vast contraction accomplished only in the bottom direction, i.e. towards the preceding layer that has already sintered. Yet the capillary force that acts to contract also in the layer plane (i.e. in X, Y directions), which is balanced by the aforementioned friction, introduces lateral contraction force in the layer. This force repeatedly from layer to layer during complete sintering 702 may cause deformation in the nature of the object 712. On the other hand, partial sintering 700 can be enough for holding the particles together and yet not introducing too large contraction force in the (newly formed) layer. Thus, partial sintering facilitates maintaining a desired nature (shape) of the object during printing 710.

Sintering temperature should be considered carefully for enabling partial sintering. At high enough temperature, the particles melt to each other and form a nearly or fully solid material (complete sintering). The required sintering temperature substantially depends on the melting point of the particles' material and the size of the particles. For example, the melting point of silver is 960° C.; 1 µm (micrometer) silver particles sinter at 800° C., but 20 nm (nano-meter) silver particles sinter at 200° C. So in order to do partial sintering of an object made of silver particles, if 1 um particles are used, the newly formed layer can be warmed for example to 500° C., a temperature in which the organics are fired off and partial sintering replaces the organic material to hold the object from being dismantled.

12. Complete (or Sufficient) Sintering at a Layer Level

The dispersant (and possibly other additives in the ink) can interfere with the desired quality of sintering, and thus removing these materials (the dispersant and possibly other additives) can be important for obtaining sintering (but not necessarily sufficient for obtaining sintering). For simplicity in the following discussion, one skilled in the art will understand that references to dispersant can also refer to possibly other additives.

In contrast to printing at a moderate temperature (e.g. 230° C.) and only later sintering the complete body in a high temperature oven, the innovative technique of complete sintering when printing a layer includes features such as:

a. Getting rid of dispersing molecules and additives just when the upper layer (at a temperature T2) is in touch with the open air. When evaporating the dispersant is done in an oven, the resultant gases have difficulty defusing through the bulk material, especially when part of the object can be at least partially sintered. At this point note that the outer envelope of an object in an oven sinters out before the bulk completely sinters. This is mainly because that the heat flows in the oven from the outer envelope towards the center of the object, and this must be accompanied with a temperature gradient—higher temperature at the envelope than in the bulk. So well before the bulk is sintered the envelope sinters, and the gas cannot go out of the object.

b. Further heating the layer to a temperature T3, so as to encouraging sintering, wherein contraction, which accompanies sintering, takes place in the down (Z-axis) direction rather than in lateral X-axis and Y-axis directions (as explained above). Contraction in the Z-axis direction can be taken into account before printing (a priori) and compensated for during preparation of the digital description of the printed object.

Note that sintering at a layer level, not only presents an easy way to get rid of the organics, but may also save the need of energy and time consuming following firing in oven Techniques and features of layer-by-layer dispersant removal include the following:

a. Heat

Extra heating of the new layer by focused radiation or by a high power flash light, e.g. both at Ir=5-10 KW/cm^2 can be used to accomplish evaporating of the disturbing materials (such as dispersant), and also heating the upper layer to as high temperature as required for sintering the layer. At the layer instant high temperature brought about by the intense radiation, not only the carrier liquid is evaporated, but also the dispersant evaporates or disintegrates and evaporates, and later full or sufficient sintering takes place. Usually this technique is done by dispensing the new layer on a moderately warm preceding layer, such that the carrier liquid is evaporated before entering the extra heating device, reducing thereby the required energy in the device for evaporating both the carrier liquid and the dispersant, and accomplishing sintering.

b. By Additional Catalyst

Printing a layer can be accompanied by dispensing catalyst material, which accelerates sintering. A preferred embodiment includes material that disintegrates the dispersant molecules, so that they evaporate out or at least do not disturb sintering. Furthermore, added heat can be used to evaporate out the disintegrated molecules. The bare solid molecules left after removing the dispersant spontaneously sinter at this stage to each other, given that the temperature is high enough. For example, if the solid particles are silver particles of 20 nanometer diameter, a temperature as high as 200° C. is sufficient for complete sintering, given that the dispersant has removed. The catalyst can be dispensed after or just before dispensing the model layer.

Figure 8A:
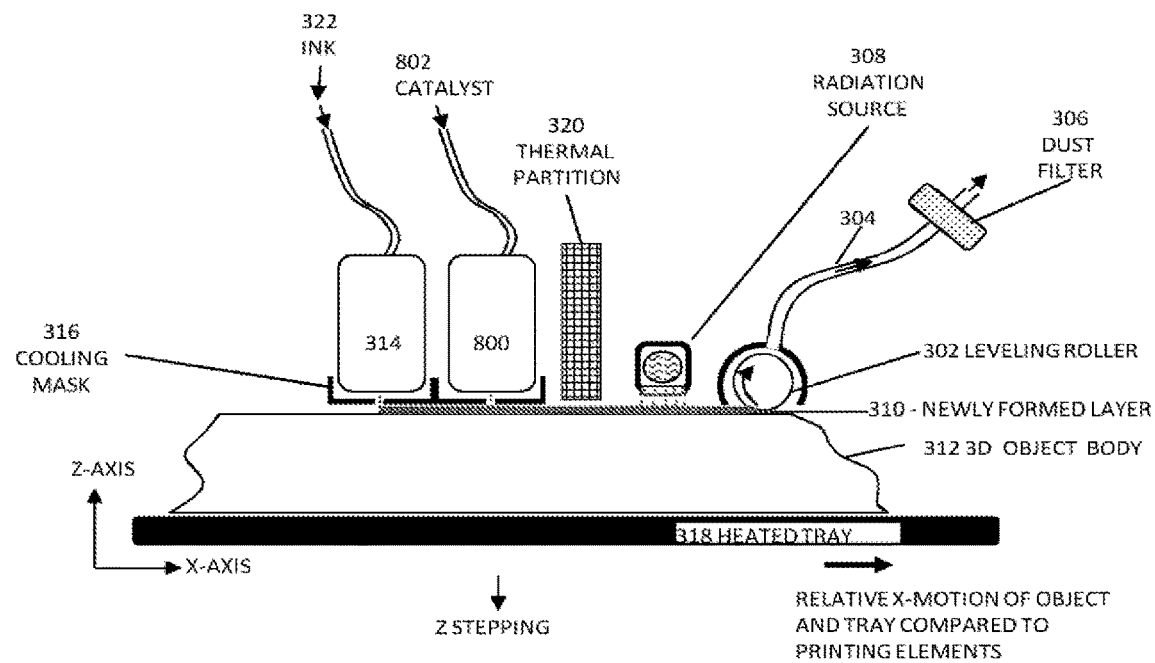
FIG. 8A is a diagram of dispensing catalyst material.

Refer now to FIG. 8A, a diagram of dispensing catalyst material. Dispensing the catalyst 802 can be done by a catalyst droplet jetting head 800 or by spray nozzle. The catalyst can be dispensed selectively according to the object layer image, or "blindly" on the entire reserved area for the object. The catalyst can come in liquid form or gas. Optionally, the catalyst can be dispensed by a roller that spreads the catalyst over or under the new layer being printed. When the catalyst has the quality of becoming aggressive (active) only at high temperature, the catalyst can be included in the ink beforehand, and then heated with the layer heating after printed, when activation is desired.

13. A Different Printing Technique

Figure 9:
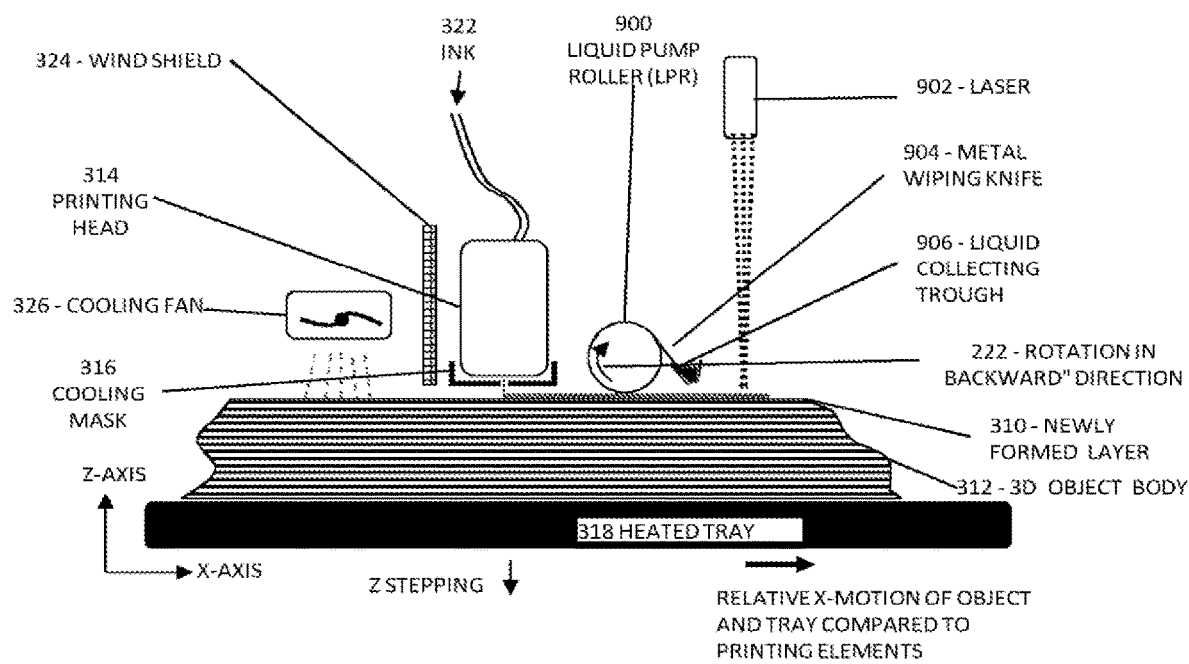
FIG. 9 is a diagram of using a liquid pump roller.

Refer now to FIG. 9, a diagram of using a liquid pump roller. An alternative embodiment of printing, leveling, and heating, includes printing layer by layer while the temperature of the printed body is substantially smaller than the boiling temperature of the carrier liquid (e.g. 150° C. when the boiling temperature of the carrier liquid is 230° C.). After printing a layer, the layer is flattened (leveled) by a liquid pump roller (LPR) 900. An LPR is typically a smooth roller with an axis parallel to Y-axis of the object, rotating in "reverse" (opposite the relative X-axis motion of the object). Then the newly formed layer 310 is irradiated by a high irradiation power beam (for example laser 902) to at least evaporate the liquid and solidify the layer (e.g. warming the layer to a temperature of 230° C. or higher). Later on, before dispensing the next layer, the layer is cooled to the low object temperature (e.g. by a cooling fan 326). The excess ink from the flattened layer attaches to the rotating roller surface of the LPR 900, and is wiped by the roller wiper (for example by metal wiping knife 904), and flows into a collecting trough 906, from which the excess collected ink is cycled back to an ink tank for re-delivery to the printing head 314 or pumped out to a waste tank.

14. Protecting the Jetting Head and the Jetted Droplets

Printing a hot 3D object body presents difficulties when using an inkjet printing technique. The jetting nozzles are positioned close to the printed layer, e.g. 1 mm apart. Thus, the nozzles may heat up by the warm upper surface of the body being printed, and the jetting quality injured. Techniques to prevent nozzle heating may include a cooled shell (see FIG. 3A, cooling mask 316) that behaves as a thermal buffer between the hot layer and jetting nozzles. One such cooled shell is described in patent International publication No WO2010/134072 A1 to Xjet Solar Corporation.

Usually there is a desire to have the 3D body temperature (including the upper surface) not high (relatively low), because despite of the protecting mask, some heat still gets from the hot body of the object to the nozzle plate of the head through a slit in the mask through which the ink is jetted. Moreover, another difficulty with printing on hot objects lies in the possible "explosion" of the jetted droplets when touching the warm surface. In this case, the term "explosion" refers to the carrier liquid abruptly boiling rather than slowly evaporates.

An innovative solution is differentiation between the body (object) temperature and the temperature of the new layer. This can be accomplished by the following steps:
 a. heating up the newly formed layer to a higher temperature than that of the body immediately after the layer being dispensed (e.g. by a focused radiation), and
 b. cooling the upper surface before dispensing a new layer on the upper surface of the 3D body object. Cooling can be done with the aid of a fan (see FIG. 3A cooling fan 326) or by dissipating the heat stored in the layer to the object below and to the surrounding air.

15. Plural (Composite) Object Material

Figure 10A:
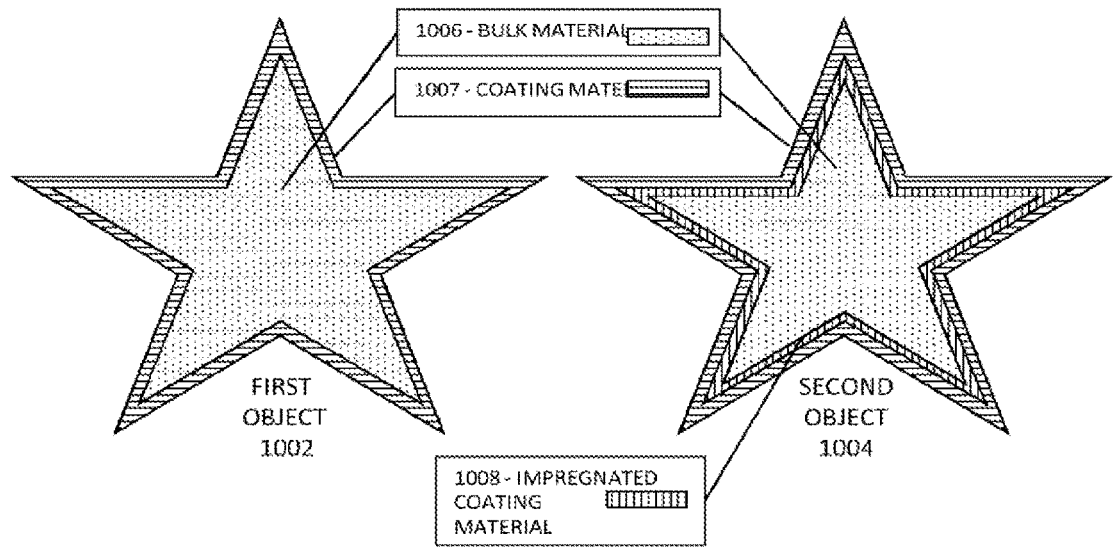
FIG. 10A is a diagram of objects built with different materials.

Refer now to FIG. 10A, a diagram of objects built with different materials. Often the required object includes different materials in different parts of the object. A special and important case is when the bulk material 1006 of a first object 1002 should be laminated (coated) with a coating material 1007 at an outer surface of the first object 1002. Similarly, the bulk material 1006 of a second object 1004 can be laminated with a coating material 1007 at an outer surface of the second object 1004.

Figure 10B:
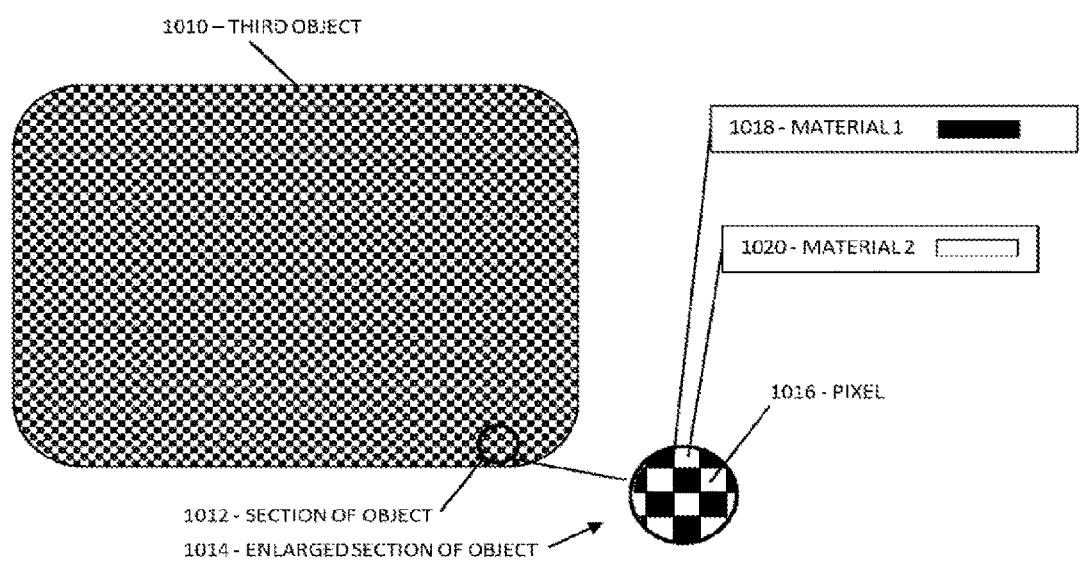
FIG. 10B is a diagram of objects built with a mix of materials.

Refer now to FIG. 10B, a diagram of objects built with a mix of materials. Requirements for a third object 1010 include a mix of two or more materials required either over the entire object or over part of the object. In the current diagram, third object 1010 includes a mix of a first material (material 1 1018) and a second material (material 2 1020). When a section of the object 1012 is enlarged 1014, the mix of materials can be seen in that each pixel 1016 is an alternating material.

One technique for printing an object with a mix of materials in a given location of a layer can be done by dispensing one material in certain pixels of the layer and another material in other pixels.

In an alternate technique, one layer is printed by one material and another layer by another material. A special case is impregnation-like of a coating-like material 1008 at the outer surface of an object (for example, second object 1004). The impregnation-like can include a gradual decrease of the proportion of impregnating material and bulk material as the distance from the object surface increases.

A plurality of inks and ink heads can be used to differentiate printing between object material and object support. According to an embodiment, one ink can be used to build both the object and support structures (layer by layer), while another ink is dispensed only on the layer part that belongs to only one of the object or support, introducing thereby a difference in a mechanical attribute of both materials. This difference is used later when the support is removed from the object. For example, a first ink including Ag particles is used to print both object and support portions of a layer. A second ink including Ag polymeric compound material or particles dispensed only in the object portion of the layer. When printing finishes, and after the printed complex has been fired in an oven, a substantial difference is introduced between both materials (the support of only Ag particles stays un-sintered, while the object is sintered or at least formed of a solid matrix of Ag in polymeric compound. This difference enables removing the support from the object.

16. Printing the Object with a Mold

In one embodiment, a mold is printed together with an object. A mold is any auxiliary body that is attached to the object body 312 and can be removed from the object body. In the context of this document, a mold can be considered support for the object, as described below. The mold can be printed by a different ink than the bulk in the same layer-by-layer printing. Printing an object and a mold facilitates the object including particles that do not adhere (are unattached or only lightly adhere) to each other until the body is fired and sintered in an oven (at typically 600 to 1500° C.). For this sake, the mold preferably includes material that holds tight at a low temperature and disintegrates at high temperature, or at least can be removed from the object. The mold can also protect the object during printing. For example, the mold protects the delicate edges of the object 312 from breaking while the cutting roller 302 levels out the printed layer 310. Even if the mold's material does not hold tighter (holds looser) than the object's material, yet the mold protects the object's edges while scarifying the mold's own edges through, for example, when leveling the new layer or transporting the object after printing to the firing oven. The mold can be thin (e.g. 0.5 mm thick), and can get the shape of a skin around the object or part of the object. Thus, the object (and simultaneously the mold) can be printed embedded in a mold, expanding the range of materials and processed available for creation of 3D objects.

An example of this technique is an object ink that includes particles of high hardness (e.g. WC) wrapped with a dispersant. At relatively low temperature (e.g. 200-400° C.), the dispersant behaves like a glue that holds the particles together. At medium temperature (e.g. 400° C.), however, the dispersant evaporates and the 3D object may fall into a pile of particles. If the object is surrounded with a material that partially sinters at 400° C. but melts or disintegrates and evaporates at above 800° C. (e.g. a mold ink including polymeric particles that evaporate at 800° C.), the mold stays solid at and above a medium temperature, allowing evaporation of the object's dispersant, until at higher temperature (e.g. 700° C.) partial sintering of the object takes place.

17. Support

When an object is placed on a printing tray in an arbitrary orientation, a positive or negative angle can be specified per every spot on the object's surface, as follows: If an object material is found just under the spot, the surface angle is specified positive. Otherwise, the surface angle at that point is specified negative (a negative angle or negative tilt of the object). In other words, a negative angle is an area of an object that while being built lacks a portion of the object immediately beneath the area being printed.

Figure 11A:
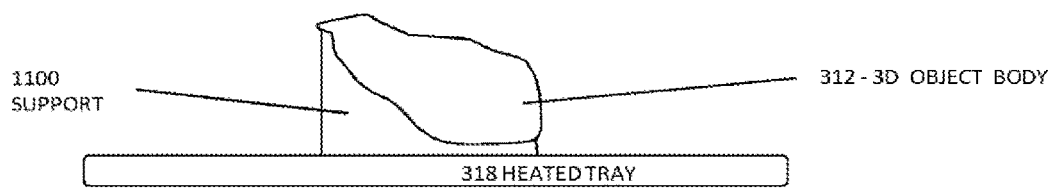
FIG. 11A is a diagram of support when building a 3D object.

Refer now to FIG. 11A, a diagram of support when building a 3D object. Supporting negative angles of the 3D object can be critical for 3D printing. The support 1100 material should differ from the object 312 material in a way that the support material can be removed after printing or after following steps like sintering, without deteriorating the object. The support may need to fulfill many additional requirements, including being easy to remove, hardly mixing with the model material at the touch interface line, low cost, self-sustained, and compatible with the printing technology (inkjet), etc.

Since printing is done by inkjet technology, the printer typically includes at least two printing nozzle groups (often two printing heads), one jetting object material, and one support material. Each layer being printed may have zero, one, or multiple portions of the layer that are desired in the final object, referred to as "object portions" of the (current) layer. Similarly, each layer may have zero, one, or multiple portions that are not desired (undesirable) in the final object, referred to as "support portions" of the (current) layer. The support portions are generally used as support, molds, or other structures to assist during production of the object, but are removed and/or lacking in the final object. As described above, other techniques can be used to print the object portion and support portion of the layer being printed (for example, for the object portion using a first ink and for the support portion using a combination of first and second inks). In the context of this document, the object portion of the layer being printed is sometimes referred to as the "object layer" and similarly the support portion of the layer being printed is sometimes referred to as the "support layer". In the context of this document, references to support can also include reference to the ink used to create the support (support ink) and to the portion adjacent to the object (that either supports the object in the gravitational sense, or surrounds the object for any purposed, including to serve as a mold) (support portion). For simplicity, the current description will use the current example of at least two printing heads. Based on this description, one skilled in the art will be able to apply the current methods to other implementations.

Figure 11B:
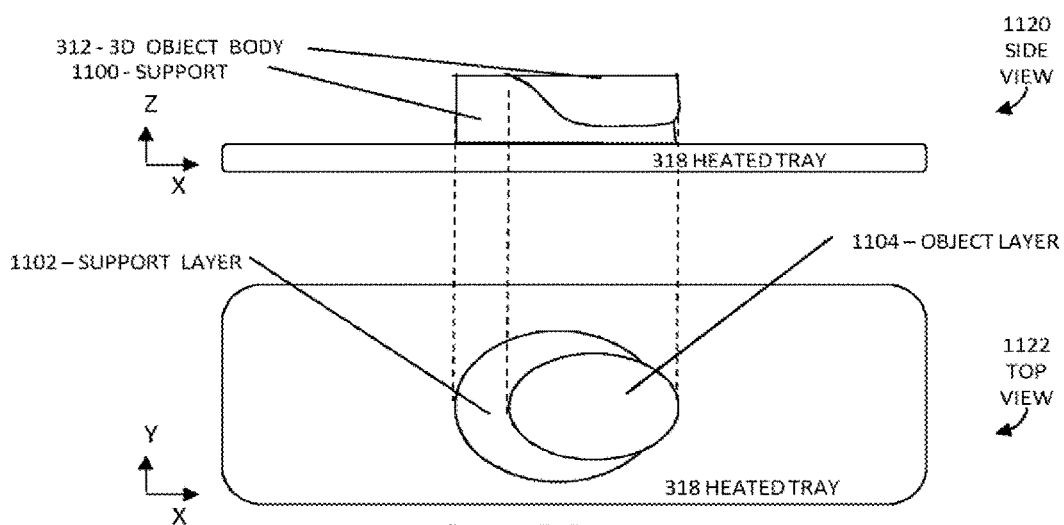
FIG. 11B is a diagram of printing support portions and object portions of layers.

Refer now to FIG. 11B, a diagram of printing support portions and object portions of layers. A side view 1120 shows the 3D object 312 and support 1100 during printing. A corresponding top view 1122 shows the upper layer. Each layer can include a support layer adjacent to an object layer. In this case, the upper layer includes a portion that is support layer 1102 (building support for subsequent object layers), and a portion that is object layer 1104 (built on top of preceding object and/or support layers).

According to a first embodiment, the support includes inorganic solid particles (e.g. high melting temperature particles like oxide, carbides, nitrides, metals, e.g. Tungsten) or organic particles (e.g. hard polymers) dispersed in a volatile carrier liquid. The polymeric material should be hard because otherwise the polymeric material can be difficult or not possible to grind (to micro particle size). After printing a support layer, the liquid carrier evaporates, leaving a solid laminate behind. When the object printing is finished, the object is supported or even wrapped by the support material. Considerations in choosing and preparing the inks take care of establishing a substantial difference in the adherence between the particles of the object (cohesiveness) and of the support. This difference can show up just after printing, or later after partial or complete firing. The difference can be a result of a difference in the dispersant attributes (e.g. different gluing characteristics between the solid particles), or a difference in the sintering tendency of the solid particles to each other. Typically, the support structure should be softer or more brittle or more miscible in water or solvents then the object, and therefore ready for being removed from the printed object. An ideal support is such that during firing the support disappears, e.g. by or disintegration and evaporation.

According to a second embodiment, the support includes solid material dissolved in a volatile liquid. After the liquid evaporation, a solid laminate is left behind to form a solid support.

According to a third embodiment, the solid support material after printing is soluble in a post treatment liquid. Thus, after completing printing the 3D object and support, the object and support can be immersed in the post treatment liquid such as water or light acid, to remove the support by dissolution.

According to a fourth embodiment, the solid support material is such that the solid support material evaporates or is burned during the firing process. An example is dissolved wax in an organic solvent, or dispersed particles of polymer in a dispersing liquid. The solvent or dispersing liquid evaporates off layer by layer during printing (at, for example, 200° C.) and the wax or polymer hardens. After printing, the object with the supporting body is fired in an oven, preferably in vacuum. At 550° C., (for example) the wax evaporates and disappears, and the same thing with the polymer at 700° C.

An example of the second and third embodiments is using salt (e.g. NaCl—Sodium Chloride, also known as table salt) solution in water. After the water evaporates, a solid support is left behind. After completion of printing, the object can be immersed in water and the salt is dissolved away.

Another example of support material is a dispersion of Zinc oxide (ZnO) particles dispersed in a solvent with the presence of an organic dispersant. After completion of printing and/or firing, the dry ZnO particles can be removed by applying moderate force (in this example we suppose that the ZnO particles do not sinter to each other). Another option is immersing the object in strong acid (e.g. HNO3) and the Zinc dissolved away (ZnO+2HNO3=Zn(NO3)2+H2O).

An alternative of the former example is a mix of oxide particles and dissolved salt in a carrier liquid. After printing (when the support dries), the object and support are immersing in water or acid liquid, the salt is dissolved by the liquid and the oxide particles stay as a pile of loose dust.

Another example of support material is a dispersion of Silica (SiO2). Silica is a readily available and relatively inexpensive material. When the dispersion is dried, the remaining silica particles are only loosely attach to each other even after warming to 700° C., and therefore the supporting body of Silica can be removed from the object.

An example of such a Silica dispersion is Aerodisp G1220 by EVONIK Industries, including SiO2 particle of an average diameter of 12 nm, dispersed in ethylene glycol and Degbe (Di-ethylene Glycol Butyl Ether) solvents.

Another example of support material is a dispersion of Calcium sulfate. Calcium sulfate is common material used for many applications such as gypsum board, plaster, and even as a food additive. Calcium sulfate is an inorganic salt that is water miscible, enabling removal of this support material by washing in water after printing and/or firing. Calcium sulfate ink can be prepared by the following steps:
  a. Solid Anhydrous Calcium sulfate (CaSO4) is grinded in an agitator mill in Glycol Ether solvent with a combination of ionic and acrylic dispersants to form a stable dispersion that passes a 3 μm mesh filtration.
  b. The dispersion is further diluted by added Glycol Ether according to the required solid content of the ink.

18. Reinforced Support and Pedestal

Figure 11C:
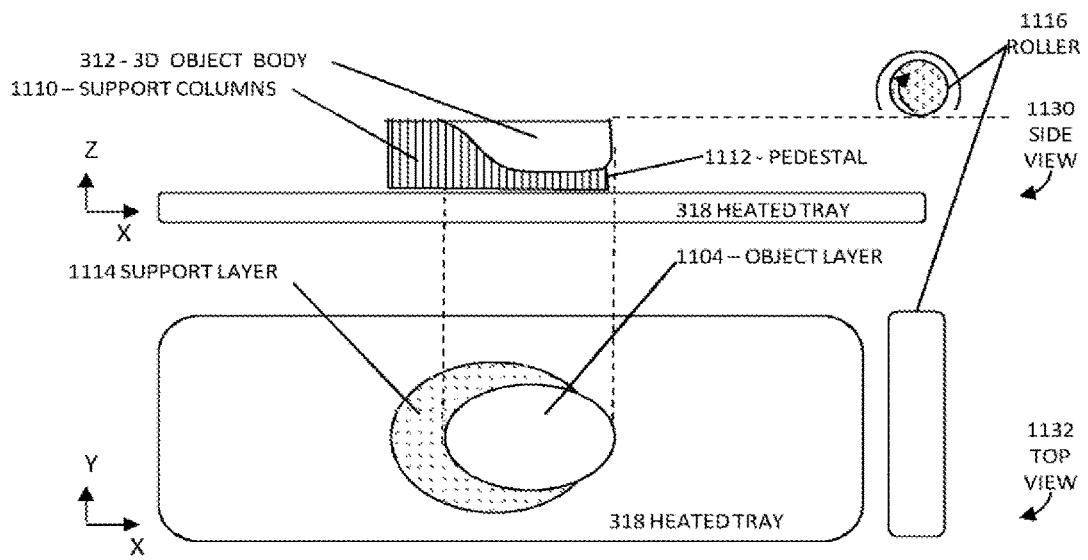
FIG. 11C is a diagram of using reinforcing support columns.

Refer now to FIG. 11C, a diagram of using reinforcing support columns. A side view 1130 shows the 3D object 312 and support columns 1110 during printing. A corresponding top view 1132 shows the upper layer. The view of the upper layer includes a portion that is support 1114 (building support for subsequent object layers), and a portion that is object layer 1104 (built on top of object and/or support layers). In cases where the support 1100 material does not stick well to the tray 318 below or to the object 312 above (and or below), reinforcement may be added, preferably by adding columns 1110 of object material.

In cases in which the object is attached too strongly to the tray, a pedestal 1112 including support can be added even under the lower surface of the object. In the context of this document, the pedestal can include all support layers (either reinforced or not) that are lower than the lower object layer. The pedestal 1112 can assist also obtaining proper and accurate Z-axis dimension of the 3D object. This is achieved at least in part by printing layers of support-pedestal to such a height (in Z-axis direction) wherein the leveling apparatus (such as roller 1116, similar to leveling roller 302) completely touches the pedestal 1112 and flattens the pedestal. Subsequently, printing of object and supporting material takes place on top of the leveled pedestal.

19. Complete (Final) Sintering in an Oven

After completion of printing, the object is typically placed in an oven where the object is fired to the required temperature until complete sintering occurs. This final (complete) sintering stage can include the following steps:
  Initial warming to burn out all organic material.
  Further warming to liquidize inorganic additives (like Cobalt).
  Final warming to sinter the particles in the liquid phase.
Part of the firing steps can include applying vacuum, applying pressure, adding inert gas to prevent oxidation, and adding other gases that may add desired molecular diffusion or chemical reaction with the body, as described elsewhere in this document.

20. High Throughput

Figure 12:
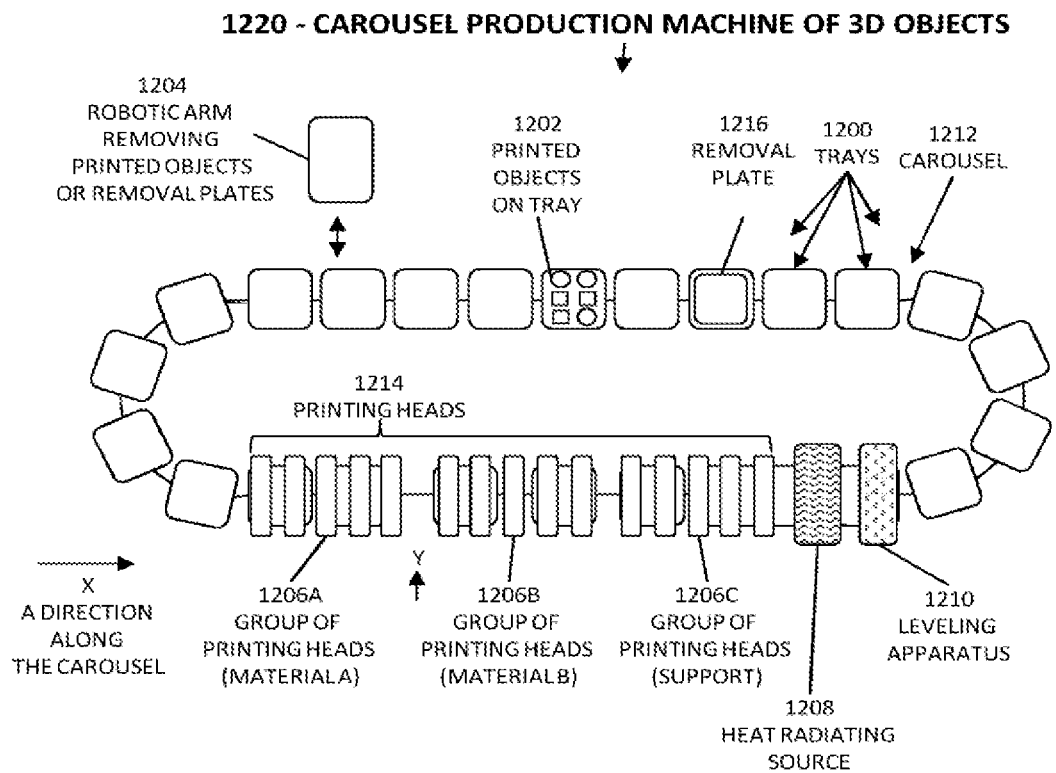
FIG. 12 is a diagram of an exemplary carousel machine for production of 3D objects.
Figure 18:
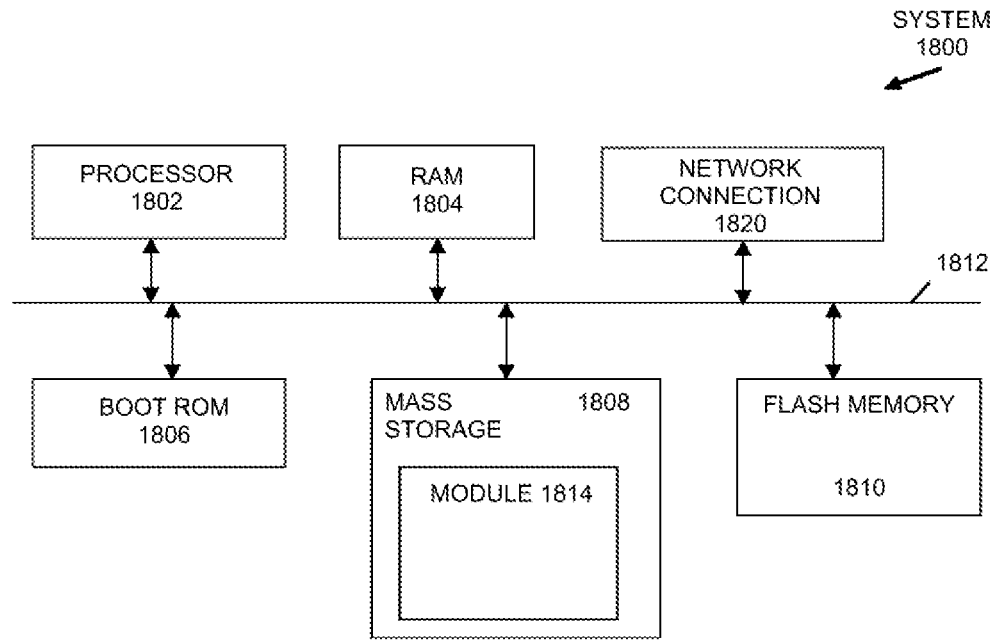
FIG. 18 is a high-level partial block diagram of an exemplary system configured to implement a controller for the present invention.

Refer now to FIG. 12, a diagram of an exemplary carousel machine for production of 3D objects. 3D printing is typically characterized by low output because each object is typically constructed from thousands of printed layers. A plurality of chucks 1200 of a carousel production machine for 3D objects 1220 can be used to increase the production throughput of 3D objects (such as 3D object 312)

According to an embodiment, a 3D production machine 1220 will preferably include a plurality of printing (preferably inkjet) heads 1214 and a plurality of chucks 1200 so as to enable production of many objects in the same run by many printing (jetting) heads. Multiple printing heads can be grouped into a group of printing heads (1206A, 1206B, 1206C). Many and different parts (exemplary 3D objects 1202) may be printed on each chuck. Every object passes multiple times (cycles) through the printing section (under the printing heads), wherein each time adds one or a few layers. As each object is typically constructed from thousands of printed layers, typically thousands of cycles are necessary. In a case where each cycle includes multiple printings from a plurality of printing heads, the number of cycles can be reduced from thousands to hundreds or less. Based on this description, one skilled in the art will be able to determine how many heads and cycles and trays 1200 are necessary for constructing specific plurality of objects.

The plurality of heads is arranged in the Y-axis direction and are shifted in Y direction from each other so that respective nozzles of the plurality of heads are staggered to fill completely a layer's surface in one pass. More printing heads than required for filling one layer can be used, e.g. to print more than one layer in a pass. Heads for different building material can be employed. For example, a first group of printing heads 1206A is configured for printing a first material (material A) and a second group of printing heads 1206B is configured for printing a second material (material B). Heads for support material can be employed. For example, a third group of printing heads 1206C configured for printing support material. Optionally, a heat-radiating source 1208 (such as radiation source 308) from above the printed layers follows the deposition of the layer(s) in a pass (i.e. a cycle). Additionally and optionally, a leveling apparatus 1210 (for example, leveling roller 302) can be included in the carousel's cycle, typically after the printing heads.

When an object is finished printing, a robotic arm 1204 can remove the completed chuck 1200 from the carousel 1212 or remove object(s) 1202 from a chuck 1200, and send the object to further production steps (e.g. firing) without stopping the carousel rotation. Note that from layer to layer each tray shifts a little lower in Z direction, so as the last printed layer is brought to the height appropriate for the leveling apparatus to shave the upper surface of the dried layer. In a preferred case where the chuck 1200 stays on the carousel 1212, when all parts from a chuck have been removed, the chuck Z level (height) is controlled to an initial position, and the machine would start printing a succeeding group of parts.

An alternative implementation is to initially load a removal plate 1216 on each chuck 1200, on which the one or more objects 1202 are later printed. In this case, the chuck 1200 is fixed to the carousel which holds the removal plate 1216. When all the objects 1202 on the plate 1216 are printed, the robotic arm 1204 removes the removal plate 1216 and sends the removal plate with the objects on the removal plate to a follow-on stage, such as the firing stage. The removal plate may include a thin metal plate, or, if a temperature higher than typically 900° C. is used in the firing stage, a carbon plate. The plate may be held on the chuck by a vacuum force or by holding "fingers" around the plate.

The portion of the carousel 1212 track under the printing heads 1214 should preferably be straight. The heads should move in Y-axis direction once a carousel cycle to perform "nozzle scatter". As described elsewhere in this document, the trays 1200 are warmed according to the required temperature during printing and the printing heads 1214 are protected from the tray heat and fumes.

21. Maintenance

The 3D printer comprises subsystems that can require periodic maintenance between printing jobs (sessions) and in particular during printing sessions, for example: maintenance of ink, maintenance of jetting heads (purge, Heads recovery, Heads boost, orifice wiping), of mask (mask wiping), of fume suction nozzles (purge), of roller and roller housing (dust slit cleaning, blade brushing).

21.1 Ink Maintenance

As discussed above, ink for Nano Particle Jetting (NPJ) can include at least 4 components:
 a. Solvent: the liquid media that permits the ink to flow.
 b. Filler: the solid mass in particle form that comprises the final object later after printing and sintering.
 c. Dispersing agent: additive used to stabilize the dispersion of the filler particles in the solvent.
 d. Bonding agent: additive used to "bond" the filler particles, immediately upon solvent evaporation, and in this way, to strengthen the printed material (also called green material). In some examples, the dispersing agent may also be the bonding agent.

NPJ inks can be divided into 2 different categories:
 a. Inks for building the desired part, or Modeling ink. For example, the modeling ink can include zirconia ink.
 b. Inks for building support structures, also called Supporting ink. Supporting ink can be necessary to fill for example undercuts.

In at least one example, the ink can include a hydrophilic solvent. In some examples, the ink can include a hydrophilic solvent belonging to the glycol family. In some example, the ink can include a hydrophilic, water sensitive, and/or water soluble filler.

For many aspects, e.g. user friendliness, costs, safety, etc., the use of water to remove the support structure from a 3D printed part 312 is desirable. In such a case, the Supporting ink may comprise a water-soluble filler.

The use of water-soluble fillers presents a conflict between the need for the solidified ink to be water soluble and the need for the liquid ink to be stable over time even if exposed to moisture, for example exposure to natural air.

Accordingly, in at least one embodiment, a system and a method can be utilized to impede an ink, Modeling and Supporting ink, from freely absorbing moisture from the air. The same system and method can reduce the ink water content, to below the water content otherwise reached at equilibrium with moisture air. In some embodiments, a system and method for 3D printing can include using a water-soluble Supporting ink. In some embodiments, a water Supporting ink for NPJ can comprise a water-soluble filler.

The conflict between the need for Support ink solubility in water and the need for the ink stability on a humid environment, is especially significant as high is the air relative humidity (RH). For example, higher than 30% RH, or higher than 40% RH. When the ink is exposed to air it absorbs moisture, compromising the ink stability, as it is explained next.

When ink gets in contact with air, the water/moisture concentration in the ink and in the air changes until equilibrium is reached. Said equilibrium described as follows:

$$K=[A]/[B]$$

K=partition co-efficient
[A]=water concentration on the ink
[B]=water concentration on the ink headspace.

Ink moisture absorption from air can have several negative effects:
 a. It dilutes the ink: for example, if the filler concentration in the ink is 40% w, when the ink is dry, the absorption of for example 5% water (relatively to the solvent), may be responsible for a drop in the filler loading to ~38% w. Meaning, an effective reduction in the filler loading of 5%. Such filler loading decrees, impacts printing properties as for example layer thickness. In this case, for example if the ink layer thickness using dry ink is 10 microns the containing water will have a layer thickness of about 9.5 microns. This variation in layer thickens been large enough to negatively affect the printing quality.
 b. The conditions necessary to evaporate the solvent from a layer of dry ink may be different from those necessary to dry a layer of ink that contain water.
 c. Water absorbed by the ink can change the ink polarity compromising the effect of the dispersing agent, compromising therefore the ink stability.
 d. The water absorbed by the ink may be absolved by the filler particles, and may compromise the ink stability.

To overcome the negative effects of the natural ink sensitivity to air moisture, one solution can be to prevent the ink from exposure to air. For example, the printer internal moisture concentration can be controlled to keep it below a predetermined threshold. Although this may overcome the ink's water sensitivity, but it can be very difficult for implementation: In many countries, especially during summer season, the relative air humidity is so high that isolating the printer and the ink from the ambient air containing moisture may not be economically viable.

In at least one embodiment, as illustrated in FIG. 13A, the ink 1302 can be loaded into the printer 1300 and kept in a reservoir 1304 at a temperature of about 50° C. At this temperature, the ink's capacity to absorb moisture can be decreased significantly.

As discussed above, when water is dissolved in the ink 1302, the water is capable of dissolving part of the solid particles that comprise the ink dispersion (e.g. salt, sodium chloride, sodium carbonate, etc.). In one aspect of this dissolution, the dissolved material may later precipitate and leave sediments, often as solid crystals, in hot areas, including the warm ink dispensing head 314. When this occurs, the head's dispensing power is impaired.

Generally, the ink 1302 in the tank should be heated to such a predetermined temperature, that together with the ventilation of air in the tank of such % RH, it limits the water percentage in the ink 1302 to be lower than the predetermined value that jeopardizes the quality of the ink 1302 and dispensing heads 314. According to some examples, the air (also referred to as gas) which captures humidity from the ink is heated by the ink, and thus the relative humidity (RH) of the air is reduced. Percentage of RH indicates the RH at the specific temperature at which the RH is determined.

In at least one embodiment of printing, the ink 314 can flow from an ink reservoir 1304 through pipes 322 (shown, for example, in FIG. 3A) into an ink dispensing head 314. A substantial part of the ink 1302 is purged from the head 314 (a cleaning procedure of the head 314) and recirculated back to the ink reservoir 1304. The purged ink may be sucked back through collecting pipes into the ink reservoir 1304, often also through an ink/air separator. During this action, the ink 1302 can come into close contact with the air in the printer and may absorb water from the air. The ink temperature in the pipes can be, for example, 20-35 degrees Celsius, and the humidity of the printer air can be, for example RH=30-70%. For removing the absorbed water from the ink 1302 to below a safe level (typically 0.7-1% water in the carrier liquid, wt/wt), the ink 1302 can be heated in the reservoir 1304 to about 40-60° C. and the RH of the air that in contact with the heated ink if kept at about RH=10-50%. The last by blowing air over the ink surface or through the ink 1302 in the tank 1304. Said air having a RH in the range of lower than 50% (for example 30%) at a temperature higher than that of the ambient air that surround the printer.

In some embodiments, as illustrated in FIG. 13B, the ink 1302 can be kept in a container (also called reservoir) 1320 and a gas having low RH (at a temp. similar to that of the heated ink) 1322 can be purged onto the ink reservoir or over the ink top level. For example, as illustrated in FIG. 13B, the lower portion of the container 1324 includes the ink 1302 while the upper portion 1326 includes the low RH gas 1322. The low RH gas, in this example, is blown by a gas pipe into the bottom of the liquid in the container, and bubbles up to the upper portion and from it outside the container. In some examples, as illustrated in FIG. 13A, the system 1300 can include a fan 1306 operable to blow the low RH gas over the ink 1302. For example, the low RH gas can be lower than 50% RH, or lower than 40%, or 30%, or lower. In some embodiments, the ink can be kept in a reservoir 1304 at a temperature in the range of 40° C. to 60° C., and the air on top of the ink is constantly refreshed with low RH gas, for example, in the range of 50% to 30% RH, or lower. In such an example the air on top of the ink may be, for example by the heated ink, to a temperature in the range of 35° C. to 60° C. In some embodiments, the ink can be at least sporadically in circulation between one reservoir that contains means to control the ink temperature to be significantly higher than room temperature, for example about 50° C. Optionally said ink reservoir can include means, such as a fan 1306, to flash the gas over the ink surface using a low moisture gas. Said gas can be for example dry air.

Even if the ink, at some point, absorbs moisture (for example due to exposure to air with high RH), when the ink is treated as discussed herein, where the ink is heated to about 50° C. in a reservoir 1306 and constantly flashed with a gas (for example air) with medium to low RH. At these conditions, the ink releases moisture in such an extent permitting keeping the ink water concentration below the natural water content that otherwise is reached at natural conditions. The meaning of gas with medium to low RH should be understood as any moisture content in the gas which is lower than that otherwise reached on at the head-space without the means described herein.

21.2 Head Recovery and Boost

As discussed herein, in printing machines comprising inkjet heads 314 (see FIG. 14A), a procedure of periodic maintenance of the heads 314 may be necessary for preventing clogging of the nozzles 1412 or recovering the nozzles' full performance. This is particularly important when the ink is a dispersion of heavy particles that tend to sediment in the nozzle compartments, in the delivery pipes, etc.

Figure 14A:
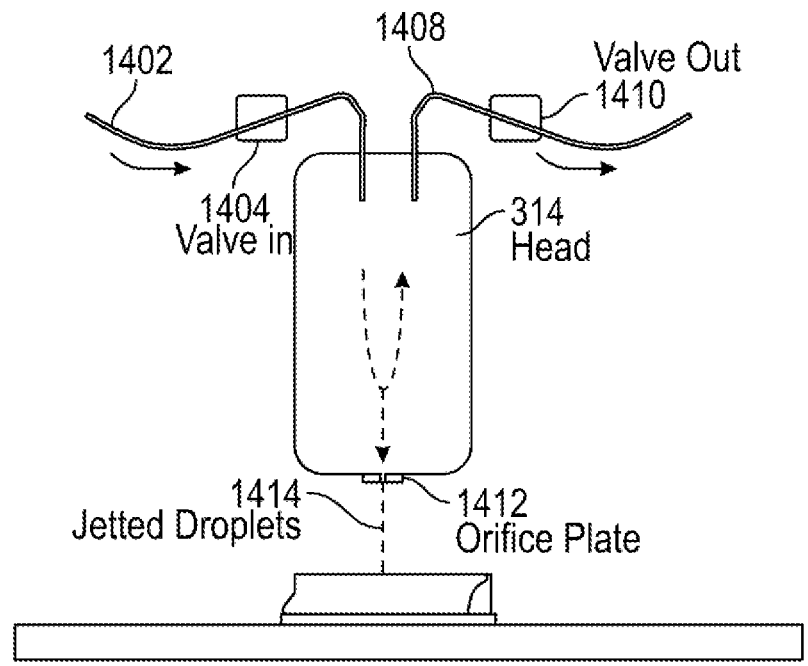
FIG. 14A is a diagram of an ink head jetting droplets.
Figure 14B:
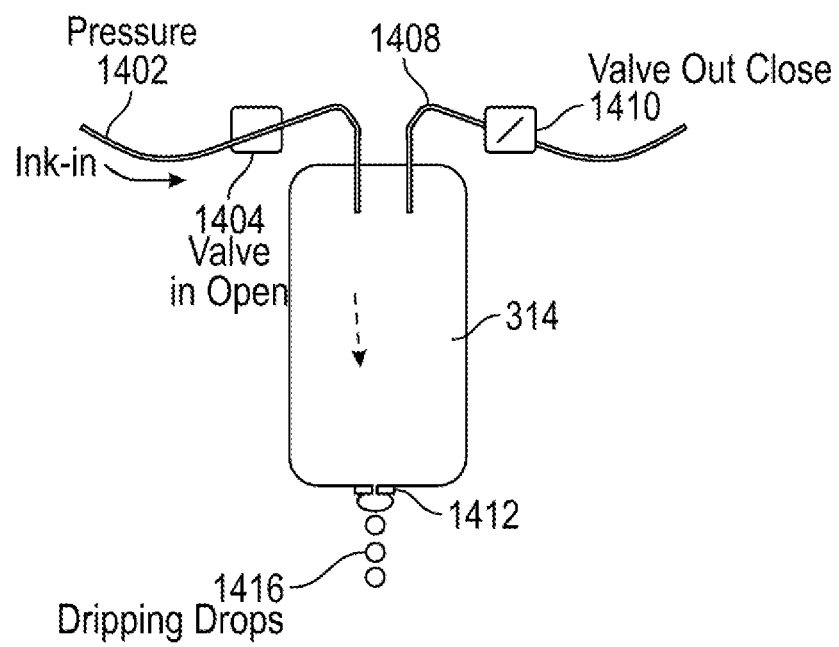
FIG. 14B is a diagram of an ink head dripping drops.

A frequent purge cycle, in which ink is pressed into the heads 314 from the input ink pipe 1402 to the head 314 and flows through the nozzles 1412 as dripping drops 1416, can be used (FIG. 14B). However, a less frequent procedure may be required for more intense cleaning of the heads 314 and their numerous nozzles 1412.

As illustrated in FIG. 14A, to supply ink to the head 314 for jetting, only an input pipe 1402 is required. However, in order to prevent sedimentation in the pipes and in the inner channels of the head 314, an output pipe 1408 can be also used. An input valve 1404 can control the ink flowing in through the input pipe 1402, and an output valve 1410 can control the ink flowing out through the output pipe 1408. In at least one example, the input valve 1404 and/or the output valve 1410 can be communicatively coupled with a computer which can control the opening and/or closing of the input valve 1404 and/or the output valve 1410 to control the flow of the ink. The ink can continuously flow to the head 314 and out of the head 314, while only a portion may used for jetting droplets 1414. This way of operating the ink and head 314 can be called "circulation mode".

Disclosed herein are two options to improve intense periodic maintenance of heads during printing.

Head Recovery

Figure 14C:
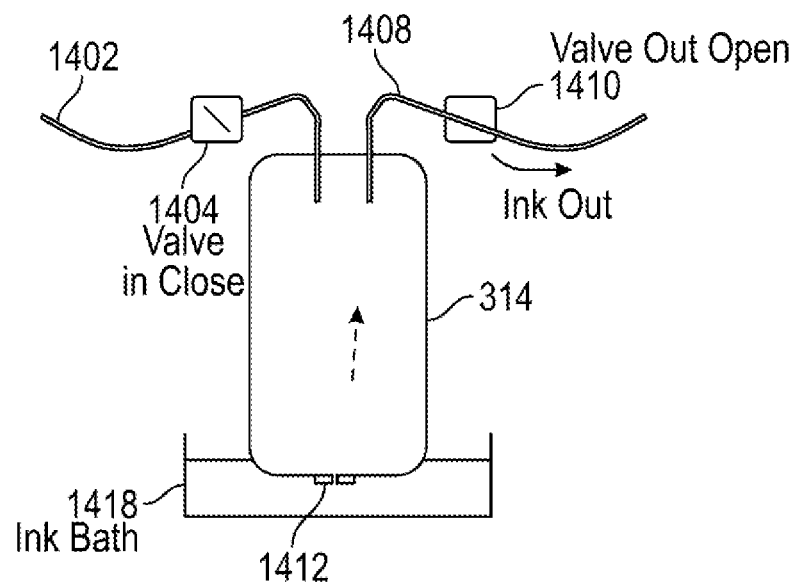
FIG. 14C is a diagram of an ink head in an ink bath.

As illustrated in FIG. 14C, the head 314 can be placed into a bath 1418 containing ink, and the head 314 can be dipped in the bath 1418 to assure that the orifice plate 1412 of the head 314 is fully covered with ink.

By reducing the ink pressure in an ink delivery pipe 1410 connected to the head 314 by closing the input pipe 1402 and opening the output pipe 1410, ink can be pulled out of the head 314, and consequently suck ink from the bath 1418 into the head 314 through the jetting nozzles 1412 (FIG. 14C).

By this procedure, the interior of the head 314 (nozzle chambers, filter and inner pipe) can be flushed in the opposite direction of that during purge and jetting. Thus, sedimentation that may be left after the purge in stagnation corners may be washed by the reverse flow. In addition, dirt and large particles that gradually accumulate at the inner ink filter, may be released and washed out from the head.

While the head 314 is dipped in the ink bath 1418, a series of ink purge and ink suctions (Head recovery) can be conducted.

Figure 14D:
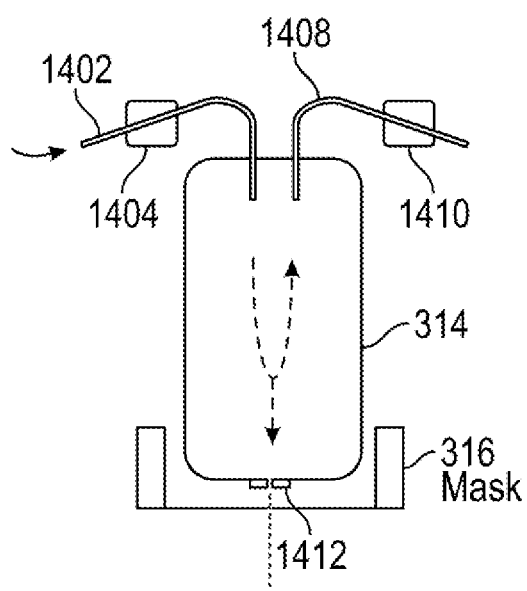
FIG. 14D is a diagram of an ink head in a mask.

As illustrated in FIGS. 14D and 14E, when the head 314 is embedded in a protecting mask 316 (which as discussed above is a cooled enclosure, protecting the head 314 from the heat of the substrate 312, comprising a slit in the mask's bottom through which jetting is performed), the mask 316 itself can take the roll of the bath 1418. A resilient sealing element 1424 enclosed in a cap 1426 can close the jetting slit to prevent ink from leaving the mask 316 to create the reservoir (also called retainer) 1418. The mask 316 can be continuously attached to the head 314 with a small gap between the bottom of the head 314 and the floor of mask 316 (See FIG. 14D). During non-printing time, the cap can be attached from below to the bottom of the mask 316, for example where an elastic rubber 1424 can seal the slit, until the mask 316 becomes a bath 1418 (also called retainer). Ink purge from the head 314 fills the retainer 1418. Afterwards a cycle of sucking (Head recovery) followed by additional filling purge is performed. This filling (purge) and sucking (Head recovery) can be repeated many times, with predetermined pauses added between a cycle of purge-sucking, or between groups of purge-sucking-purge-sucking . . . N times.

Head recovery can be periodically operated during printing session. The printing pauses, the head 314 moves to a location of a bath 1418 (or the bath 1418 moves to the head 314 location), the head 314 immerses in the ink and runs Head recovery. Afterwards, the head 314 resumes printing. When necessary, before resuming printing, a head wiper can wipe the head's orifice plate 1412.

When the head 314 is embedded in a mask 316, periodically operation of Head recovery during printing becomes much easier, since there is no need to keep a post of ink bath 1418 in the machine, maintain the ink level and prevent sedimentation of the ink in the bath 1418. The head 314 can simply be moved to the cap 1426 location (or move the cap 1426 to the head 314 location), seal the mask 316 slit by the resilient sealing element 1424, and operate cycles of purge-suck. Then remove the cap 1426 and resume printing, with or without preceding head wiping.

Head Boost

As illustrated in FIG. 14F, a very short purge (e.g. 0.1 to 0.3 sec) can be performed to have small amount of ink flowing out of each nozzle. Because of surface tension effects, the ink can adhere to the orifice plate 1412 and form a hanged drop 1420, rather than dropping down. Purge can be accomplished by increased ink pressure in the head Immediately after the short purge, negative pressure (vacuum) is applied to the head, and the head sucks off the hanged drop.

Technically the operation can include the following:
a. Stop printing and close pressure valves 1404 and 1410
b. Apply purge (positive) pressure 1402 to the ink reservoir that is connected to the head through ink-in pipe, and suction (negative) pressure to a collecting ink vessel (the ink/air separator) that is connected to the head through ink-out pipe
c. When output valve 1410 is closed, open input valve 1404 for e.g. 0.1-0.3 sec for short purge (FIG. 14F)
d. Immediately after the short purge, close input valve 1404 and open output valve 1410 for e.g. 0.1 to 0.3 sec, to apply a suction force in the head 314 that pulls back the hung drop 1420 into the head 314 (FIG. 14G).
e. Repeat steps c-d for e.g. 1-20 times
f. Release the pressures (positive and negative) in the ink reservoir and the collecting vessel, apply a long purge, and resume printing.

Consequently, the ink rapidly goes in and out from the nozzles, which irritates deposited material in stagnation corners. The material can be flushed out from the head 314 by the following long purge.

An advantage of Head boost over Head recovery is that Head boost takes much less time (roughly 10 sec), wherein Head recovery sends the head 314 outside the printing area to the capping post, and may take, for example, 30-60 sec.

Head recovery, on the other hand, is a procedure that can be implemented during long capping time, between printing sessions.

A variation of Head boost allows the short purge to be longer, and the purged ink to drop down or being sucked into a shielding mask. The following suction step may suck air instead of the ink drop, but still can effectively irritate deposited material in the head. The sucked air is then flushed out from by the head by the following long purge.

21.3 Reflective Substrate for Nozzle Marks Inspection

In printing machines comprising inkjet, a procedure of periodic inspection of the status of the numerous nozzles may be necessary for assuring proper printing quality and/or operating respective nozzle maintenance procedures.

An inspection method can include jetting (printing) inspection marks by each nozzle on an inspection substrate, and inspecting the quality of each mark.

It is desirable to have the substrate on which the ink is disposed fulfilling at least the following requirements which will be discussed in further detail below:
a. No disposal material
b. High printed mark quality
c. Good mark visibility for proper inspection capability No Disposal Material Instead of jetting ink marks on e.g. inspection paper, and replacing the paper every inspection to a new paper, printing ink marks can be conducted on a reusable solid substrate 1508.

Good Print Quality

Often the ink needs to be warmed in order to solidify. For example, in the highly smooth substrate 1508 discussed herein (discussed in further detail below), there is a need to solidify the ink immediately after jetting the ink mark 1504, before the thin mark widens and turns into a dull amorphic stain. Thus, the substrate 1508 can be warmed to substantially the same temperature as used in solidifying the ink during the regular printing.

In at least one embodiment, the substrate 1508 can be laid on a base plate 318 and firmly attached to it. Attachment can be accomplished by bolts, a latch or vacuum, etc. The base plate 318 can be warmed by heaters that are embedded in the plate 318.

Since the upper surface of the substrate 1508 should be warm, the substrate 1508 can be made of good heat conductive material like aluminum, copper or brass, and of a small thickness, e.g. 0.3 to 3 mm. Further, in order to assure sharp and clear edges of the mark 1504, the surface of the substrate 1508 should be highly smooth, otherwise the ink may spread out by surface tension and capillary forces into small dent comprising unsmooth surface.

Good Inspection Capture Capability

Figure 15A:
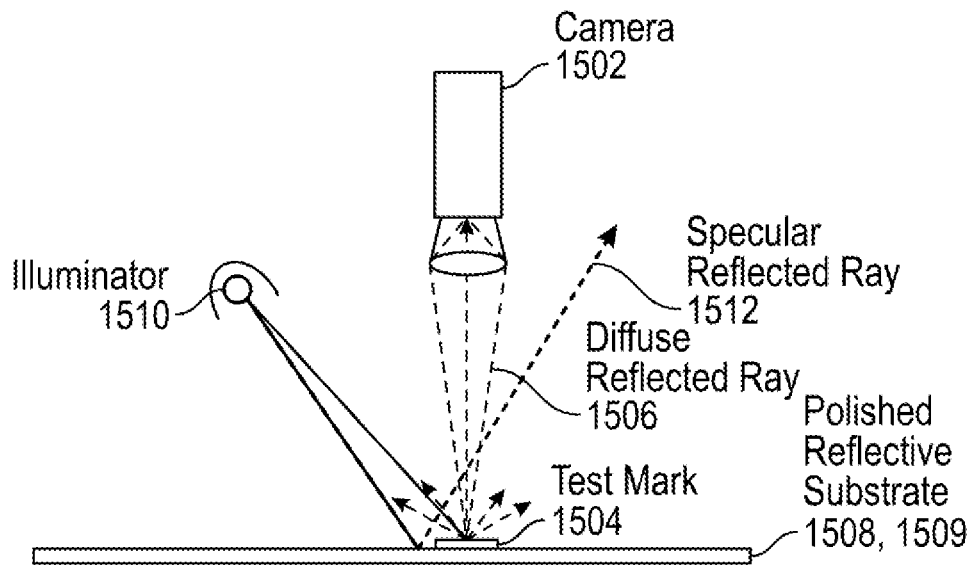
FIG. 15A is a diagram of an exemplary system to test an ink mark.

The mark visibility and thus capture capability can be highly dependent of the print quality and of the contrast between the mark 1504 and its surrounding: the substrate surface 1508. During inspection, it is critical to maximize print quality and the contrast. Both can be achieved by printing on highly polished surface such as the substrate 1508. Such surface 1508 maximizes the quality of the jetted mark 1504, as discussed before. In addition, highly smooth surface 1508 also maximizes the captured contrast. This is because the reflection of illuminating light from the smooth substrate may be controlled to point out of the direction to the sensor 1502, e.g. video camera 1502 (see, for example, FIG. 15A), and thus the mark (which reflects light in every direction) is captured on black background In addition, such surface 1508 can enable easy wiping of the test marks 1504 after inspection, to make the reusable substrate 1508 ready for repetitive jet-and-inspect tests. This is possible because (a) the ink 1504 cannot strongly adhere to polished surface 1508, and (b) as the test marks 1504 are not nested in deep dents, a wiper does not have to press strongly onto the surface 1508 to reach the bottom of the dents.

Example Embodiment

Figure 15B:
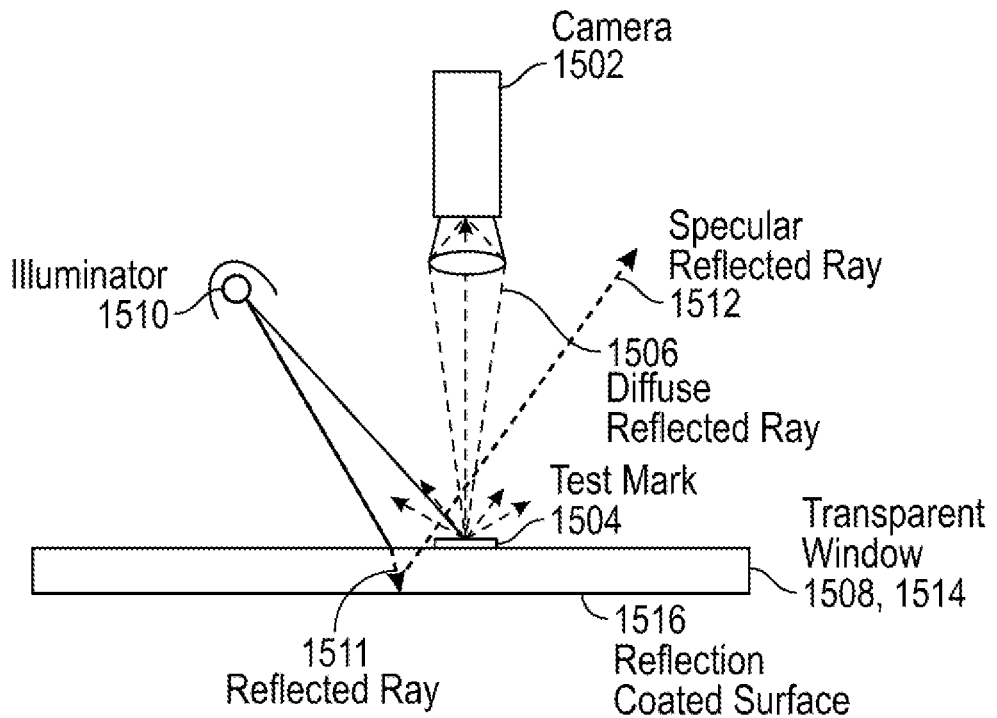
FIG. 15B is a diagram of an exemplary system to test an ink mark.

The substrate 1508 can withstand the high printing temperature, to allow the temperature required for evaporating the liquid carrier of the test marks 1504 (about 150 to 500° C.). The upper surface of the substrate 1508 can comprise at least the following attributes: (a) sufficient hardness to prevent damage by rubbing the test marks 1504 by a wiper (optionally a cleaning paper or cloth), (b) having a smooth surface to keep the jetted marks 1504 comprising sharp continuous boundary rather than diffuse, and to alleviate wiping of the marks 1504 after image capture, and (c) highly smooth to the level that the substrate 1508 becomes optically specular-reflective 1509 (see FIG. 15A), or optically transparent 1514 (see FIG. 15B), or optically ultra-black 1518 (see FIG. 15C). The last attribute (c) is required to prevent reflection of light from the substrate 1508 in the direction of the sensor 1502 (e.g. imaging camera), as demonstrated in FIGS. 15A, 15B, and 15C. By this way, the contrast of the mark's image vs background increases, and the captured mark becomes sharp and distinguished, which is especially important for the respective computer analysis of the plural test marks.

Figure 15C:
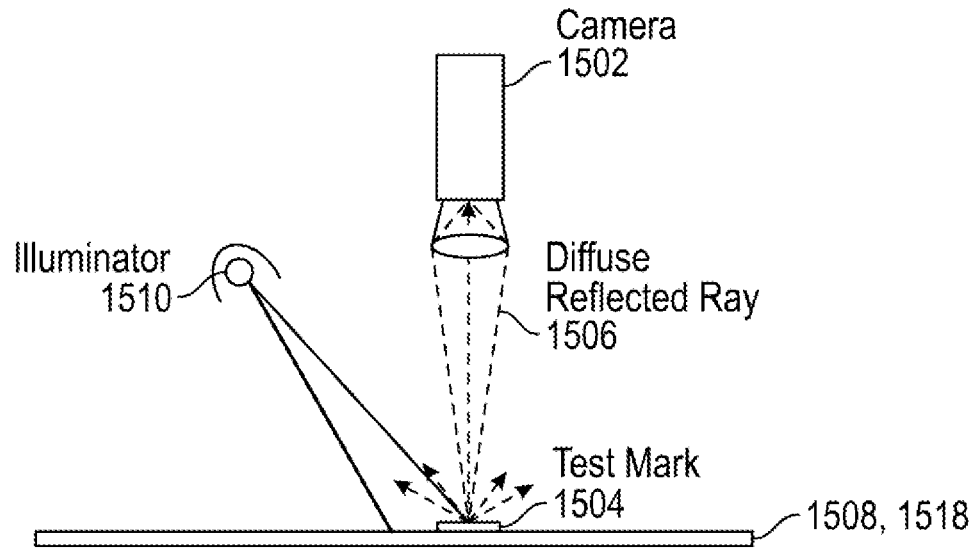
FIG. 15C is a diagram of an exemplary system to test an ink mark.

As illustrated in FIG. 15C, high contrast can be obtained also when the substrate 1518 is highly black, i.e. absorbing the illuminating light.

Figure 15D:
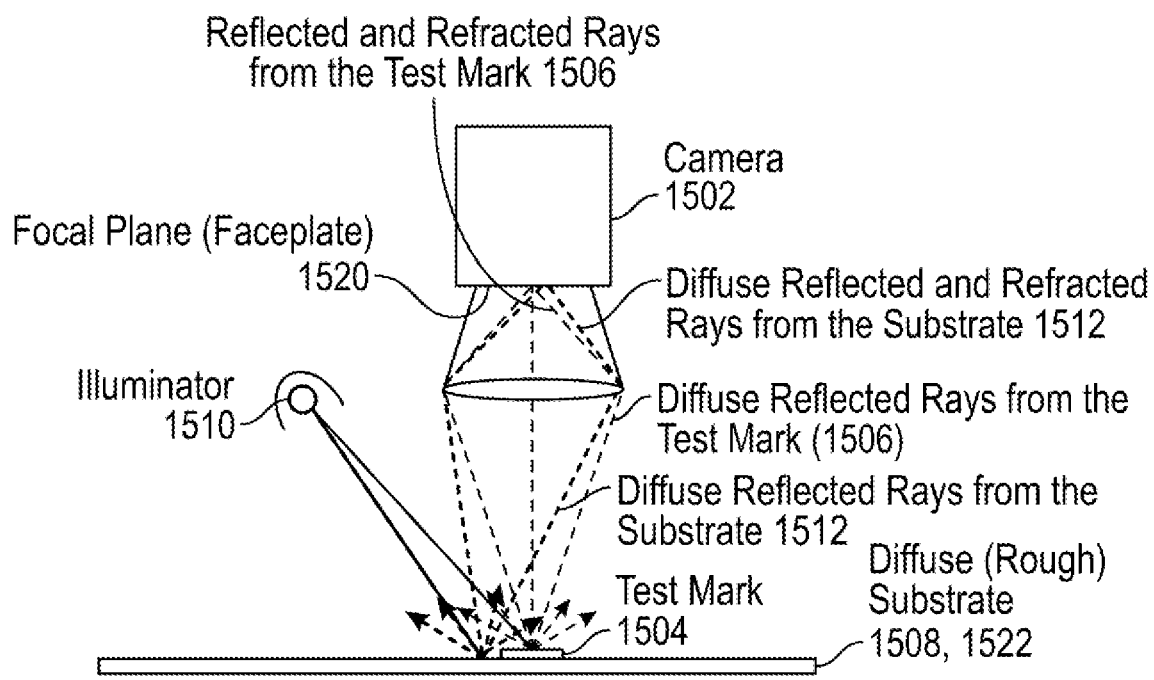
FIG. 15D is a diagram of an exemplary system to test an ink mark.

As illustrated in FIG. 15D, had the surface been diffuse reflective, light from the very nearby region of the test mark would have reached the camera 1502, and the image on the camera receptor (e.g. a CCD imaging element) would have lost contrast vs background.

Examples of specular-reflective substrates 1508 can include (1) highly polished plates of hard materials (for example metals), e.g. "super mirror" made of stainless steel, (2) shiny cast plates (for example of dark color), e.g. ceramic plate, (3) transparent window glass, (4) glass window with either front end or back side reflective coating, (5) glass window with back end coated by black paint.

The test marks 1504 can repeatedly be disposed on the substrate 1508, recorded by the camera 1502, and erased either by hand or by an electrically driven mechanical wiper controlled by the machine controller.

Figure 15E:
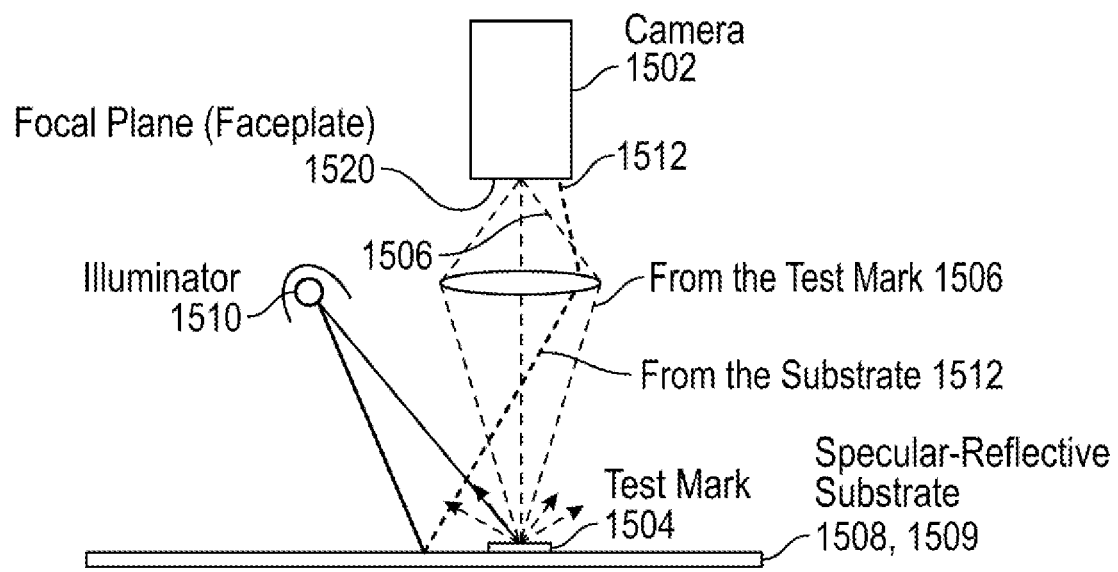
FIG. 15E is a diagram of an exemplary system to test an ink mark.

The location of the light source 1510 can be such that the reflected rays 1512 from the substrate 1508 would not reach the camera imaging element 1502. For example, if the camera 1502 captures the image of the test mark 1504 from straight above the test mark 1504 (i.e. the optical axis is normal to the substrate 1508), the light source 1510 may be positioned quite a distance apart from the camera 1502 (see FIG. 15A). In that case, the illuminating beam is at an angle to the normal of the substrate 1508, and so is the reflected beam 1512. The angle of the beam to the normal of the substrate 1508 at the vicinity of the test mark 1504 can be large enough to ensure that the reflected beam 1512 misses the aperture of camera 1502. As shown in FIG. 15E, even if part of the rays 1512 from a distant location on the substrate impinge on the camera lens 1502, the image of the angled beam from the illuminator 1510 can be recorded at the focal plane of the lens as a spark distant from the image of the test mark.

21.4 Roller Dust and Fume Suction Maintenance

The 3D printer can comprise subsystems that require periodic maintenance between printing jobs (sessions) and in particular during printing sessions, for example roller 302 (blade brushing) and roller housing (slit cleaning from accumulated dust). Maintenance of roller and fume suction systems is illustrated in FIGS. 16A-17B.

Figure 16A:
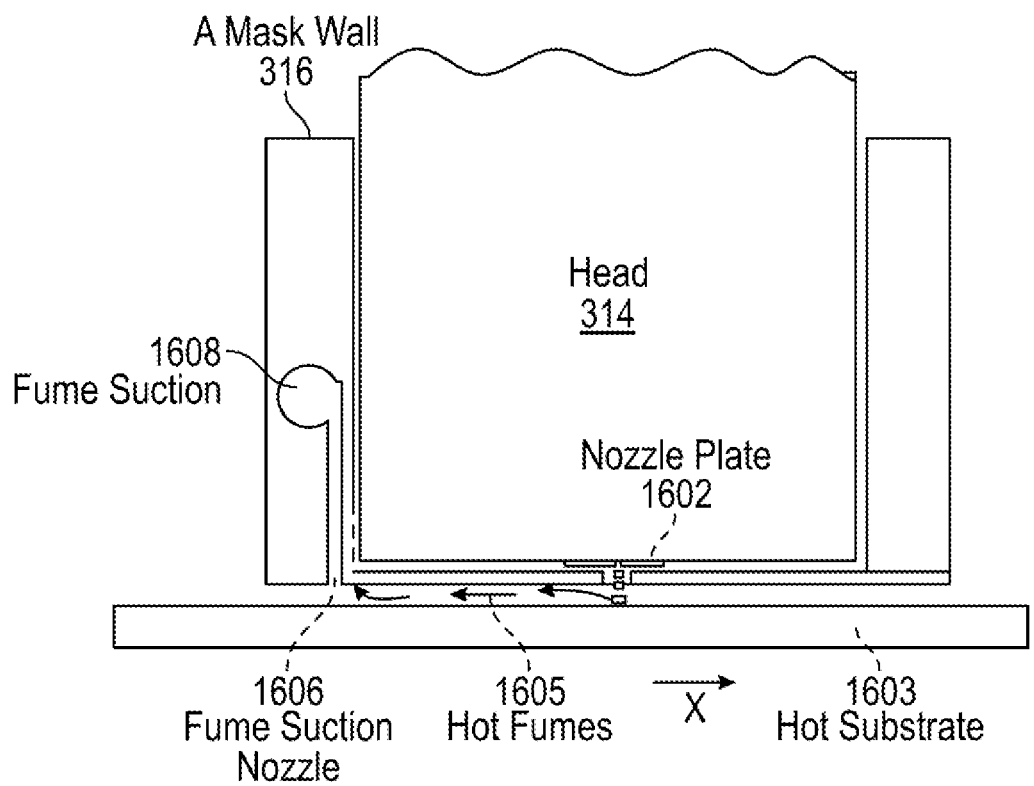
FIG. 16A is a diagram of an exemplary fume suction component of an ink head.

Fume suction nozzles (see FIGS. 16A-16C): More than 90% of the jetted ink volume can evaporate during printing and needs to be evacuated from the printer. Thus, a fume suction subsystem is incorporated in the printing cell. The suction nozzle 1606 can be close to the jetting nozzles, since the density of the fumes is highest at the close vicinity of the location of the ink dispersion. Thus, for example as illustrated in FIG. 16A, when the head 314 is embedded in a protecting mask 316, the fume suction nozzle 1606 can be also engraved in the mask 316 close to the head nozzle position 1602. In an alternative example, the nozzle (or slit) 1606 can be positioned beside the mask 316. The nozzles 1606 can suck most of the emerging fumes 1605 from the dispensed layer 1603. A fume suction pipe 1608 can be fluidly coupled with the nozzle 1606, and can create a suction such that the fumes are sucked through the nozzle 1606.

Figure 16B:
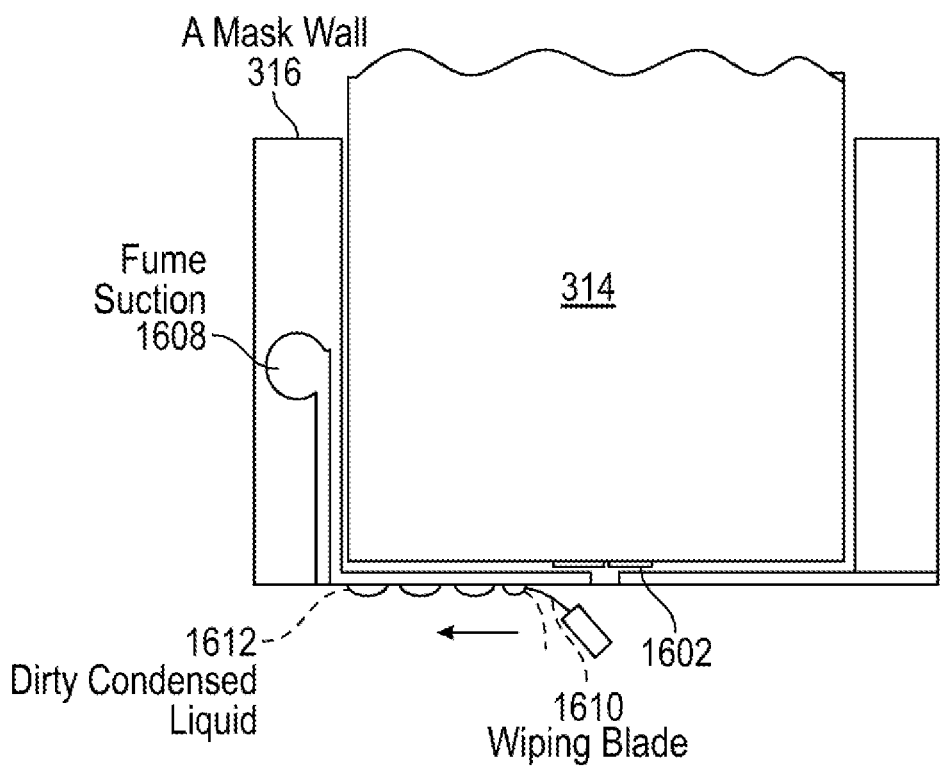
FIG. 16B is a diagram of an exemplary cleaning component to clean condensed liquid from an ink head.

The hot fumes 1605 can include pure liquid. However few reasons can cause the nozzles 1606 to gradually clog by solid material. For example:

a. Stray ink "satellites" comprising tiny droplets (e.g. having ⅒ volume of the regular drop) can be created during drops jetting as a hostile side effect. These tiny droplets can include solid particles dispersed in carrier liquid. The satellites float in the air, and/or drift with the air flow in the direction of the sucking nozzles 1606;

b. During printing, fumes that touch the mask 316 can condense at the bottom of the mask 316, and, as illustrated in FIG. 16B, may need to be wiped to prevent dripping on the printed layers 328. However, the condensed liquid can include small amount of solid material (for example as a result of stray "satellites"). Thus, when an elastic wiper 1610 wipes the mask 316, the wiper blade 1610 may push solid dirt into the nozzles 1606.

Figure 16C:
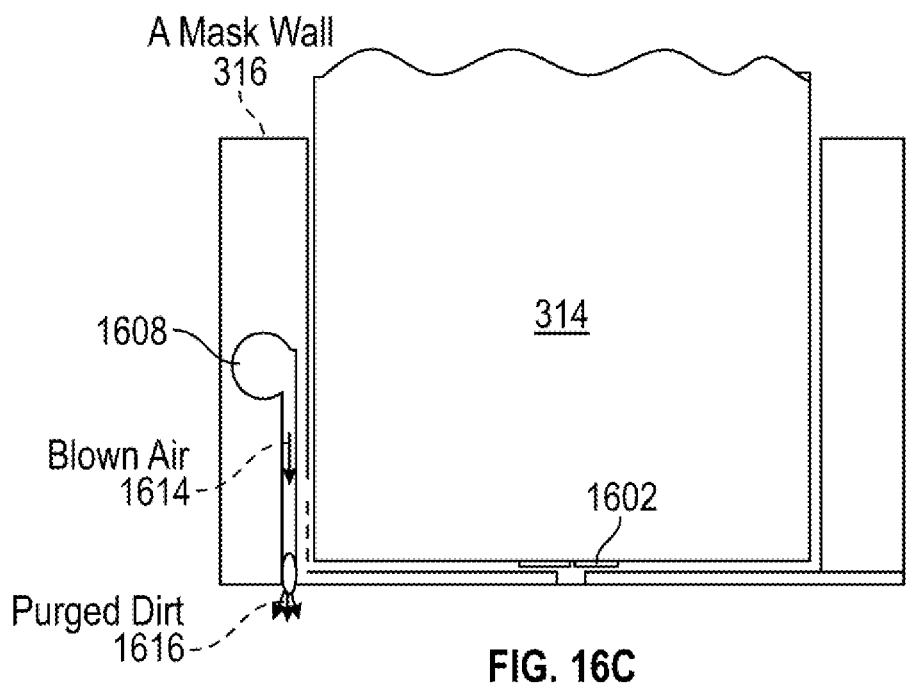
FIG. 16C is a diagram of a fume component of an ink head blowing air to purge dirt.

As illustrated in FIG. 16C, a remedy for the nozzles 1606 clogging can include an air pushing mechanism 1608 fluidly coupled with the nozzle 1606. The air pushing mechanism 1608 can push air 1614 in the opposite direction of sucking fumes and pushes out the solid dirt 1616. In at least one example, the air pushing mechanism into pipe 1608 can be the same (but of opposite direction) as the fume suction mechanism out of pipe 1608. Operating the air pushing mechanism into pipe 1608 can be executed during the print session. The maintenance operation can be conducted by pausing the print, moving the head assembly 314 to a maintenance zone, forcefully blowing air in the opposite direction of fume suction, wiping the mask from part of the purged dirt 1616 that attaches the bottom surface of the mask, and resume printing.

Figure 17A:
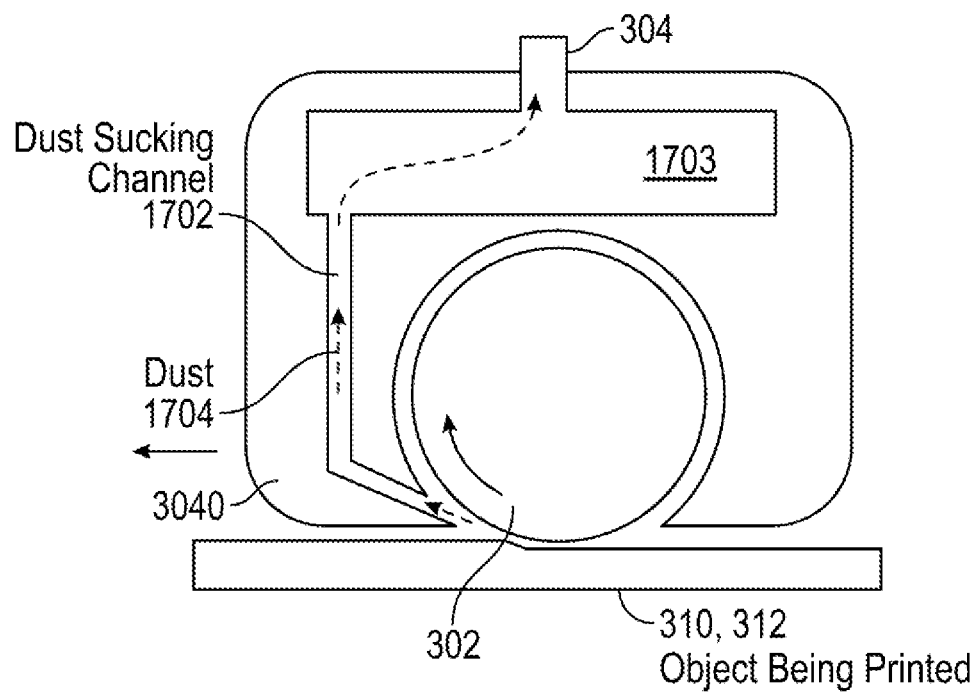
FIG. 17A is a diagram of an exemplary roller with a dust sucking channel.
Figure 17B:
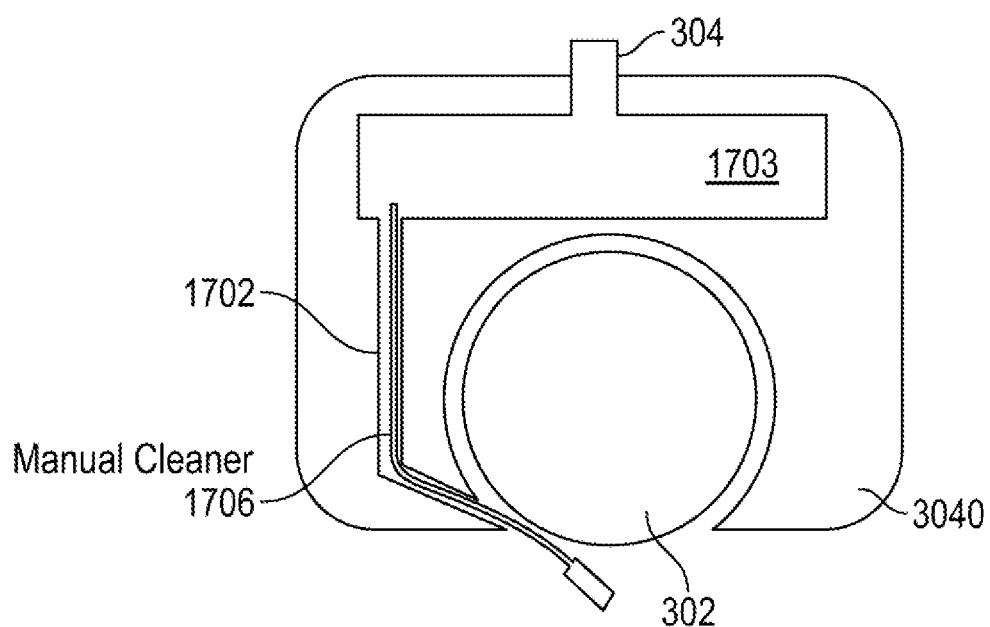
FIG. 17B is a diagram of an exemplary cleaner to clean the dust sucking channel of FIG. 17A.

Roller housing (see FIGS. 17A and 17B): As discussed above, every newly dispensed layer 310 can be solidified by heat from below or above the layer 310 and then leveled by a rotating (at high speed) blade roller 302. When the roller 302 moves above the layer 310, the roller 302 can cut material that protrudes above the design height of the layer 310, and the cut (shaved, grinded) material 1704 can be sucked by a strong air pump as solid dust 1704 through a dust removal slit 1702 formed in the roller housing 3040. The dust 1704 can eventually be collected in a dust filter or basket 1703. The dust filter can be in the roller housing as illustrated in FIG. 17B (element 1703), and out of the housing, illustrated in FIG. 3A (element 306). The grinded material 1704 can include solid particles and sticky organic material (e.g. binder and dispersing agent). In some examples, fumes emerging from the hot dispensed and dried layer 310 can be sucked with the grinded material 1704. This mix of material can easily stick to the dust slit walls 1702, and eventually clog the slit 1702. Thus, periodic cleaning of the slit 1702 is required. In at least one example as illustrated in FIG. 17B, manual cleaning can be implemented by inserting a manual cleaner 1706, such as a thin flexible string, into the slit 1702, and moving the cleaner 1706 up-down and/or left-right along the slit length ("left-right" refers in the illustration FIG. 17B as a move in-out of the paper). The cleaning can be automatically accomplished and can be implemented by including a non-manual cleaner 1706 such as a motorized plastic or metal blade, in the slit 1702, which upon a command from a computer, can move along the slit length and pushes the dirt aside.

Roller blades: Referring also to FIGS. 2A and 2B, due to the stickiness of the shave material, the gaps between the numerous blades 216 comprised in the shaving roller 212 can be gradually filled with sticky dirt and need cleaning. Manual cleaning can be implemented by moving a brush left-right along the roller blade length and repeating the cleaning few times, each after an additional small rotation increment, until the entire periphery of the roller 212 is cleaned. Automatic cleaning can be implemented by adding a cleaning port in the system, including a motorized brush that automatically moves left-right along the slit length, while the roller 212 rotates a series of small angular increments until a complete 360 degrees of the roller's periphery is cleaned.

22. System Controller

FIG. 19 is a high-level partial block diagram of an exemplary system 1800 configured to implement a controller for the present invention. System (processing system) 1800 includes a processor 1802 (one or more) and four exemplary memory devices: a RAM 1804, a boot ROM 1806, a mass storage device (hard disk) 1808, and a flash memory 1810, all communicating via a common bus 1812. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 1802 including but not limited to reduced instruction set computer (RISC) architecture and/or complex instruction set computer (CISC) architecture. A module (processing module) 1814 is shown on mass storage 1808, but as will be obvious to one skilled in the art, could be located on any of the memory devices.

Mass storage device 1808 is a non-limiting example of a computer-readable storage medium bearing computer-readable code for implementing the methods described herein. Other examples of such computer-readable storage media include read-only memories such as CDs bearing such code.

System 1800 may have an operating system stored on the memory devices, the ROM may include boot code for the system, and the processor may be configured for executing the boot code to load the operating system to RAM 1804, executing the operating system to copy computer-readable code to RAM 1804 and execute the code.

Network connection 1820 provides communications to and from system 1800. Typically, a single network connection provides one or more links, including virtual connections, to other devices on local and/or remote networks. Alternatively, system 1800 can include more than one network connection (not shown), each network connection providing one or more links to other devices and/or networks.

System 1300 can be implemented as a server or client respectively connected through a network to a client or server. Alternatively, system 1800 can be implemented as an embedded controller.

Operation—First Embodiment

The principles and operation of a first embodiment may be better understood with reference to the drawings and the accompanying description. A present embodiment is a system and method for printing an object. The system facilitates evaporating a carrier liquid during printing while at least a portion of dispersant remains in the printed layer.

While conventional implementations may heat an object body after printing to evaporate the carrier, a feature of the current embodiment is bringing or maintaining the temperature (TL) of the (most recently/current) printed layer (upper surface of the body of the object) near or above the boiling point of the carrier T1 (e.g. above 0.7×T1 in Celsius) and simultaneously below the boiling point of the dispersant. A result of this innovative feature is that the carrier liquid evaporates as the ink is printing, in contrast to conventional techniques of evaporating the carrier after printing, while at least a portion of the dispersant remains in the printed layer of the object. In some cases, the remaining dispersant serves to bind the solid particles together after the carrier liquid is evaporated. Alternatively, other materials can be added to the ink to assist in binding of the solid particles together after the carrier liquid evaporates.

One skilled in the art will realize that for a given object (and associated ink, carrier liquid, dispersant, and other optional components) there is a pre-defined (determined/calculated) range of temperatures above a lower-bound ([T1]) of the carrier boiling point temperature and below an upper-bound ([T2]) of the dispersant boiling point temperature ([T1]<TL<[T2]), and wherein bringing to, or maintaining a, temperature of the upper layer (TL) in this pre-defined range of temperatures enables evaporating the carrier while the dispersant remains in the current layer being printed. In other words, in reality, the exact carrier boiling point temperature T1 does not have to be used, but rather there is a known range even below the carrier boiling point temperature T1 in which the carrier will evaporate. This range below the carrier boiling point temperature T1 is referred to in this document as a lower-bound ([T1]) of the carrier boiling point temperature. Similarly, an exact dispersant boiling point temperature T2 does not have to be used, but rather there is a known range around the dispersant boiling point temperature T2 in which the dispersant will not evaporate (remains liquid). This range around the dispersant boiling point temperature T2 is referred to in this document as an upper-bound ([T2]) of the dispersant boiling point temperature. The lower-bound and upper-bound are typically 20% more or less than the respective boiling point temperatures (typically measured in degrees Kelvin). The lower-bound ([T1]) can be 20% less than the carrier boiling point temperature (T1) typically measured in degrees Kelvin. The upper-bound ([T2]) can be 20% more or less than the dispersant boiling point temperature (T2) typically measured in degrees Kelvin.

A first layer is printed on a printing surface of the object. The object part of the first layer is printed with at least one ink, typically from at least one corresponding inkjet printing head. One or more of the printing heads, typically all of the printing heads, can be modulated according to a content of the first layer. Each of the at least one inks typically include a carrier having a carrier boiling point temperature (T1), a dispersant having a dispersant boiling point temperature (T2) and particles having a particle sintering temperature (T3). When at least two inks are printed, each of the at least two inks can include particles of different types, and a local proportion of each of the at last two inks is determined by the specification for the layer being printed (first layer's specification). Typically, the local proportion of each of the inks varies from one printed layer to another printed layer, and from one point in a layer to another point in the same layer. When the layer also includes a support portion, the support is printed adjacent to the object layer, as described below.

As described elsewhere in this document, the dispersant can be chosen to additionally and/or alternatively bind the particles to each other after the carrier is evaporated and/or inhibit sintering of the particles to each other after the carrier is evaporated.

A feature of inkjet printing is that the printing can be selective, in other words, printing to areas that are part of each layer being printed (such as the first layer of the object). Each layer is typically printed based on a layer specification or layer content (description) including information on what portion of the current layer is the desired object. Optionally, the layer specification can include information on areas of the current layer not to be printed (to remain un-printed), to be printed with an alternate ink (second ink, third ink, etc.), support areas, and/or mold areas.

As described elsewhere in this document, bringing to or maintaining a temperature of the upper layer (TL), evaporating of the dispersant, and/or sintering can be achieved via techniques such as use of a radiation source such as a heating lamp, an electro-magnetic (EM) radiation source above the object, a selective or non-selective laser, a focused linear laser beam, a scanned laser beam, a scanned focused pencil laser beam, focused light from a linear incandescent bulb, focused light from a gas discharge lamp bulb, a flash light, an ultra-violet (UV) light source, a visible light source, an infra-red (IR) light source, and substrate (tray) temperature control. In a case where a scanned laser beam is used, the beam can be modulated according to the content of the layer (information on what portion of the current layer is the desired object). The above-described techniques can be used to evaporate the dispersant via temporarily increasing a temperature of the first layer above a temperature of the object.

In a case where printing is selective, printing to areas that are part of the first layer of the object, then after selective printing a non-selective laser can be used to irradiate an entire area on which the object is being printed (for example, using a line focused laser). This technique of selective printing followed by non-selective use of a heating source, in particular using a non-selective laser, can be used for heating the upper surface or for firing-off (evaporating) dispersant. In contrast, conventional techniques use non-selective printing (or simply providing to the printing area an ink or other substance from which to construct the 3D object) followed by a selective laser to sinter desired portions of the object.

After evaporating the carrier, optionally the remaining dispersant or a portion of the dispersant can be evaporated, and then optionally the first (most recently printed) layer can be sintered. Optionally, a subsequent layer can be printed on top of the first layer after evaporating the carrier, after evaporating dispersant, or after sintering (the printed layer). Typically, an object is built from hundreds or thousands of printed layers, so the method repeats by printing a subsequent layer (as a new "first layer") on top of the previously printed (first) layer.

As described elsewhere in this document, a catalyst can be added to the layer being printed (first layer). Catalysts can be selected from compounds such as halides and copper chloride. The catalyst can be added by a variety of techniques, for example:
  including the catalyst in at least one of the inks;
  jetting the catalyst in gaseous form from above the first layer;
  jetting the catalyst in liquid form from above the first layer;
  spraying the catalyst in gaseous form from above the first layer; and
  spraying the catalyst in liquid form from above the first layer.

The object is typically printed on a tray that is heated or made of thermal isolation material.

In a case where the temperature of the upper surface TS is kept above the carrier boiling temperature T1, (e.g. 30° C. higher than T1) the liquid carrier in the newly dispensed layer abruptly boils (explodes like) when the ink lands on the upper surface, creating a sponge like layer including open plenty tiny inflations. This is because during the abrupt boiling, tiny segments of the dispensed ink inflate (by the carrier gas) and freeze (i.e. become dry), just before the gas makes an opening and "flies" out. The resulting structure of the 3D object body is thus porous. Creating a porous object body may be desirable to allow the remaining dispersant to flow out of the structure of the object during subsequent heating in an oven. Subsequent heating can be used to remove (disintegrate and/or evaporate) remaining dispersant and/or other ink components such as organic material.

Operation—Second Embodiment

The principles and operation of a second embodiment may be better understood with reference to the drawings and the accompanying description. A present embodiment is a system and method for printing an object. The system facilitates evaporating dispersant in a first layer prior to sintering the first layer and/or prior to printing a second layer.

As described elsewhere in this document, conventional implementations leave dispersant in a completed object, and after printing the entire object then heat the entire object to fire-off (evaporate) a portion of the dispersant. A feature of the current embodiment is evaporating at least a portion of the dispersant during printing. In general, a method for printing an object starts with printing a first layer of at least one ink then evaporating at least a portion of the dispersant, typically substantially all the dispersant. After evaporating at least a portion of the dispersant, a subsequent operation is performed. Subsequent operations include:
- at least partially sintering the first layer, and
- repeating printing a subsequent layer of the at least one ink on the first layer.

Optionally, prior to evaporating at least a portion of the dispersant, the carrier can be evaporated while the dispersant remains in the first layer.

In general, the techniques and options discussed above, in particular in reference to the first embodiment, can also be implemented for this second embodiment.

Operation—Third Embodiment—FIG. 2A to 3

The principles and operation of a third embodiment may be better understood with reference to the drawings and the accompanying description. A present embodiment is a system and method for printing an object. The system facilitates leveling an upper-layer of a printed object using a horizontal roller.

As described elsewhere in this document, printing can result in an upper-layer (most recently printed/first layer) that is not sufficiently flat (too rough) for subsequent processing. In this case, leveling the top of the object is desired. Conventional implementations use vertical milling or grinding disks rotating about vertical beam, or smooth or knurled rollers. In the current embodiment, an innovative horizontal roller is used. In an optional embodiment, the horizontal roller is a cutting (bladed) roller.

Generally, a method for printing an object starts with printing a first layer of at least one ink and then at least partially hardening the first layer. Then the first layer is leveled using an innovative horizontal roller. The horizontal roller can include one or more blades (or alternatively a cylindrical grinding surface) and rotation generally about an axis parallel to a plane of the first layer (typically the Y-axis).

Additions, options, and alternatives for the current embodiment are described in the above section "leveling apparatus". After leveling and optionally: cleaning, further hardening, evaporating at least a portion of the dispersant, and/or partial sintering, if the object is not yet complete (incomplete) a subsequent layer of at least one ink is printed on the first layer.

Operation—Fourth Embodiment—FIGS. 10A to 11C

The principles and operation of a fourth embodiment may be better understood with reference to the drawings and the accompanying description. A present embodiment is a system and method for printing an object with support. The system facilitates repeatedly printing layers according to a map, each layer with potentially both object and support portions, resulting in an object with support. In particular, support for negative angles and molds.

As described elsewhere in this document, techniques for using support can facilitate using molds, support for negative angles, using reinforced support, and pedestals.

The object portion of the layer is printed with object ink, generally referred to as a first ink. Similarly, the support portion of the object is printed with support ink, generally referred to as a second ink.

Generally, a method for printing an object with support starts with printing an object portion of a first layer using at least a first ink, the first ink including:
- a first carrier; and
- first particles used to construct the object and dispersed in the first carrier.

A support portion of the first layer using at least a second ink is printed prior to, simultaneously with, or after the object portion is printed. The second ink includes:
- a second carrier; and
- second particles used to construct the support and dispersed in the second carrier.

Preferably, the second carrier is the first carrier. Typically, the second particles are other than the first particles and the carriers are liquids.

As described above, the support portion can be printed with the second ink and additionally with the first ink. In other words, typically printing both the object and support portions with the first ink and then (or simultaneously) re-printing only the support portions with the second ink.

In a preferred embodiment, printing is via at least a first printing head, typically two or more printing heads, each printing head jetting one type of ink and each printing head modulated according to a content (object, support, and empty portions) of the first layer.

After printing a first layer, if the object is not complete (incomplete), a subsequent layer is printed on the first layer, the subsequent layer including respective object and support portions on the first layer.

The solid particles in the support ink can include particles that are: miscible in water; at least partially soluble in water, inorganic solid, organic, polymer, particles having a hardness less than the hardness of the first particles, salt, metal oxides (e.g. Zinc oxide), Silica ($SiO_2$), Calcium sulfate, and tungsten carbide (WC).

As discussed elsewhere in this document, the particles used in the object and support portions depend on the specific application, requirements, and object properties. Particles used can include metal, metal oxides, metal carbides, metal alloys, inorganic salts, polymeric particles, Polyolefin, and Polyolefin poly (4-methyl 1-pentene).

When printing of the object with support is complete, the support must be removed from the object either just after printing or after subsequent processing in an oven. The support can be removed from the object using various techniques, the specific technique depending on the type of support. Techniques include firing, immersing to dissolve the support, immersing in water to dissolve the support, immersing in acid to dissolve the support, immersing in a light acid, immersing in a strong acid, immersing in $HNO_3$, sand blasting, water jetting, etc.

It is foreseen that the described methods can be used in other areas. For example, constructing objects that are generally (informally) call two-dimensional (2D). Non-limiting examples include flexible metal or composite antennas and biological sensors. 2D objects may be composed of a single layer, or relatively few layers. In these cases, the 2D object may have similar requirements as construction of a 3D object. For example, where an ink being used to print a 2D object includes a dispersant for printing but the dispersant must be removed in the completed object.

Note that the inks referred to in the current description are commercially available conventional inks. It is foreseen that alternative, additional, and new inks can be used with the current invention.

The choices used to assist in the description of this embodiment should not detract from the validity and utility of the invention. It is foreseen that choices that are more general can be used, depending on the application.

The use of simplified calculations to assist in the description of this embodiment should not detract from the utility and basic advantages of the invention.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A system for printing a three-dimensional object comprising a plurality of layers, the system comprising:
    a base plate comprising a first heat source;
    a substrate attached to the base plate;
    a printing head operable to dispense ink on the substrate to form the printed object comprised of the plurality of layers, wherein the ink comprises a carrier liquid containing a dispersed material to be deposited during printing;
    a second heat source located above the substrate operable to emit heat onto an upper layer of the plurality of layers;
    a first temperature sensor configured to measure a temperature of the base plate;
    a second temperature sensor configured to read a temperature of the upper layer of the plurality of layers; and,
    a controller communicatively coupled with the first and the second heat sources, the first and second temperature sensors, and the printing head, the controller configured to:
        adjust the first and second heat sources to control temperatures of the substrate and to apply heat to each respective upper layer, as the upper layer is being printed, to evaporate the carrier liquid according to predetermined functions, said predetermined functions comprising:
            at lower heights below a predetermined printing height of the upper layer, maintaining a higher temperature of the upper layer compared to higher heights at and above a predetermined printing height of the upper layer; and
            maintaining the temperature of the upper layer substantially constant versus the printing height of the upper layer, from above the predetermined printing height of the upper layer.

2. The system of claim 1, wherein the controller is further configured to receive a temperature measurement of the base plate from the first temperature sensor, and the predetermined functions further comprise temperature functions of the substrate and/or a power function of the second heat source.

3. The system of claim 2, wherein the controller is configured to supply heat from the first heat source so as to maintain the substrate at a constant temperature during printing of the three-dimensional object.

4. The system of claim 1, wherein the controller is configured to gradually reduce a temperature of the substrate during printing of layers at higher layers away from the base plate.

5. The system of claim 1, wherein the adjusting the second heat source includes gradually increasing the heat from the second heat source.

6. The system of claim 1, wherein the adjusting the second heat source is kept constant versus the printing height of the upper layer, at least from above the predetermined printing height of the upper layer.

7. The system of claim 1, wherein the second temperature sensor comprises a thermal IR detector, wherein the thermal IR detector is configured to detect gray body radiation of the upper layer and convert detected intensity of said radiation into temperature.

8. The system of claim 1, wherein the substrate is removable from the base plate following formation of the printed object.

9. The system of claim 1, wherein the predetermined printing height is at or above approximately 20 mm.

10. The system of claim 1, wherein the ink comprises an organic solvent having a boiling point of at least 100° C.

11. A method to print a three-dimensional object, the method comprising:
    dispensing ink from a printing head on a substrate on a base plate in a series of layers to form the printed object comprising a plurality of layers, wherein the ink comprises a carrier liquid containing a dispersed material to be deposited during printing;
    receiving, by a controller from a second temperature sensor, a temperature measurement of an upper layer of the plurality of layers; and,
    adjusting, by the controller, a heat source located above the substrate to thereby apply heat to the upper layer of the plurality of layers, as the upper layer is being printed, to thereby evaporate the carrier liquid, according to predetermined functions, the predetermined functions comprising:
        at lower heights below a predetermined printing height of the upper layer, maintaining a higher temperature of the upper layer compared to higher heights at and above a predetermined printing height of the upper layer; and maintaining the temperature of the upper layer substantially constant versus the printing height of the upper layer, from above the predetermined printing height of the upper layer.

12. The method of claim 11, wherein, the substrate is kept fixed at a constant temperature.

13. The method of claim 12, wherein the temperature of the substrate is gradually reduced at higher layers away from the base plate.

* * * * *